(12) United States Patent
Fan et al.

(10) Patent No.: US 8,638,768 B2
(45) Date of Patent: Jan. 28, 2014

(54) SIGNAL ENCODING METHOD AND DEVICE, METHOD FOR ENCODING JOINT FEEDBACK SIGNAL

(75) Inventors: Shuju Fan, Shanghai (CN); Jing Li, Shanghai (CN); Xueli Ma, Shenzhen (CN); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 13/225,170

(22) Filed: Sep. 2, 2011

(65) Prior Publication Data

US 2011/0317605 A1  Dec. 29, 2011

Related U.S. Application Data

(63) Continuation of application No. PCT/CN2009/071639, filed on May 5, 2009, which is a continuation-in-part of application No. PCT/CN2009/070623, filed on Mar. 3, 2009, and a continuation-in-part of application No. PCT/CN2009/070805, filed on Mar. 16, 2009.

(51) Int. Cl.
*H04W 92/00* (2009.01)

(52) U.S. Cl.
USPC .......................................................... 370/338

(58) Field of Classification Search
USPC .................................... 370/338, 244; 455/68
See application file for complete search history.

(56) References Cited

U.S. PATENT DOCUMENTS

| | | | |
|---|---|---|---|
| 6,487,184 B1 | 11/2002 | Pecen et al. | |
| 7,764,727 B2 | 7/2010 | Ye et al. | |
| 7,778,197 B2 | 8/2010 | Kim | |
| 2003/0185309 A1 | 10/2003 | Pautler et al. | |
| 2006/0036922 A1 | 2/2006 | Hong et al. | |
| 2006/0203708 A1 | 9/2006 | Sampath et al. | |
| 2007/0111668 A1 | 5/2007 | Tandon et al. | |

(Continued)

FOREIGN PATENT DOCUMENTS

| | | |
|---|---|---|
| CN | 1635803 A | 7/2005 |
| CN | 1747568 A | 3/2006 |

(Continued)

OTHER PUBLICATIONS

Written Opinion of the International Searching Authority, PCT/CN2009/071639, dated Dec. 10, 2009, 4 pages.

(Continued)

*Primary Examiner* — Chandrahas Patel
*Assistant Examiner* — Lan Truong
(74) *Attorney, Agent, or Firm* — Slater & Matsil, L.L.P.

(57) ABSTRACT

A signal encoding method and device and a method for encoding a joint feedback signal are provided. The signal encoding method includes the following steps. When two carriers are configured with multiple-input and multiple-output (MIMO), Hybrid Automatic Repeat reQuest-ACKnowledgement (HARQ-ACK) signals of the two carriers are combined into a joint feedback signal. The joint feedback signal is mapped into a codeword according to predetermined mapping relationship between signals and codewords. Therefore, through the method for combining and encoding feedback signals of two carriers for transmission on a code channel in a dual cell (DC)-MIMO mode, bit error ratio (BER) and detection error cost are decreased, power overhead is saved, and a cubic metric (CM) value of the system is not affected, thereby enhancing the performance of the system.

16 Claims, 2 Drawing Sheets

(56) References Cited

U.S. PATENT DOCUMENTS

| | | | |
|---|---|---|---|
| 2007/0254715 | A1 | 11/2007 | Li et al. |
| 2007/0255993 | A1 | 11/2007 | Yap et al. |
| 2008/0144561 | A1 | 6/2008 | Kaikkonen et al. |
| 2008/0170634 | A1 | 7/2008 | Kwak et al. |
| 2008/0219370 | A1 | 9/2008 | Onggosanusi et al. |
| 2008/0232449 | A1 | 9/2008 | Khan et al. |
| 2008/0310409 | A1 | 12/2008 | Larsson et al. |
| 2009/0154412 | A1 | 6/2009 | Wang et al. |
| 2010/0074120 | A1 | 3/2010 | Bergman et al. |
| 2010/0172428 | A1* | 7/2010 | Pani et al. ............ 375/262 |
| 2010/0202348 | A1* | 8/2010 | Sambhwani ............ 370/328 |
| 2011/0085511 | A1 | 4/2011 | Fan et al. |

FOREIGN PATENT DOCUMENTS

| | | |
|---|---|---|
| CN | 1992946 A | 7/2007 |
| CN | 101019360 A | 8/2007 |
| CN | 101023620 A | 8/2007 |
| CN | 101222304 A | 7/2008 |
| CN | 101345608 A | 1/2009 |
| CN | 101359983 A | 2/2009 |
| JP | 4933685 B1 | 5/2012 |
| RU | 2256299 C2 | 7/2005 |
| WO | WO 03/030424 A1 | 4/2003 |
| WO | WO 2007/107110 A1 | 9/2007 |
| WO | WO 2008/041932 A1 | 4/2008 |
| WO | WO 2008/084927 A1 | 7/2008 |
| WO | WO 2008/153361 A1 | 12/2008 |
| WO | WO 2009/120797 A1 | 10/2009 |
| WO | WO 2010/078425 A1 | 7/2010 |
| WO | WO 2010/099563 A1 | 9/2010 |
| WO | WO 2010/099668 A1 | 9/2010 |
| WO | WO 2010/099672 A1 | 9/2010 |

OTHER PUBLICATIONS

Written Opinion of the International Searching Authority, PCT/CN2009/070623, dated Sep. 6, 2011, 9 pages.
Chinese Search Report received in Application No. 200980153438.0 mailed Oct. 22, 2012, 4 pages.
Extended European Search Report received in Application No. 13154108.8-1851 mailed Mar. 11, 2013, 4 pages.
Extended European Search Report, Application No./Patent No. 09841006.1-1237 / 2387174 PCT/CN2009/071639, dated Feb. 6, 2012, 6 pages.
3GPP TS 25.212 V8.4.0 (Dec. 2008), "3$^{rd}$ Generation Partnership Project; Technical Specification Group Radio Access Network; Multiplexing and channel coding (FDD) (Release 8)," Dec. 2008, 106 pages.
TSG-RAN WG1 #53, "On Multiple ACK/NAK for LTE TDD," R1-082001, Agenda Item: 7.1.2, Source: Ericsson, May 5-9, 2008, Kansas City, MO, 5 pages.
Patent Examination Report No. 1 received in Australian Patent Application No. 2009341504, mailed Mar. 26, 2013, 2 pages.
"3rd Generation Partnership Project; Technical Specification Group Radio Access Network; Multiplexing and Channel Coding (FDD)", 3GPP TS 25.212, V7.9.0, Release 7, Sep. 2008, 103 pages.
"3rd Generation Partnership Project; Technical Specification Group Radio Access Network; Multiplexing and Channel Coding (FDD)", 3GPP TS 25.212, V8.4.0, Release 8, Dec. 2008, 107 pages.
International Preliminary Report on Patentability, PCT/CN/2009/070623, Huawei Technologies Co., Ltd., Sep. 6, 2011, 9 pages.
Written Opinion of the International Searching Authority, International Application No. PCT/CN2009/070805, Applicant: Shenzhen Huawei Communication Technologies Co., Ltd., et al., Dec. 17, 2009, 8 pages.
"R1-090034: HS-DPCCH Design Framework for MC-HSDPA," 3GPP TSG RAN WG1 Meeting #55bis, http://www.3gpp.org/ftp/tsg_ran/wg1_rl1/TSGR1_55b/Docs/, Qualcomm Europe, Ljubljana, Slovenia, Jan. 12-16, 2009, 25 pages.
"R1-091159: HS-DPCCH Design for DC-HSDPA and MIMO," 3GPP TSG-RAN WG1 #56bis, http://www.3gpp.org/ftp/tsg_ran/wg1_rl1/TSGR1_56b/Docs/, Qualcomm Europe, Seoul, South Korea, Mar. 23-27, 2009, 19 pages.
"R1-091542: Code Book Design for HARQ-ACK in DC-HSDPA with MIMO," 3GPP TSG RAN WG1 Meeting #56bis, http://www.3gpp.org/ftp/tsg_ran/wg1_rl1/TSGR1_56b/Docs/, Seoul, Korea, Mar. 23-27, 2009, 11 pages.
"R1-091599: HS-DPCCH Design for DC-HSDPA and MIMO," 3GPP TSG-RAN WG1 #56bis, http://www.3gpp.org/ftp/tsg_ran/wg1_rl1/TSGR1_56b/Docs/, Qualcomm Europe, Seoul, South Korea, Mar. 23-27, 2009, 21 pages.
"R1-091603: ACK/NACK Signaling for DC-HSDPA MIMO Operation," 3GPP TSG RAN WG1 Meeting #56bis, http://www.3gpp.org/ftp/tsg_ran/wg1_rl1/TSGR1_56b/Docs/, Ericsson, Seoul, Korea, Mar. 23-28, 2009, 9 pages.
"R1-091735: Performance Analysis of HS-DPCCH (ACK/NACK) Codes for DC-HSDPA and MIMO," 3GPP TSG-RAN WG1 #57, http://www.3gpp.org/ftp/tsg_ran/wg1_rl1/TSGR1_57/Docs/, Qualcomm Europe, San Francisco, USA, May 4-8, 2009, 17 pages.
"R1-091874 [sic: R1-091847]: Code Book Design for HARQ-ACK in DC-HSDPA with MIMO," 3GPP TSG RAN WG1 Meeting #57, http://www.3gpp.org/ftp/tsg_ran/wg1_rl1/TSGR1_57/Docs/, Huawei, San Francisco, USA, May 4-8, 2009, 19 pages.
"R1-091901: DC-HSDPA MIMO ACKNACK Codebook," 3GPP TSG RAN WG1 Meeting #57, http://www.3gpp.org/ftp/tsg_ran/wg1_rl1/TSGR1_57/Docs/, Ericsson, San Francisco, USA, May 4-8, 2009, 17 pages.
Decision on Grant, with Partial Translation, regarding Russian Patent Application No. 2011139990, dated Sep. 4, 2012, 30 pages.
Non-Final Office Action regarding U.S. Appl. No. 13/243,348, dated Jul. 23, 2012, 7 pages.
Partial Translation of Written Opinion of International Application No. PCT/CN2009/070623, dated Dec. 10, 2009, 4 pages.
Notice of Reasons for Rejection received in Japanese Application No. 2012-031356 mailed May 21, 2013, 4 pages.

* cited by examiner

SIGNAL ENCODING METHOD AND DEVICE, METHOD FOR ENCODING JOINT FEEDBACK SIGNAL

This application is a continuation of International Application No. PCT/CN2009/071639, filed on May 5, 2009, a continuation-in-part of International Application No. PCT/CN2009/070623, filed on Mar. 3, 2009, and a continuation-in-part of International Application No. PCT/CN2009/070805, filed on Mar. 16, 2009. All of the afore-mentioned international applications are hereby incorporated by reference in their entireties.

This application is related to U.S. application Ser. No. 12/983,036, filed Dec. 31, 2010 and now U.S. Pat. No. 7,966,541, which is also incorporated herein by reference.

TECHNICAL FIELD

The present invention relates to the field of communication technology, and more particularly, to a signal encoding method, a signal encoding device, and a method for encoding a joint feedback signal.

BACKGROUND

In a process of a Hybrid Automatic Repeat Request (HARM), a User Equipment (UE) monitors a High Speed-Shared Control Channel (HS-SCCH). If no data is received, the UE performs no action, which can be regarded as that the UE does not send information to a base station (Node B). In this case, the Node B considers that feedback information is discontinuous transmission (DTX) information. If data is received, data on a high speed-downlink shared channel (HS-DSCH) is detected according to control channel information. If the received data is correct, Acknowledgement (ACK) information is sent to the Node B. If the received data is incorrect, Negative Acknowledgement (NACK) information is sent to the Node B. The DTX, ACK, and NACK information are generally referred to as Hybrid Automatic Repeat Request-Acknowledgement (HARQ-ACK) information. The sent information is encoded and sent to the Node B through an uplink High Speed-Dedicated Physical Control Channel (HS-DPCCH). The Node B receives and decodes the feedback information. If the feedback information is ACK, new data is sent. If the feedback information is NACK, the data is retransmitted. If the feedback information is DTX, the new data is resent.

In the technology of Dual Carrier (Dual Cell)-High Speed Downlink Packet Access (DC-HSDPA), if downlink multi-carriers use two HS-DPCCH channels for feedback, a case that power is limited occurs, which influences the coverage. In order to save the power resources, in a case that the UE is not configured with Multiple-Input Multiple-Output (MIMO), a feasible technical solution is that two carriers of a dual-carrier only use one HS-DPCCH for information feedback. Thus, joint encoding needs to be performed on feedback information of the two carriers (cells). The encoding is to map various HARQ-ACK joint signals into a 0-1 sequence with 10 bits.

In Release 5 (R5) of the Technical Specification (TS) 25.212 in the 3rd Generation Partnership Project (3GPP) Protocol, an encoding scheme for a single-carrier configured with no MIMO is provided. In this case, three signals need to be fed back in total: ACK, NACK, and DTX. The ACK and NACK need to use a codeword, as shown in Table 1-1:

TABLE 1-1

HARQ-ACK Encoding Scheme for Single-Carrier Configured with No MIMO

| ACK  | 1 | 1 | 1 | 1 | 1 | 1 | 1 | 1 | 1 | 1 |
| NACK | 0 | 0 | 0 | 0 | 0 | 0 | 0 | 0 | 0 | 0 |

In Release 6 (R6) of the TS25.212 in the 3GPP Protocol, a preamble (PRE) and postamble (POST) sending mode is introduced to decrease transmit power of the UE, so that two new signals PRE and POST are introduced and codewords of the two signals are further used in Release 7 (R7) and Release 8 (R8).

In R7 of the TS25.212 in the 3GPP Protocol, an encoding scheme for a single-carrier configured with MIMO is provided. The scheme includes a single stream mode and a dual stream mode, in which three signals and five signals need to be fed back respectively. The signals fed back in the single stream mode are ACK, NACK, and DTX. The dual stream mode includes a stream 1 and a stream 2, and the fed back signals can be represented in the form of "stream 1 feedback signal_stream 2 feedback signal". Specifically, the signals fed back in the dual stream mode may be ACK_ACK, ACK_NACK, NACK_ACK, NACK_NACK, and DTX, where the DTX represents that feedback signals of the stream 1 and the stream 2 are DTX. Besides the DTX, the feedback scheme needs six codewords in total. When the PRE/POST sending mode is employed, the PRE/POST is the same as that in R6, as shown in Table 1-2.

TABLE 1-2

HARQ-ACK Encoding Scheme for Single-Carrier Configured with MIMO

| | Single Stream Mode (1 transmission block) | | | | | | | | | |
|---|---|---|---|---|---|---|---|---|---|---|
| ACK  | 1 | 1 | 1 | 1 | 1 | 1 | 1 | 1 | 1 | 1 |
| NACK | 0 | 0 | 0 | 0 | 0 | 0 | 0 | 0 | 0 | 0 |
| | Dual Stream Mode (2 transmission blocks) | | | | | | | | | |
| Stream 1 Feedback Signal | Stream 2 Feedback Signal | | | | | | | | | |
| ACK  | ACK  | 1 | 0 | 1 | 0 | 1 | 1 | 1 | 1 | 0 | 1 |
| ACK  | NACK | 1 | 1 | 0 | 1 | 0 | 1 | 0 | 1 | 1 | 1 |
| NACK | ACK  | 0 | 1 | 1 | 1 | 1 | 0 | 1 | 0 | 1 | 1 |
| NACK | NACK | 1 | 0 | 0 | 1 | 0 | 0 | 1 | 0 | 0 | 0 |
| | PRE/POST Indication Information | | | | | | | | | |
| PRE  | | 0 | 0 | 1 | 0 | 0 | 1 | 0 | 0 | 1 | 0 |
| POST | | 0 | 1 | 0 | 0 | 1 | 0 | 0 | 1 | 0 | 0 |

In R8 of the TS25.212 in the 3GPP Protocol, an encoding scheme for a dual-carrier configured with no MIMO is provided. The scheme needs to feed back nine signals, and eight codewords are required (the DTX does not need to use any codeword). When the PRE/POST sending mode is employed, the PRE/POST is the same as that in R6, as shown in Table 1-3:

TABLE 1-3

HARQ-ACK Encoding Scheme for Dual-Carrier Configured with No MIMO

| | The UE only detects data blocks on a primary carrier. | | | | | | | | | |
|---|---|---|---|---|---|---|---|---|---|---|
| ACK  | 1 | 1 | 1 | 1 | 1 | 1 | 1 | 1 | 1 | 1 |
| NACK | 0 | 0 | 0 | 0 | 0 | 0 | 0 | 0 | 0 | 0 |
| | The UE only detects data blocks on a secondary carrier. | | | | | | | | | |
| ACK  | 1 | 1 | 1 | 1 | 1 | 0 | 0 | 0 | 0 | 0 |
| NACK | 0 | 0 | 0 | 0 | 0 | 1 | 1 | 1 | 1 | 1 |
| | The UE detects data blocks on the two carriers at the same time. | | | | | | | | | |
| Primary Carrier Feedback Signal | Secondary Carrier Feedback Signal | | | | | | | | | |

TABLE 1-3-continued

HARQ-ACK Encoding Scheme for Dual-
Carrier Configured with No MIMO

| ACK | ACK | 1 | 0 | 1 | 0 | 1 | 0 | 1 | 0 | 1 | 0 |
|---|---|---|---|---|---|---|---|---|---|---|---|
| ACK | NACK | 1 | 1 | 0 | 0 | 1 | 1 | 0 | 0 | 1 | 1 |
| NACK | ACK | 0 | 0 | 1 | 1 | 0 | 0 | 1 | 1 | 0 | 0 |
| NACK | NACK | 0 | 1 | 0 | 1 | 0 | 1 | 0 | 1 | 0 | 1 |
| PRE/POST Indication Information |||||||||||||
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

Currently, research on a technology of combining DC-HSDPA with MIMO (DC-MIMO) has not started yet, and through research of on the prior art, the inventor found that if the prior art is employed to solve a DC-MIMO problem, the most direct method is to employ two code channels, each carrier using a code channel, and then the encoding scheme as shown in Table 1-2 is employed to each carrier. This method needs to consume too much of the power that is configured to feed back HARQ-ACK signals. Usually, the consumed power doubles that consumed by the single-carrier and a system cubic metric (CM) value is increased, which affects performance of the system.

SUMMARY OF THE INVENTION

Embodiments of the present invention are directed to methods for encoding joint feedback signals of two carriers and giving feedback on a code channel in a DC-MIMO mode.

In an embodiment of the present invention, a signal encoding method is provided, which includes the following steps.

When two carriers are configured with MIMO, HARQ-ACK signals of the two carriers are combined into a joint feedback signal.

According to a predetermined mapping relationship between signals and codewords, the joint feedback signal is mapped into a codeword.

In an embodiment of the present invention, a signal encoding device is provided, which includes a joint-feedback-signal synthesis module and an encoder module.

The joint-feedback-signal synthesis module is configured to, when two carriers are configured with MIMO, combine HARQ-ACK signals of the two carriers into a joint feedback signal.

The encoder module is configured to map the joint feedback signal into a codeword according to a predetermined mapping relationship between signals and codewords.

In an embodiment of the present invention, a method for encoding a joint feedback signal is provided, which includes the following steps.

A codebook structure satisfying a specific code distance relation or an equivalent codebook structure thereof is selected for each sending mode and joint feedback signals in each sending mode are encoded.

The sending mode specifically includes single stream-DTX, DTX-single stream, dual stream-DTX, DTX-dual stream, single stream-single stream, dual stream-single stream, single stream-dual stream, and dual stream-dual stream.

A type of a codebook structure corresponding to the single stream-DTX or DTX-single stream sending mode includes A-B or 2A. Codewords included in the codebook structure are A1 and B1 or A1 and A2, respectively.

A type of a codebook structure corresponding to the dual stream-DTX or DTX-dual stream sending mode includes 4A, or 3A-C, or 2A-2C, or A-B-2C, or A-B-C-D. Codewords included in the codebook structure are A1, A2, A3, A4; or A1, A2, A3, C1; or A1, A2, C1, C2; or A1, B1, C1, C2; or A1, B1, C1, D1, respectively.

A type of a codebook structure corresponding to the single stream-single stream sending mode includes 2A-2B-2C-2D, or A-B-5C-D, or 2A-2B-4C, or A-B-6C, or 2A-6C, or 4A-4C. Codewords included in the codebook structure are A1, A2, B1, B2, C1, C2, D1, D2; or A1, B1, C1, C2, C3, C4, C5, D1; or A1, A2, B1, B2, C1, C2, C3, C4; or A1, B1, C1, C2, C3, C4, C5, C6; or A1, A2, C1, C2, C3, C4, C5, C6; or A1, A2, A3, A4, C1, C2, C3, C4, respectively.

A type of a codebook structure corresponding to the dual stream-single stream or single stream-dual stream sending mode includes 6A-2B-6C, or 6A-B-6C-D, or 6A-3C-3D-E-F, or 4A-4B-3C-3D, or 4A-3B-6C-D, or {A1,A2,A5,A6}∪2B-3C-3D-E-F, or 6A-2B-2C-D∪{D3~D5}. Codewords included in the codebook structure are A1, A2, A3, A4, A5, A6, B1, B2, C1, C2, C3, C4, C5, C6; or A1, A2, A3, A4, A5, A6, B1, C1, C2, C3, C4, C5, C6, D1; or A1, A2, A3, A4, A5, A6, C1, C2, C3, D1, D2, D3, E1, F1; or A1, A2, A3, A4, B1, B2, B3, B4, C1, C2, C3, D1, D2, D3; or A1, A2, A3, A4, B1, B2, B3, C1, C2, C3, C4, C5, C6, D1; or A1, A2, A5, A6, B1, B2, C1, C2, C3, D1, D2, D3, E1, F1; or A1, A2, A3, A4, A5, A6, B1, B2, C1, C2, D1, D3, D4, D5, respectively.

A type of a codebook structure corresponding to the dual stream-dual stream sending mode includes 6A-6B-6C-6D. Codewords included in the codebook structure are A1, A2, A3, A4, A5, A6, B1, B2, B3, B4, B5, B6, C1, C2, C3, C4, C5, C6, D1, D2, D3, D4, D5, and D6. Alternatively, the type of the codebook structure corresponding to the dual stream-dual stream sending mode further includes a codebook structure formed of 24 codewords randomly selected from 16G-16H.

Code distance relations between all the codewords stated above are shown in Tables 1-4 to 1-9:

TABLE 1-4

|  | A1 | A2 | A3 | A4 | A5 | A6 | B1 | B2 | B3 | B4 | B5 | B6 |
|---|---|---|---|---|---|---|---|---|---|---|---|---|
| A1 | 0 | 6 | 6 | 6 | 6 | 6 | 10 | 4 | 4 | 4 | 4 | 4 |
| A2 | 6 | 0 | 6 | 6 | 6 | 6 | 4 | 10 | 4 | 4 | 4 | 4 |
| A3 | 6 | 6 | 0 | 6 | 6 | 6 | 4 | 4 | 10 | 4 | 4 | 4 |
| A4 | 6 | 6 | 6 | 0 | 6 | 6 | 4 | 4 | 4 | 10 | 4 | 4 |
| A5 | 6 | 6 | 6 | 6 | 0 | 6 | 4 | 4 | 4 | 4 | 10 | 4 |
| A6 | 6 | 6 | 6 | 6 | 6 | 0 | 4 | 4 | 4 | 4 | 4 | 10 |
| B1 | 10 | 4 | 4 | 4 | 4 | 4 | 0 | 6 | 6 | 6 | 6 | 6 |
| B2 | 4 | 10 | 4 | 4 | 4 | 4 | 6 | 0 | 6 | 6 | 6 | 6 |
| B3 | 4 | 4 | 10 | 4 | 4 | 4 | 6 | 6 | 0 | 6 | 6 | 6 |
| B4 | 4 | 4 | 4 | 10 | 4 | 4 | 6 | 6 | 6 | 0 | 6 | 6 |
| B5 | 4 | 4 | 4 | 4 | 10 | 4 | 6 | 6 | 6 | 6 | 0 | 6 |
| B6 | 4 | 4 | 4 | 4 | 4 | 10 | 6 | 6 | 6 | 6 | 6 | 0 |
| C1 | 5 | 5 | 5 | 5 | 5 | 5 | 5 | 5 | 5 | 5 | 5 | 5 |
| C2 | 5 | 5 | 5 | 5 | 5 | 5 | 5 | 5 | 5 | 5 | 5 | 5 |
| C3 | 5 | 5 | 5 | 5 | 5 | 5 | 5 | 5 | 5 | 5 | 5 | 5 |
| C4 | 5 | 5 | 5 | 5 | 5 | 5 | 5 | 5 | 5 | 5 | 5 | 5 |
| C5 | 5 | 5 | 5 | 5 | 5 | 5 | 5 | 5 | 5 | 5 | 5 | 5 |
| C6 | 5 | 5 | 5 | 5 | 5 | 5 | 5 | 5 | 5 | 5 | 5 | 5 |
| D1 | 5 | 5 | 5 | 5 | 5 | 5 | 5 | 5 | 5 | 5 | 5 | 5 |
| D2 | 5 | 5 | 5 | 5 | 5 | 5 | 5 | 5 | 5 | 5 | 5 | 5 |
| D3 | 5 | 5 | 5 | 5 | 5 | 5 | 5 | 5 | 5 | 5 | 5 | 5 |
| D4 | 5 | 5 | 5 | 5 | 5 | 5 | 5 | 5 | 5 | 5 | 5 | 5 |
| D5 | 5 | 5 | 5 | 5 | 5 | 5 | 5 | 5 | 5 | 5 | 5 | 5 |
| D6 | 5 | 5 | 5 | 5 | 5 | 5 | 5 | 5 | 5 | 5 | 5 | 5 |

TABLE 1-5

|  | C1 | C2 | C3 | C4 | C5 | C6 | D1 | D2 | D3 | D4 | D5 | D6 |
|---|---|---|---|---|---|---|---|---|---|---|---|---|
| A1 | 5 | 5 | 5 | 5 | 5 | 5 | 5 | 5 | 5 | 5 | 5 | 5 |
| A2 | 5 | 5 | 5 | 5 | 5 | 5 | 5 | 5 | 5 | 5 | 5 | 5 |
| A3 | 5 | 5 | 5 | 5 | 5 | 5 | 5 | 5 | 5 | 5 | 5 | 5 |
| A4 | 5 | 5 | 5 | 5 | 5 | 5 | 5 | 5 | 5 | 5 | 5 | 5 |
| A5 | 5 | 5 | 5 | 5 | 5 | 5 | 5 | 5 | 5 | 5 | 5 | 5 |
| A6 | 5 | 5 | 5 | 5 | 5 | 5 | 5 | 5 | 5 | 5 | 5 | 5 |
| B1 | 5 | 5 | 5 | 5 | 5 | 5 | 5 | 5 | 5 | 5 | 5 | 5 |
| B2 | 5 | 5 | 5 | 5 | 5 | 5 | 5 | 5 | 5 | 5 | 5 | 5 |
| B3 | 5 | 5 | 5 | 5 | 5 | 5 | 5 | 5 | 5 | 5 | 5 | 5 |
| B4 | 5 | 5 | 5 | 5 | 5 | 5 | 5 | 5 | 5 | 5 | 5 | 5 |
| B5 | 5 | 5 | 5 | 5 | 5 | 5 | 5 | 5 | 5 | 5 | 5 | 5 |
| B6 | 5 | 5 | 5 | 5 | 5 | 5 | 5 | 5 | 5 | 5 | 5 | 5 |

TABLE 1-5-continued

|     | C1 | C2 | C3 | C4 | C5 | C6 | D1 | D2 | D3 | D4 | D5 | D6 |
|-----|----|----|----|----|----|----|----|----|----|----|----|----|
| C1  | 0  | 6  | 6  | 6  | 6  | 6  | 10 | 4  | 4  | 4  | 4  | 4  |
| C2  | 6  | 0  | 6  | 6  | 6  | 6  | 4  | 10 | 4  | 4  | 4  | 4  |
| C3  | 6  | 6  | 0  | 6  | 6  | 6  | 4  | 4  | 10 | 4  | 4  | 4  |
| C4  | 6  | 6  | 6  | 0  | 6  | 6  | 4  | 4  | 4  | 10 | 4  | 4  |
| C5  | 6  | 6  | 6  | 6  | 0  | 6  | 4  | 4  | 4  | 4  | 10 | 4  |
| C6  | 6  | 6  | 6  | 6  | 6  | 0  | 4  | 4  | 4  | 4  | 4  | 10 |
| D1  | 10 | 4  | 4  | 4  | 4  | 4  | 0  | 6  | 6  | 6  | 6  | 6  |
| D2  | 4  | 10 | 4  | 4  | 4  | 4  | 6  | 0  | 6  | 6  | 6  | 6  |
| D3  | 4  | 4  | 10 | 4  | 4  | 4  | 6  | 6  | 0  | 6  | 6  | 6  |
| D4  | 4  | 4  | 4  | 10 | 4  | 4  | 6  | 6  | 6  | 0  | 6  | 6  |
| D5  | 4  | 4  | 4  | 4  | 10 | 4  | 6  | 6  | 6  | 6  | 0  | 6  |
| D6  | 4  | 4  | 4  | 4  | 4  | 10 | 6  | 6  | 6  | 6  | 6  | 0  |

TABLE 1-6

|    | A1 | A2 | A3 | A4 | A5 | A6 | C1 | C2 | C3 | D1 | D2 | D3 | E1 | F1 |
|----|----|----|----|----|----|----|----|----|----|----|----|----|----|----|
| E1 | 6  | 6  | 6  | 4  | 4  | 4  | 5  | 5  | 5  | 5  | 5  | 5  | —  | 10 |
| F1 | 4  | 4  | 4  | 6  | 6  | 6  | 5  | 5  | 5  | 5  | 5  | 5  | 10 | —  |

TABLE 1-7

|     | G1 | G2 | G3 | G4 | G5 | G6 | G7 | G8 | G9 | G10 | G11 | G12 | G13 | G14 | G15 | G16 |
|-----|----|----|----|----|----|----|----|----|----|-----|-----|-----|-----|-----|-----|-----|
| G1  | 0  | 6  | 6  | 6  | 6  | 6  | 6  | 6  | 6  | 6   | 6   | 6   | 6   | 6   | 6   | 6   |
| G2  | 6  | 0  | 6  | 6  | 6  | 6  | 6  | 6  | 6  | 6   | 4   | 4   | 4   | 4   | 4   | 4   |
| G3  | 6  | 6  | 0  | 6  | 6  | 6  | 6  | 4  | 4  | 4   | 6   | 4   | 6   | 4   | 6   | 4   |
| G4  | 6  | 6  | 6  | 0  | 6  | 6  | 4  | 6  | 4  | 4   | 6   | 4   | 4   | 6   | 4   | 6   |
| G5  | 6  | 6  | 6  | 6  | 0  | 6  | 4  | 4  | 6  | 4   | 4   | 6   | 6   | 4   | 4   | 6   |
| G6  | 6  | 6  | 6  | 6  | 6  | 0  | 4  | 4  | 4  | 6   | 4   | 6   | 4   | 6   | 6   | 4   |
| G7  | 6  | 6  | 6  | 4  | 4  | 4  | 0  | 6  | 6  | 6   | 6   | 4   | 6   | 4   | 6   | 4   |
| G8  | 6  | 6  | 4  | 6  | 4  | 4  | 6  | 0  | 6  | 6   | 6   | 4   | 4   | 6   | 4   | 6   |
| G9  | 6  | 6  | 4  | 4  | 6  | 4  | 6  | 6  | 0  | 6   | 4   | 6   | 6   | 4   | 4   | 6   |
| G10 | 6  | 6  | 4  | 4  | 4  | 6  | 6  | 6  | 6  | 0   | 4   | 6   | 4   | 6   | 6   | 4   |
| G11 | 6  | 4  | 6  | 6  | 4  | 4  | 6  | 6  | 4  | 4   | 0   | 6   | 6   | 6   | 6   | 6   |
| G12 | 6  | 4  | 4  | 4  | 6  | 6  | 4  | 4  | 6  | 6   | 4   | 0   | 6   | 6   | 6   | 6   |
| G13 | 6  | 4  | 6  | 4  | 6  | 4  | 6  | 4  | 6  | 4   | 6   | 6   | 0   | 4   | 6   | 6   |
| G14 | 6  | 4  | 4  | 6  | 4  | 6  | 4  | 6  | 4  | 6   | 6   | 6   | 4   | 0   | 6   | 6   |
| G15 | 6  | 4  | 6  | 4  | 4  | 6  | 6  | 4  | 4  | 6   | 6   | 6   | 6   | 6   | 0   | 4   |
| G16 | 6  | 4  | 4  | 6  | 6  | 4  | 4  | 6  | 6  | 4   | 6   | 6   | 6   | 6   | 4   | 0   |

TABLE 1-8

|     | H1 | H2 | H3 | H4 | H5 | H6 | H7 | H8 | H9 | H10 | H11 | H12 | H13 | H14 | H15 | H16 |
|-----|----|----|----|----|----|----|----|----|----|-----|-----|-----|-----|-----|-----|-----|
| H1  | 0  | 6  | 6  | 6  | 6  | 6  | 6  | 6  | 6  | 6   | 6   | 6   | 6   | 6   | 6   | 6   |
| H2  | 6  | 0  | 6  | 6  | 6  | 6  | 6  | 6  | 6  | 6   | 4   | 4   | 4   | 4   | 4   | 4   |
| H3  | 6  | 6  | 0  | 6  | 6  | 6  | 6  | 4  | 4  | 4   | 6   | 4   | 6   | 4   | 6   | 4   |
| H4  | 6  | 6  | 6  | 0  | 6  | 6  | 4  | 6  | 4  | 4   | 6   | 4   | 4   | 6   | 4   | 6   |
| H5  | 6  | 6  | 6  | 6  | 0  | 6  | 4  | 4  | 6  | 4   | 4   | 6   | 6   | 4   | 4   | 6   |
| H6  | 6  | 6  | 6  | 6  | 6  | 0  | 4  | 4  | 4  | 6   | 4   | 6   | 4   | 6   | 6   | 4   |
| H7  | 6  | 6  | 6  | 4  | 4  | 4  | 0  | 6  | 6  | 6   | 6   | 4   | 6   | 4   | 6   | 4   |
| H8  | 6  | 6  | 4  | 6  | 4  | 4  | 6  | 0  | 6  | 6   | 6   | 4   | 4   | 6   | 4   | 6   |
| H9  | 6  | 6  | 4  | 4  | 6  | 4  | 6  | 6  | 0  | 6   | 4   | 6   | 6   | 4   | 4   | 6   |
| H10 | 6  | 6  | 4  | 4  | 4  | 6  | 6  | 6  | 6  | 0   | 4   | 6   | 4   | 6   | 6   | 4   |
| H11 | 6  | 4  | 6  | 6  | 4  | 4  | 6  | 6  | 4  | 4   | 0   | 6   | 6   | 6   | 6   | 6   |
| H12 | 6  | 4  | 4  | 4  | 6  | 6  | 4  | 4  | 6  | 6   | 4   | 0   | 6   | 6   | 6   | 6   |
| H13 | 6  | 4  | 6  | 4  | 6  | 4  | 6  | 4  | 6  | 4   | 6   | 6   | 0   | 4   | 6   | 6   |
| H14 | 6  | 4  | 4  | 6  | 4  | 6  | 4  | 6  | 4  | 6   | 6   | 6   | 4   | 0   | 6   | 6   |
| H15 | 6  | 4  | 6  | 4  | 4  | 6  | 6  | 4  | 4  | 6   | 6   | 6   | 6   | 6   | 0   | 4   |
| H16 | 6  | 4  | 4  | 6  | 6  | 4  | 4  | 6  | 6  | 4   | 6   | 6   | 6   | 6   | 4   | 0   |

TABLE 1-9

|     | H1 | H2 | H3 | H4 | H5 | H6 | H7 | H8 | H9 | H10 | H11 | H12 | H13 | H14 | H15 | H16 |
|-----|----|----|----|----|----|----|----|----|----|-----|-----|-----|-----|-----|-----|-----|
| G1  | 10 | 4  | 4  | 4  | 4  | 4  | 4  | 4  | 4  | 4   | 4   | 4   | 4   | 4   | 4   | 4   |
| G2  | 4  | 10 | 4  | 4  | 4  | 4  | 4  | 4  | 4  | 4   | 6   | 6   | 6   | 6   | 6   | 6   |
| G3  | 4  | 4  | 10 | 4  | 4  | 4  | 4  | 6  | 6  | 6   | 4   | 6   | 4   | 6   | 4   | 6   |
| G4  | 4  | 4  | 4  | 10 | 4  | 4  | 6  | 4  | 6  | 6   | 4   | 6   | 6   | 4   | 6   | 4   |
| G5  | 4  | 4  | 4  | 4  | 10 | 4  | 6  | 6  | 4  | 6   | 6   | 4   | 4   | 6   | 6   | 4   |
| G6  | 4  | 4  | 4  | 4  | 4  | 10 | 6  | 6  | 6  | 4   | 6   | 4   | 6   | 4   | 4   | 6   |
| G7  | 4  | 4  | 4  | 6  | 6  | 6  | 10 | 4  | 4  | 4   | 4   | 6   | 4   | 6   | 4   | 6   |
| G8  | 4  | 4  | 6  | 4  | 6  | 6  | 4  | 10 | 4  | 4   | 4   | 6   | 6   | 4   | 6   | 4   |
| G9  | 4  | 4  | 6  | 6  | 4  | 6  | 4  | 4  | 10 | 4   | 6   | 4   | 4   | 6   | 6   | 4   |
| G10 | 4  | 4  | 6  | 6  | 6  | 4  | 4  | 4  | 4  | 10  | 6   | 4   | 6   | 4   | 4   | 6   |
| G11 | 4  | 6  | 4  | 4  | 6  | 6  | 4  | 4  | 6  | 6   | 10  | 6   | 4   | 4   | 4   | 4   |
| G12 | 4  | 6  | 6  | 6  | 4  | 4  | 6  | 6  | 4  | 4   | 6   | 10  | 4   | 4   | 4   | 4   |
| G13 | 4  | 6  | 4  | 6  | 4  | 6  | 4  | 6  | 4  | 6   | 4   | 4   | 10  | 6   | 4   | 4   |

TABLE 1-9-continued

| | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| G14 | 4 | 6 | 6 | 4 | 6 | 4 | 6 | 4 | 6 | 4 | 4 | 4 | 6 | 10 | 4 | 4 |
| G15 | 4 | 6 | 4 | 6 | 6 | 4 | 4 | 6 | 6 | 4 | 4 | 4 | 4 | 4 | 10 | 6 |
| G16 | 4 | 6 | 6 | 4 | 4 | 6 | 6 | 4 | 4 | 6 | 4 | 4 | 4 | 4 | 6 | 10 |

The values in Tables 1-4 to 1-9 represent code distances among corresponding codewords.

In the embodiments of the present invention, a method is provided for joint encoding of feedback signals of two carriers and transmitting the encoded feedback signal on a code channel in a DC-MIMO mode. In this encoding method, the system has lower bit error ratio (BER) and detection error cost, so that power overhead is saved and a CM value of the system is not affected, thereby enhancing the performance of the system.

DETAILED DESCRIPTION OF ILLUSTRATIVE EMBODIMENTS

A first embodiment of a signal encoding method of the present invention is illustrated below.

Figure 1:
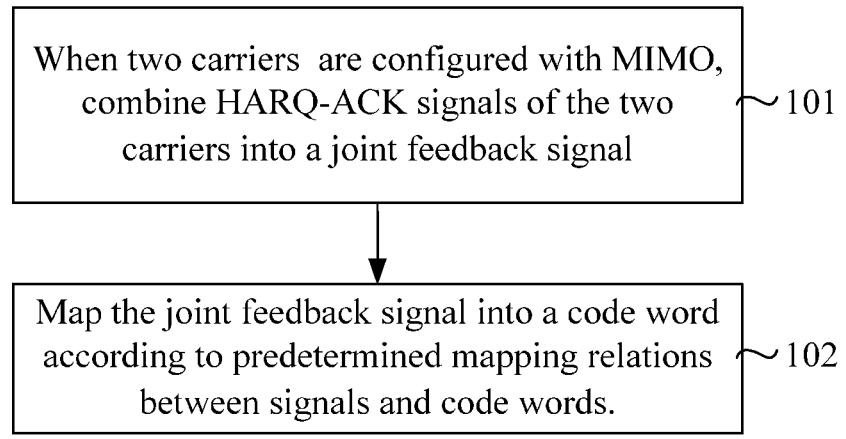
FIG. 1 is a flow chart of a signal encoding method according to a first embodiment of the present invention.

FIG. 1 is a flow chart of the signal encoding method according to a first embodiment of the present invention. As shown in FIG. 1, the method specifically includes the following steps.

In Step 101, when two carriers are configured with MIMO, HARQ-ACK signals of the two carriers are combined into a joint feedback signal.

In Step 102, according to a predetermined mapping relationship between signals and codewords, the joint feedback signal is mapped into a codeword.

Step 101 may specifically be as follows: The HARQ-ACK signals of the two carriers in the dual-carrier are combined into carrier feedback signals corresponding to the carriers, respectively. Specifically, if each carrier bears a plurality of signal streams, the HARQ-ACK signals of each carrier are combined into a carrier feedback signal. Taking a dual stream as an example, that is, HARQ-ACK signals of two streams of each carrier are combined into a carrier feedback signal. The two carrier feedback signals are then combined into a joint feedback signal.

In this embodiment, a method for encoding feedback signals of two carriers in a DC-MIMO mode is provided, where a single-code channel is employed, so that power overhead is saved and a CM value of the system is not affected, thereby enhancing the performance of the system.

A second embodiment of a signal encoding method of the present invention is illustrated below.

Figure 2:
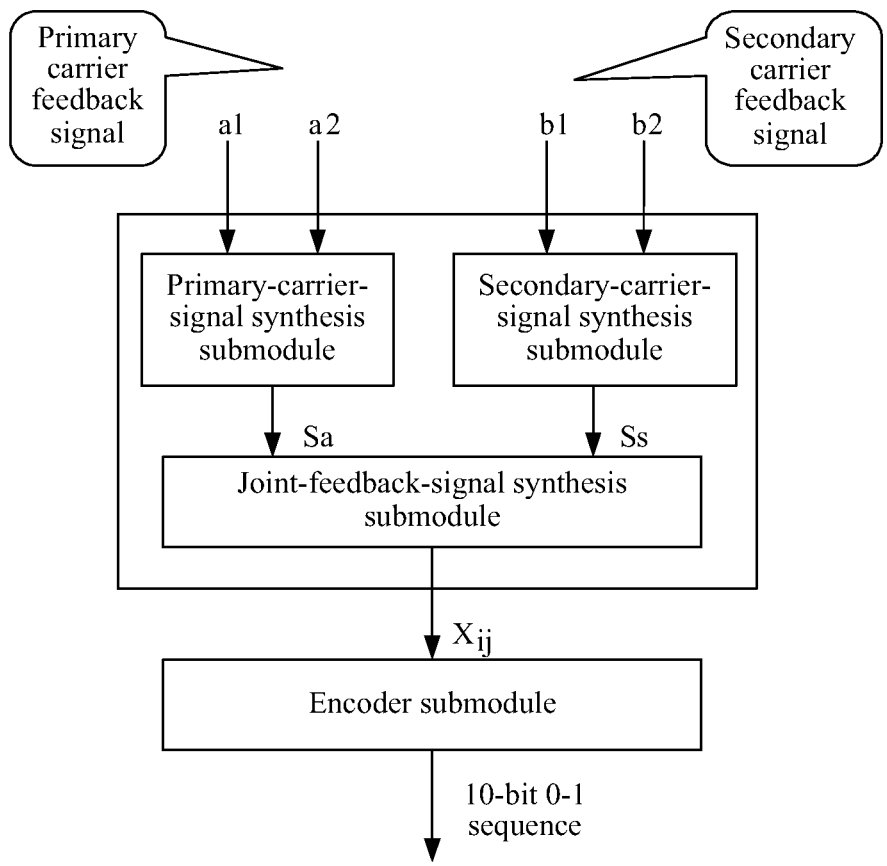
FIG. 2 is a schematic structural of an HARQ-ACK joint encoder to which a second embodiment of a signal encoding method is applicable according to the present invention.

FIG. 2 is a schematic structural of an HARQ-ACK joint encoder to which the second embodiment of the signal encoding method is applicable according to the present invention. In a DC-MIMO mode, a Node B at most sends user data to UE on both Primary and Secondary carriers at the same time and the carriers both employ the MIMO technology. In other words, the UE at most receives data of four streams on the two carriers. After receiving the data, the UE needs to give feedback (the feedback information includes DTX, ACK, and NACK) according to data reception cases, respectively. The UE integrates the feedback information of the two carriers and encodes the feedback information into a 10-bit 0-1 sequence, which is fed back to the Node B through an HS-DPCCH. The Node B selects a decoding space according to the sending mode and performs decoding.

Firstly, the HARQ-ACK signals of the two carriers are combined into carrier feedback signals corresponding to the carriers, respectively. The process is specifically described below.

As shown in FIG. 2, a Primary-carrier-signal synthesis submodule and a Secondary-carrier-signal synthesis submodule combine HARQ-ACK signals on a Primary carrier and a Secondary carrier into carrier feedback signals corresponding to the carriers, respectively. That is to say, functions of the two submodules are configured to map feedback signals for two data streams on a carrier into a carrier feedback signal, respectively. Each carrier has two data sending modes, namely, a single stream mode and a dual stream mode. In the single stream mode, feedback is not given for the first stream (that is, the feedback signal for the first stream is DTX by default) and the feedback signal only gives feedback for the second stream.

A set of feedback signals for each stream of each carrier is {DTX, ACK, NACK}, so that a set of carrier feedback signals for each carrier is {DTX, ACK, NACK, ACK_ACK, ACK_NACK, NACK_ACK, NACK_NACK}. The ACK_ACK represents that the feedback signal for the first stream on the carrier is ACK and the feedback signal for the second stream is ACK. The carrier feedback signals are numbered, respectively, and for details, reference can be made to Table 1-10. Table 1-10 shows a mapping relationship between carrier feedback signals and numbers in the MIMO mode.

TABLE 1-10

Mapping Relationship Between Carrier Feedback Signals and Numbers in MIMO Mode

| Carrier Feedback Signal | Single Stream | | Single Stream/Dual Stream | Dual Stream | | | |
|---|---|---|---|---|---|---|---|
| | ACK | NACK | DTX | ACK_ACK | ACK_NACK | NACK_ACK | NACK_NACK |
| Number | 1 | 2 | 0 | 3 | 4 | 5 | 6 |

For mapping process of combining the feedback signals of the two streams into a carrier feedback signal, reference can be made to in Table 1-11.

TABLE 1-11

Mapping Relationship Between Carrier Feedback Signals and Feedback Signals of Two Streams

|  |  | Feedback Signal of Second Stream | | |
|---|---|---|---|---|
|  |  | DTX(=0) | ACK(=1) | NACK(=2) |
| Feedback Signal of First Stream | DTX(=0) | DTX(=0) | ACK(=1) | NACK(=2) |
|  | ACK(=1) | — | ACK_ACK(=3) | ACK_NACK(=4) |
|  | NACK(=2) | — | NACK_ACK(=5) | NACK_NACK(=6) |

The "=" in Table 1-11 represents a corresponding relation between a feedback signal and a number.

S1 and S2 represent numbers corresponding to feedback signals of the first stream and the second stream, respectively, S represents a number corresponding to the carrier feedback signal, and S=2*S1+S2.

It is assumed that a carrier feedback signal can be represented by a two-dimensional vector, S=(S1, S2), which corresponds to the feedback signals, for example, ACK=(DTX, ACK) and ACK_NACK=(ACK, NACK).

The mapping relationships shown in Tables 1-10 and 1-11 are merely specific examples, and the embodiment is not limited to the mapping relationships shown in Tables 1-10 and 1-11, and other schemes may also be employed.

Secondly, the two carrier feedback signals are combined into a joint feedback signal. The process is specifically described below.

As shown in FIG. 2, the joint-feedback-signal synthesis submodule combines the feedback signals of the two carriers into a joint feedback signal, that is to say, the UE integrates the feedback signals of the two carriers into a joint feedback signal, and an encoder submodule further encodes the joint feedback signal, namely, mapping the joint feedback signal into a 10-bit 0-1 sequence. When the feedback signals of two carriers are both DTX, the joint signal is not mapped to a codeword or it is regarded that the joint signal is mapped into DTX.

Sa and Ss represent numbers corresponding to a feedback signal of a primary carrier and a feedback signal of a secondary carrier, respectively; a1 and a2 represent feedback signals of the first stream and the second stream on the primary carrier; and b1 and b2 represent feedback signals of the first stream and the second stream on the secondary carrier, respectively. For ease of illustration, one joint feedback signal can be represented by a four-dimensional vector, for example, Sig=(a1, a2, b1, b2), or represented by a two-dimensional vector, for example, Sig=(Sa, Ss), in which signals corresponding to a1, a2, b1, b2∈{DTX, ACK, NACK}, signals corresponding to Sa, Ss∈{DTX, ACK, NACK, ACK_ACK, ACK_NACK, NACK_ACK, NACK_NACK}, and Sa=2a1+a2, Ss=2b1+b2.

Assume Sa=i, Ss=j, so that the joint feedback signal is represented as $X_{ij}$. The primary carrier feedback signal of the joint feedback signal is a signal corresponding to the number i, and the secondary carrier feedback signal of the joint feedback signal is a signal corresponding to the number j, in which $0 \leq i \leq 6$, $0 \leq j \leq 6$. The signals corresponding to the numbers 0-6 are DTX, ACK, NACK, ACK_ACK, ACK_NACK, NACK_ACK, and NACK_NACK in sequence, or simplified into D, A, N, AA, AN, NA, and NN. For example, $X_{34}$ represents that the primary carrier sends a signal numbered as number 3 and the secondary carrier sends a signal numbered as number 4, that is, ACK_ACK/ACK_NACK, which is simplified as AA/AN.

For the mapping process of combining the two carrier feedback signals into a joint feedback signal, reference can be made to Table 1-12.

TABLE 1-12

Mapping Relationship Between Two Carrier Feedback Signals and Joint Feedback Signal

|  |  | Secondary | | | | | | |
|---|---|---|---|---|---|---|---|---|
|  |  | Single Stream | | Single/Dual Stream | Dual Stream | | | |
| Primary |  | ACK | NACK | DTX | ACK_ACK | ACK_NACK | NACK_ACK | NACK_NACK |
| Single Stream | ACK | $X_{11}$ | $X_{12}$ | $X_{10}$ | $X_{13}$ | $X_{14}$ | $X_{15}$ | $X_{16}$ |
|  | NACK | $X_{21}$ | $X_{22}$ | $X_{20}$ | $X_{23}$ | $X_{24}$ | $X_{25}$ | $X_{26}$ |
| Single/Dual Stream | DTX | $X_{01}$ | $X_{02}$ | $X_{00}$ | $X_{03}$ | $X_{04}$ | $X_{05}$ | $X_{06}$ |
| Dual Stream | ACK_ACK | $X_{31}$ | $X_{32}$ | $X_{30}$ | $X_{33}$ | $X_{34}$ | $X_{35}$ | $X_{36}$ |
|  | ACK_NACK | $X_{41}$ | $X_{42}$ | $X_{40}$ | $X_{43}$ | $X_{44}$ | $X_{45}$ | $X_{46}$ |
|  | NACK_ACK | $X_{51}$ | $X_{52}$ | $X_{50}$ | $X_{53}$ | $X_{54}$ | $X_{55}$ | $X_{56}$ |
|  | NACK_NACK | $X_{61}$ | $X_{62}$ | $X_{60}$ | $X_{63}$ | $X_{64}$ | $X_{65}$ | $X_{66}$ |

In DC-MIMO mode, a data sending mode for the Node B on a carrier includes: sending no data on the carrier so that the feedback signal is DTX; using an MIMO single stream mode on the carrier; and using an MIMO dual stream mode on the carrier. Therefore, nine combinations of data sending modes for the Node B on the two carriers include DTX-DTX, single stream-DTX, DTX-single stream, single stream-single stream, dual stream-DTX, DTX-dual stream, dual stream-single stream, single stream-dual stream, and dual stream-dual stream mode. In the DTX-DTX, no data is sent, so that the effective data sending modes are the remaining eight combinations except for the DTX-DTX mode. A signal space in each combination of the sending modes corresponds to an area in Table 1-12. For example, a signal space corresponding to the dual stream-dual stream sending mode is a set of signals in a 5*5 matrix at the bottom right corner of Table 1-12, and the remaining sending modes may be deduced by analogy.

Thirdly, the joint feedback signal is mapped into a codeword according to a predetermined mapping relationship between signals and codewords. The process is specifically described in the following.

In this step, the encoder submodule maps the joint feedback signal into a 10-bit 0-1 sequence, that is, a codeword.

A mapping table of joint feedback signals and specific codewords needs to be provided for the mapping of the joint feedback signal into the codeword. A codeword corresponding to the input joint feedback signal is found by looking up the provided signal-codeword mapping table, and then the codeword is output.

The mapping table of joint feedback signals and codewords may be provided in the following manner. A codebook structure satisfying a certain code distance relation is found for each sending mode and a mapping relationship between each sending mode and a codeword of the codebook structure is established, so as to obtain a mapping relationship between the signal in Table 1-12 and a specific codeword.

First, in the process of searching for a codebook structure, a performance evaluation index of an encoding scheme may be considered, which includes BER and detection error cost. The encoding design is intended to minimize the BER and the detection error cost by selecting a suitable codebook structure and a suitable mapping scheme.

The BER includes a single-code BER and a system BER. The single-code BER denotes a probability that signals $X_{ij}$ sent by UE are incorrectly decoded into other signals by the Node B, and the system BER denotes a weighted average value of the single-code BER, which are shown in the following two formulations:

$$\text{Single-code } BER: Pe(S) = 1 - Pt(S, S) \quad \text{(Eq. 1)}$$

$$\text{System } BER: Pe(\Omega) = \sum_{S \in \Omega} P_{gen}(S) \cdot Pe(S) \quad \text{(Eq. 2)}$$

where $\Omega$ represents a signal space in a certain sending mode, $P_{gen}(S)$ represents a probability that a signal S occurs in a certain sending mode, and Pt(S, S) represents a probability that sent signals S are correctly decoded into S.

The detection error cost denotes cost additionally caused by incorrect decoding of the signal. Time cost is mainly considered herein, which is embodied in decrease of a transmission rate due to retransmission in a radio link control (RLC) layer or a physical layer. The signal detection error cost can be referred to in Table 1-13.

TABLE 1-13

Signal Detection Error Cost

|  |  | Signal after being decoded by Node B | | |
|---|---|---|---|---|
|  |  | ACK | NACK | DTX |
| Signal sent by UE | ACK | $C_{11} = 0$ | $C_{12} = L$ | $C_{10} = L$ |
|  | NACK | $C_{21} = H$ | $C_{22} = 0$ | $C_{20} = 0$ |
|  | DTX | $C_{01} = H$ | $C_{02} = 0$ | $C_{00} = 0$ |

In Table 1-13, $C_{ij}$ represents cost that a signal numbered as i is detected to be a signal numbered as j ($C_{ij}$ may also be depicted as C(i, j)), H represents cost of retransmission in the RLC layer caused by signal detection error, L represents cost of retransmission in the physical layer caused by signal detection error, and 0 represents no cost. H and L may be regarded as constants, and H is much larger than L, for example, H≈10L.

Assume signals S=(Sa1, Sa2, Sb1, Sb2) and R=(Ra1, Ra2, Rb1, Rb2), so that the detection error cost Cost(S, R) that S is detected to be R may be calculated through the following formulation:

$$\text{Cost}(S,R)=C(Sa1,Ra1)+C(Sa2,Ra2)+C(Sb1,Rb1)+C(Sb2,Rb2) \quad \text{(Eq. 3)}$$

Assume that Pt(S, R) represents a probability that the sent signal S is received as R. When neither of S and R is DTX, it can be basically regarded that Pt(S, R) is a function of code distances of codewords corresponding to the signals, that is, Pt(S, R)=f(d(S, R)). When S=DTX and R≠DTX, Pt(S, R)=Pt (DTX, R)=Pf, which is a false alarm probability. When S≠DTX and R=DTX, Pt(S, R)=Pt(S, DTX)=Pm, which is a false dismissal probability. In predetermined conditions, pairwise error probability, false alarm probability, and false dismissal probability of the codewords can be obtained simulatively through a computer.

Therefore, a total detection error cost Pr during operation of the system in a certain sending mode is obtained by:

$$Pr = \sum_{S \in \Omega} P_{gen}(S) \cdot \sum_{\substack{S \in \Omega \\ R \neq S}} Pt(S, R) \cdot \text{Cost}(S, R) \quad \text{(Eq. 4)}$$

where $\Omega$ represents a signal space in the sending mode.

According to the calculation method of the BER and the detection error cost, in the embodiments of the present invention, codebook structures of smaller BER and detection error cost are selected. Codewords included in the codebook structures are A1~A6, B1~B6, C1~C6, D1~D6, E1, F1, G1~G16, and H1~H16. Each codeword is a 10-bit 0-1 sequence. Code distance relations between the codewords in the codebook structures can be referred to in Tables 1-4 to 1-9.

According to the codewords defined above, a mapping relationship between sending modes and codebook structures may be established, for example, as shown in Table 1-14.

TABLE 1-14

Mapping Relationship Between Sending Modes and Codebook Structures

| Mode | Optional Codebook Structure |
|---|---|
| Single Stream-DTX DTX-Single Stream | A-B or 2A . . . |
| Dual Stream-DTX DTX-Dual Stream | 4A or 3A-C or 2A-2C or A-B-2C or A-B-C-D . . . |
| Single Stream-Single Stream | 2A-2B-2C-2D or A-B-5C-D or 2A-2B-4C or A-B-6C or 2A-6C or 4A-4C . . . |
| Dual Stream-Single Stream | 6A-2B-6C or 6A-B-6C-D or 6A-3C-3D-E-F or |
| Single Stream-Dual Stream | 4A-4B-3C-3D, 4A-3B-6C-D or {A1, A2, A5, A6} U2B-3C-3D-E-F or 6A-2B-2C-D U{D3~D5} . . . |
| Dual Stream-Dual Stream | 6A-6B-6C-6D, xG-yH (x + y = 24) . . . |

In Table 1-14, the expression xA-yB-zC-uD- . . . = {A1~Ax, B1~By, C1~Cz, D1~Du, . . . } represents a codebook structure. If the coefficient is 0, the corresponding item is omitted, for example, 4A={A1, A2, A3, A4}; 6A-3C-3D-E-F={A1, A2, A3, A4, A5, A6, C1, C2, C3, D1, D2, D3, E1, F1}, and the rest may be deduced by analogy.

Furthermore, each codebook structure corresponding to the sending mode has a plurality of equivalent codebook structures. The so-called "equivalent" means that if code distance matrices formed by codewords in the two codebook structures arranged according to a certain sequence are identical, the two codebook structures are referred to as equivalent codebook structures, and the specific definition is as follows:

If codebook structures $\{X_i\}$ and $\{Y_j\}$ are equivalent, a mapping relationship $\varphi:\{X_i\} \rightarrow \{Y_j\}$ exists, which satisfies $d(X_i, Y_j)=d(\varphi(X_i), \varphi(Y_j))$, where $d(X_i, Y_j)$ is a code distance between $X_i$ and $Y_j$.

For example, an equivalent codebook structure of the codebook structure A-B may be C-D or E-F, and an equivalent codebook structure of the codebook structure A-B-6C may be 6A-C-D, in which as mapping is performed one by one according to predetermined sequences {A1, B1, C1, C2, C3, C4, C5, C6} and {C1, D1, A1, A2, A3, A4, A5, A6}, the formed code distance matrices are the same.

As long as the formed code distance matrices are the same, the performances of the schemes obtained for the two codebook structures when mapped with the signals are the same, so that any two equivalent codebook structures can be regarded as the same codebook structure type. A codebook structure type may be represented by a random codebook structure of this type. For example, if A-B, C-D, and E-F are equivalent to each other and are of the same codebook structure type, a random codebook structure of A-B, C-D, and E-F can be used to represent the codebook structure type. In a determined encoding scheme, each mode is uniquely corresponding to a codebook structure type.

That is to say, codewords included in the codebook structure corresponding to the single stream-DTX or DTX-single stream sending mode are A1 and B1, or A1 and A2, or codebook structures equivalent to the codebook structure. Codewords included in the codebook structure corresponding to the dual stream-DTX or DTX-dual stream sending mode are A1, A2, A3, and A4, or A1, A2, A3, and C1, or A1, A2, C1, and C2, or A1, B1, C1, and C2, or A1, B1, C1, and D1, or codebook structures equivalent to the codebook structure. Codewords included in the codebook structure corresponding to the single stream-single stream sending mode are A1, A2, B1, B2, C1, C2, D1, and D2, or A1, B1, C1, C2, C3, C4, C5, and D1, or A1, A2, B1, B2, C1, C2, C3, and C4, or A1, B1, C1, C2, C3, C4, C5, and C6, or A1, A2, C1, C2, C3, C4, C5, and C6, or A1, A2, A3, A4, C1, C2, C3, and C4, or codebook structures equivalent to the codebook structure. Codewords included in the codebook structure corresponding to the dual stream-single stream or single stream-dual stream sending mode are A1, A2, A3, A4, A5, A6, B1, B2, C1, C2, C3, C4, C5, and C6, or A1, A2, A3, A4, A5, A6, B1, C1, C2, C3, C4, C5, C6, and D1, or A1, A2, A3, A4, A5, A6, C1, C2, C3, D1, D2, D3, E1, and F1, or A1, A2, A3, A4, B1, B2, B3, B4, C1, C2, C3, D1, D2, and D3, or A1, A2, A3, A4, B1, B2, B3, C1, C2, C3, C4, C5, C6, and D1, A1, A2, A5, A6, B1, B2, C1, C2, C3, D1, D2, D3, E1, and F1, or A1, A2, A3, A4, A5, A6, B1, B2, C1, C2, D1, D3, D4, and D5, or codebook structures equivalent to the codebook structure. Codewords included in the codebook structure corresponding to the dual stream-dual stream sending mode are A1, A2, A3, A4, A5, A6, B1, B2, B3, B4, B5, B6, C1, C2, C3, C4, C5, C6, D1, D2, D3, D4, D5, and D6, or codebook structures formed of 24 codewords randomly selected from 16G-16H, or codebook structures equivalent to the codebook structure.

Furthermore, according to the obtained results, a codebook structure type is determined for each sending mode, and joint feedback signals in different sending modes are encoded.

In view of the above, in this embodiment, a method for encoding feedback signals of two carriers in a DC-MIMO mode is provided, in which a single-code channel is employed, so that power overhead is saved and a CM value of the system is not affected, thereby enhancing the performance of the system. Moreover, in this embodiment, a suitable codebook structure and a mapping relationship between a feedback signal and a codeword are selected according to BER and detection error cost, so as to minimize the signal detection error cost and increase data transmission efficiency of the system.

A first embodiment of a method for encoding a joint feedback signal according to the present invention is illustrated below.

The method for encoding a joint feedback signal according to this embodiment includes the following step: Joint feedback signals in different sending modes are encoded according to codewords of codebook structures corresponding to the sending modes or equivalent codebook structures thereof, respectively.

Specifically, in this embodiment, codebook structures having the code distance relations as shown in Tables 1-4, 1-5, and 1-6 in the second embodiment of the signal encoding method and mapping relationship between the sending modes and codebook structures as shown in Table 1-14 are employed to encode joint feedback signals in different sending modes. The process is specifically described in the following.

(1) Encoding Scheme for Joint Feedback Signals in Single Stream-Single Stream Sending Mode

TABLE 1-15

Encoding Scheme 1 for Joint Feedback Signals in Single Stream-Single Stream Sending Mode

| | | Secondary Single Stream | | |
|---|---|---|---|---|
| Primary | | ACK | NACK | DTX |
| Single Stream | ACK | $X_{11} = D2$ | $X_{12} = B2$ | $X_{10} = A1$ |
| | NACK | $X_{21} = A2$ | $X_{22} = C2$ | $X_{20} = B1$ |
| | DTX | $X_{01} = C1$ | $X_{02} = D1$ | $X_{00} = DTX$ |

As shown in Table 1-15, a codebook structure that can be used in this embodiment is 2A-2B-2C-2D or an equivalent codebook structure thereof. The "=" in Table 1-15 means "corresponding to" or "mapped into", which is the same hereinafter. Codewords included in the codebook structure may be A1, A2, B1, B2, C1, C2, D1, and D2. The encoding of the joint feedback signals in the single stream-single stream sending mode includes: encoding the joint feedback signals, in which $X_{11}$, $X_{12}$, $X_{10}$, $X_{21}$, $X_{22}$, $X_{20}$, $X_{01}$, and $X_{02}$ are mapped into D2, B2, A1, A2, C2, B1, C1, and D1 respectively.

In addition, even if the same codebook structure is used, a mapping scheme equivalent to the above mapping process also exists, which is specifically defined as follows.

Two mapping schemes f:$\{S_i\} \to \{X_i\}$ and h:$\{S_i\} \to \{X_j\}$ of a signal set $\{S_i\}$ and a corresponding codebook structure $\{X_j\}$ are equivalent; the codebook structure $\{X_j\}$ forms the same code distance matrices in sequences predetermined in the mapping scheme, that is, a sequence $\{f(S_1), f(S_2), \ldots f(S_n)\}$ and a sequence $\{h(S_1), h(S_2), \ldots h(S_n)\}$; the two mapping schemes satisfy $d(f(S_i), f(S_j))=d(h(S_i), h(S_j))$, that is, two random signals have the same code distance in the two mapping schemes.

$f(S_i)$ represents codewords corresponding to the signal $S_i$ in the mapping scheme f:$\{S_i\} \to \{X_j\}$, $h(S_i)$ represents codewords corresponding to the signal $S_i$ in the mapping scheme h:$\{S_i\} \to \{X_j\}$, and d(a,b) represents a code distance between codewords a, b. The code distance between two signals refers to the code distance between codewords corresponding to the signals.

As long as the formed code distance matrices are the same, the performances of the schemes are the same. Therefore, any two equivalent mapping schemes can be regarded as the same mapping scheme.

For example, an equivalent mapping scheme exists for Table 1-15, that is, joint feedback signals $X_{11}, X_{12}, X_{10}, X_{21}, X_{22}, X_{20}, X_{01}$, and $X_{02}$ can be mapped into B2, D2, C1, C2, A2, D1, A1, and B1, respectively. In the two mapping schemes, the code distance matrices of the signals are the same, and the code distances between the signals are equal to the code distances between the codewords corresponding to the signals. Therefore, the two mapping schemes can be regarded as the same mapping scheme, which can be expressed by Table 1-15 in a unified manner. All the following schemes can be comprehended likewise.

TABLE 1-16

Encoding Scheme 2 for Joint Feedback Signals in Single Stream-Single Stream Sending Mode

| Primary | | ACK | Secondary Single Stream NACK | DTX |
|---|---|---|---|---|
| Single Stream | ACK | $X_{11} = C2$ | $X_{12} = C3$ | $X_{10} = A1$ |
| | NACK | $X_{21} = C4$ | $X_{22} = C5$ | $X_{20} = B1$ |
| | DTX | $X_{01} = C1$ | $X_{02} = D1$ | $X_{00} = DTX$ |

As shown in Table 1-16, a codebook structure that can be used in this embodiment is A-B-5C-D or an equivalent codebook structure thereof. Codewords included in the codebook structure may be A1, B1, C1, C2, C3, C4, C5, and D1. The encoding of the joint feedback signals in the single stream-single stream sending mode includes: encoding the joint feedback signals, in which $X_{11}, X_{12}, X_{10}, X_{21}, X_{22}, X_{20}, X_{01}$, and $X_{02}$ are mapped into C2, C3, A1, C4, C5, B1, C1, and D1, respectively.

TABLE 1-17

Encoding Scheme 3 for Joint Feedback Signals in Single Stream-Single Stream Sending Mode

| Primary | | ACK | Secondary Single Stream NACK | DTX |
|---|---|---|---|---|
| Single Stream | ACK | $X_{11} = C1$ | $X_{12} = C2$ | $X_{10} = A1$ |
| | NACK | $X_{21} = C3$ | $X_{22} = C4$ | $X_{20} = B1$ |
| | DTX | $X_{01} = A2$ | $X_{02} = B2$ | $X_{00} = DTX$ |

As shown in Table 1-17, a codebook structure that can be used in this embodiment is 2A-2B-4C or an equivalent codebook structure thereof. Codewords included in the codebook structure may be A1, A2, B1, B2, C1, C2, C3, and C4. The encoding of the joint feedback signals in the single stream-single stream sending mode includes: encoding the joint feedback signals, in which $X_{11}, X_{12}, X_{10}, X_{21}, X_{22}, X_{20}, X_{01}$, and $X_{02}$ are mapped into C1, C2, A1, C3, C4, B1, A2, and B2, respectively.

The codebook structure and/or mapping schemes used in the single stream-single stream mode are also applicable in an encoding system that needs to use eight 10-bit codewords, for example, HARQ-ACK joint encoding of a dual-carrier in which neither of the two carriers is configured with MIMO, or HARQ-ACK joint encoding of a dual-carrier in a single stream mode in which one carrier is not configured with MIMO while the other carrier is configured with MIMO, or an encoding system or subsystem that only needs to feed back eight 10-bit codewords in a case that more carriers are configured.

(2) Encoding Scheme for Joint Feedback Signals in Single Stream-Dual Stream Sending Mode

TABLE 1-18

Encoding Scheme 1 for Joint Feedback Signals in Single Stream-Dual Stream Sending Mode

| Primary | | DTX | Secondary Dual Stream ACK_ACK | ACK_NACK | NACK_ACK | NACK_NACK |
|---|---|---|---|---|---|---|
| Single Stream | ACK | $X_{10} = E1$ | $X_{13} = A3$ | $X_{14} = C1$ | $X_{15} = C2$ | $X_{16} = A4$ |
| | NACK | $X_{20} = F1$ | $X_{23} = C3$ | $X_{24} = D2$ | $X_{25} = D1$ | $X_{26} = D3$ |
| | DTX | $X_{00} = DTX$ | $X_{03} = A1$ | $X_{04} = A2$ | $X_{05} = A5$ | $X_{06} = A6$ |

As shown in Table 1-18, a codebook structure that can be used in this embodiment is 6A-3C-3D-E-F or an equivalent codebook structure thereof. Codewords included in the codebook structure may be A1, A2, A3, A4, A5, A6, C1, C2, C3, D1, D2, D3, E1, and F1. The encoding of the joint feedback signals in the single stream-dual stream sending mode includes: encoding the joint feedback signals, in which X10, X13, X14, X15, X16, X20, X23, X24, X25, X26, X03, X04, X05, and X06 into E1, A3, C1, C2, A4, F1, C3, D2, D1, D3, A1, A2, A5, and A6, respectively.

TABLE 1-19

Encoding Scheme 2 for Joint Feedback Signals in Single Stream-Dual Stream Sending Mode

| Primary | | DTX | Secondary Dual Stream ACK_ACK | ACK_NACK | NACK_ACK | NACK_NACK |
|---|---|---|---|---|---|---|
| Single Stream | ACK | $X_{10} = A1$ | $X_{13} = C1$ | $X_{14} = C2$ | $X_{15} = C3$ | $X_{16} = A3$ |
| | NACK | $X_{20} = B1$ | $X_{23} = C4$ | $X_{24} = C5$ | $X_{25} = C6$ | $X_{26} = B2$ |
| | DTX | $X_{00} = DTX$ | $X_{03} = A2$ | $X_{04} = A4$ | $X_{05} = A5$ | $X_{06} = A6$ |

As shown in Table 1-19, a codebook structure that can be used in this embodiment is 6A-2B-6C or an equivalent codebook structure thereof. Codewords included in the codebook structure may be A1, A2, A3, A4, A5, A6, B1, B2, C1, C2, C3, C4, C5, and C6. The encoding of the joint feedback signals in the single stream-dual stream sending mode includes: encoding the joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into A1, C1, C2, C3, A3, B1, C4, C5, C6, B2, A2, A4, A5, and A6, respectively.

TABLE 1-20

Encoding Scheme 3 for Joint Feedback Signals in Single Stream-Dual Stream Sending Mode

| Primary | | DTX | Secondary Dual Stream ACK_ACK | ACK_NACK | NACK_ACK | NACK_NACK |
|---|---|---|---|---|---|---|
| Single | ACK | $X_{10}$ = A1 | $X_{13}$ = C5 | $X_{14}$ = A2 | $X_{15}$ = A3 | $X_{16}$ = C6 |
| Stream | NACK | $X_{20}$ = B1 | $X_{23}$ = A4 | $X_{24}$ = A5 | $X_{25}$ = A6 | $X_{26}$ = B2 |
| | DTX | $X_{00}$ = DTX | $X_{03}$ = C1 | $X_{04}$ = C2 | $X_{05}$ = C3 | $X_{06}$ = C4 |

As shown in Table 1-20, a codebook structure that can be used in this embodiment is 6A-2B-6C or an equivalent codebook structure thereof. Codewords included in the codebook structure may be A1, A2, A3, A4, A5, A6, B1, B2, C1, C2, C3, C4, C5, and C6. The encoding of the joint feedback signals in the single stream-dual stream sending mode includes: encoding the joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into single streams A1, C5, A2, A3, C6, B1, A4, A5, A6, B2, C1, C2, C3, and C4, respectively.

(3) Encoding Scheme for Joint Feedback Signals in Dual Stream-Single Stream Sending Mode

TABLE 1-21

Encoding Scheme 1 for Joint Feedback Signals in Dual Stream-Single Stream Sending Mode

| | | | Secondary Single Stream | |
|---|---|---|---|---|
| | Primary | ACK | NACK | DTX |
| Dual Stream | DTX | $X_{01}$ = E1 | $X_{02}$ = F1 | $X_{00}$ = DTX |
| | ACK_ACK | $X_{31}$ = A3 | $X_{32}$ = C3 | $X_{30}$ = A1 |
| | ACK_NACK | $X_{41}$ = C1 | $X_{42}$ = D2 | $X_{40}$ = A2 |
| | NACK_ACK | $X_{51}$ = C2 | $X_{52}$ = D1 | $X_{50}$ = A5 |
| | NACK_NACK | $X_{61}$ = A4 | $X_{62}$ = D3 | $X_{60}$ = A6 |

As shown in Table 1-21, a codebook structure that can be used in this embodiment is 6A-3C-3D-E-F. Codewords included in the codebook structure may be A1, A2, A3, A4, A5, A6, C1, C2, C3, D1, D2, D3, E1, and F1. The encoding of the joint feedback signals in the dual stream-single stream sending mode includes: encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into E1, F1, A3, C3, A1, C1, D2, A2, C2, D1, A5, A4, D3, and A6, respectively.

TABLE 1-22

Encoding Scheme 2 for Joint Feedback Signals in Dual Stream-Single Stream Sending Mode

| | | | Secondary Single Stream | |
|---|---|---|---|---|
| | Primary | ACK | NACK | DTX |
| Dual Stream | DTX | $X_{01}$ = A1 | $X_{02}$ = B1 | $X_{00}$ = DTX |
| | ACK_ACK | $X_{31}$ = C1 | $X_{32}$ = C4 | $X_{30}$ = A2 |

TABLE 1-22-continued

Encoding Scheme 2 for Joint Feedback Signals in Dual Stream-Single Stream Sending Mode

| | | | Secondary Single Stream | |
|---|---|---|---|---|
| | Primary | ACK | NACK | DTX |
| | ACK_NACK | $X_{41}$ = C2 | $X_{42}$ = C5 | $X_{40}$ = A4 |
| | NACK_ACK | $X_{51}$ = C3 | $X_{52}$ = C6 | $X_{50}$ = A5 |
| | NACK_NACK | $X_{61}$ = A3 | $X_{62}$ = B2 | $X_{60}$ = A6 |

As shown in Table 1-22, a codebook structure that can be used in this embodiment is 6A-2B-6C. Codewords included in the codebook structure may be A1, A2, A3, A4, A5, A6, B1, B2, C1, C2, C3, C4, C5, and C6. The encoding of the joint feedback signals in the dual stream-single stream sending mode includes: encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into A1, B1, C1, C4, A2, C2, C5, A4, C3, C6, A5, A3, B2, and A6, respectively.

TABLE 1-23

Encoding Scheme 3 for Joint Feedback Signals in Dual Stream-Single Stream Sending Mode

| | | | Secondary Single Stream | |
|---|---|---|---|---|
| | Primary | ACK | NACK | DTX |
| Dual Stream | DTX | $X_{01}$ = A1 | $X_{02}$ = B1 | $X_{00}$ = DTX |
| | ACK_ACK | $X_{31}$ = C5 | $X_{32}$ = A4 | $X_{30}$ = C1 |
| | ACK_NACK | $X_{41}$ = A2 | $X_{42}$ = A5 | $X_{40}$ = C2 |
| | NACK_ACK | $X_{51}$ = A3 | $X_{52}$ = A6 | $X_{50}$ = C3 |
| | NACK_NACK | $X_{61}$ = C6 | $X_{62}$ = B2 | $X_{60}$ = C4 |

As shown in Table 1-23, a codebook structure that can be used in this embodiment is 6A-2B-6C. Codewords included in the codebook structure may be A1, A2, A3, A4, A5, A6, B1, B2, C1, C2, C3, C4, C5, and C6. The encoding of the joint feedback signals in the dual stream-single stream sending mode includes: encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into A1, B1, C5, A4, C1, A2, A5, C2, A3, A6, C3, C6, B2, and C4, respectively.

The codebook structure and/or mapping relationship used in the single stream-dual stream and dual stream-single stream modes are also applicable in an encoding system that needs to use fourteen 10-bit codewords, for example, HARQ-ACK joint encoding of a dual-carrier in a dual stream mode in which one carrier is not configured with MIMO while the other carrier is configured with MIMO, or an encoding system or subsystem that only needs to feed back fourteen 10-bit codewords in a case that more carriers are configured.

(4) Encoding Scheme for Joint Feedback Signals in Dual Stream-Dual Stream Sending Mode

TABLE 1-24

Encoding Scheme 1 for Joint Feedback Signals in Dual Stream-Dual Stream Sending Mode

| | | Secondary Dual Stream | | | | |
|---|---|---|---|---|---|---|
| | Primary | DTX | ACK_ACK | ACK_NACK | NACK_ACK | NACK_NACK |
| Dual Stream | DTX | $X_{00}$ = DTX | $X_{03}$ = C1 | $X_{04}$ = C2 | $X_{05}$ = C3 | $X_{06}$ = C4 |
| | ACK_ACK | $X_{30}$ = A1 | $X_{33}$ = B4 | $X_{34}$ = B5 | $X_{35}$ = B6 | $X_{36}$ = D1 |
| | ACK_NACK | $X_{40}$ = A2 | $X_{43}$ = D5 | $X_{44}$ = D3 | $X_{45}$ = B3 | $X_{46}$ = C6 |
| | NACK_ACK | $X_{50}$ = A3 | $X_{53}$ = D6 | $X_{54}$ = B2 | $X_{55}$ = D2 | $X_{56}$ = C5 |
| | NACK_NACK | $X_{60}$ = A4 | $X_{63}$ = B1 | $X_{64}$ = A6 | $X_{65}$ = A5 | $X_{66}$ = D4 |

As shown in Table 1-24, a codebook structure that can be used in this embodiment is 6A-6B-6C-6D. Codewords included in the codebook structure may be A1, A2, A3, A4, A5, A6, B1, B2, B3, B4, B5, B6, C1, C2, C3, C4, C5, C6, D1, D2, D3, D4, D5, and D6. The encoding of the joint feedback signals in the dual stream-dual stream sending mode includes: encoding the joint feedback signals $X_{03}$, $X_{04}$, $X_{05}$, $X_{06}$, $X_{30}$, $X_{33}$, $X_{34}$, $X_{35}$, $X_{36}$, $X_{40}$, $X_{43}$, $X_{44}$, $X_{45}$, $X_{46}$, $X_{50}$, $X_{53}$, $X_{54}$, $X_{55}$, $X_{56}$, $X_{60}$, $X_{63}$, $X_{64}$, $X_{65}$, and $X_{66}$ into C1, C2, C3, C4, A1, B4, B5, B6, D1, A2, D5, D3, B3, C6, A3, D6, B2, D2, C5, A4, B1, A6, A5, and D4, respectively.

$X_{06}$, $X_{30}$, $X_{33}$, $X_{34}$, $X_{35}$, $X_{36}$, $X_{40}$, $X_{43}$, $X_{44}$, $X_{45}$, $X_{46}$, $X_{50}$, $X_{53}$, $X_{54}$, $X_{55}$, $X_{56}$, $X_{60}$, $X_{63}$, $X_{64}$, $X_{65}$, and $X_{66}$ into B1, B2, B3, B4, A1, D4, B5, D2, D1, A2, A5, D3, B6, C6, A3, D6, A6, C3, C5, A4, D5, C2, C1, and C4, respectively.

The codebook structure and/or mapping relationship used in the dual stream-dual stream mode are also applicable in an encoding system that needs to use twenty-four 10-bit codewords, for example, an encoding system or subsystem that only needs to feed back twenty-four 10-bit codewords in a case that more carriers are configured.

The encoding schemes in the single stream-single stream, single stream-dual stream, dual stream-single stream, and dual stream-dual stream sending modes are respectively described in the above four parts. Signal spaces of other sending modes are subsets of the four signal spaces, so that the encoding schemes in the other sending modes can be easily deduced according to the four signal spaces.

Specifically, the codebook structure corresponding to the single stream-DTX sending mode is a subset of an intersection between the codebook structure corresponding to the single stream-single stream sending mode and the codebook structure corresponding to the single stream-dual stream sending mode, the codebook structure corresponding to the DTX-single stream sending mode is a subset of an intersection between the codebook structure corresponding to the single stream-single stream sending mode and the codebook structure corresponding to the dual stream-single stream sending mode, the codebook structure corresponding to the dual stream-DTX sending mode is a subset of an intersection between the codebook structure corresponding to the dual

TABLE 1-25

Encoding Scheme 2 for Joint Feedback Signals in Dual Stream-Dual Stream Sending Mode

| | | Secondary Dual Stream | | | | |
|---|---|---|---|---|---|---|
| | Primary | DTX | ACK_ACK | ACK_NACK | NACK_ACK | NACK_NACK |
| Dual Stream | DTX | $X_{00}$ = DTX | $X_{03}$ = B1 | $X_{04}$ = B2 | $X_{05}$ = B3 | $X_{06}$ = B4 |
| | ACK_ACK | $X_{30}$ = A1 | $X_{33}$ = D4 | $X_{34}$ = B5 | $X_{35}$ = D2 | $X_{36}$ = D1 |
| | ACK_NACK | $X_{40}$ = A2 | $X_{43}$ = A5 | $X_{44}$ = D3 | $X_{45}$ = B6 | $X_{46}$ = C6 |
| | NACK_ACK | $X_{50}$ = A3 | $X_{53}$ = D6 | $X_{54}$ = A6 | $X_{55}$ = C3 | $X_{56}$ = C5 |
| | NACK_NACK | $X_{60}$ = A4 | $X_{63}$ = D5 | $X_{64}$ = C2 | $X_{65}$ = C1 | $X_{66}$ = C4 |

As shown in Table 1-25, a codebook structure that can be used in this embodiment is 6A-6B-6C-6D. Codewords included in the codebook structure may be A1, A2, A3, A4, A5, A6, B1, B2, B3, B4, B5, B6, C1, C2, C3, C4, C5, C6, D1, D2, D3, D4, D5, and D6. The encoding of the joint feedback signals in the dual stream-dual stream sending mode includes: encoding the joint feedback signals $X_{03}$, $X_{04}$, $X_{05}$, stream-single stream sending mode and the codebook structure corresponding to the dual stream-dual stream sending mode, and the codebook structure corresponding to the DTX-dual stream sending mode is a subset of an intersection between the codebook structure corresponding to the single stream-dual stream sending mode and the codebook structure corresponding to the dual stream-dual stream sending mode.

The schemes according to an embodiment of the present invention are further illustrated below through a specific example.

In this embodiment, for a mapping relationship between the employed sending modes and codebook structure types, reference can be made to Table 1-26.

TABLE 1-26

Mapping Relationship Between Sending Modes and Codebook Structure Types Employed in First Embodiment of Method for Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-2C-2D | Encoding Scheme 1 for Single Stream-Single Stream Mode |
| Dual Stream-Single Stream | 6A-3C-3D-E-F | Encoding Scheme 1 for Dual Stream-Single Stream Mode |
| Single Stream-Dual Stream | 6A-3C-3D-E-F | Encoding Scheme 1 for Single Stream-Dual Stream Mode |
| Dual Stream-Dual Stream | 6A-6B-6C-6D | Encoding Scheme 1 for Dual Stream-Dual Stream Mode |

In Table 1-26, a codebook structure type used in each mode and a corresponding encoding scheme are specified. Further, the codewords in the codebook structure corresponding to each mode need to be valued, that is, assigned with a specific 10-bit 0-1 sequence.

In Table 1-26, the codebook structure types corresponding to different sending modes may be the same, which does not necessarily mean that the same specific codewords are used but only means that each corresponding codebook structure has the same code distance relations. It is the same hereinafter. Further, the same codeword symbol used in the corresponding codebook structures of different sending modes is not necessarily corresponding to the same codeword. For example, the codeword A1 in the codebook structure used in the single stream-DTX mode is not necessarily the same as the codeword A1 in the codebook structure used in the dual stream-DTX mode.

For example, the signals X01 and X02 belong to the single stream-single stream mode and the dual stream-single stream mode at the same time. In the encoding schemes shown in Table 1-26, referring to Tables 1-15, 1-18, 1-21, and 1-24, the specific codewords corresponding to X01 and X02 are depicted as C1 and D1 in the single stream-single stream mode, and depicted as E1 and F1 in the dual stream-single stream mode. However, no matter being depicted in what form, the codebook structure composed of the two codewords is equivalent to A-B, that is, the codebook structure type of the codebook structure composed of the two codewords is A-B. A symbol used for a specific codeword sequence is determined by a code distance relation of the codeword in the corresponding codebook structure.

The "–" in the foregoing tables represents that in the codebook structure type, each signal in the mode can be randomly mapped into one codeword in the codebook structure. However, different signals are mapped into different codewords. In the following tables, the "–" represents the same meaning, the description of which is omitted.

According to the mapping relationship between the sending modes and the codebook structure types as well as the employed encoding schemes, the joint feedback signal Xij is encoded. For a mapping relationship between Xij and codeword values, reference can be made to Table 1-27. The 10-bit 0-1 sequence in Table 1-27 includes values of codewords in the codebook structure.

TABLE 1-27

Mapping Relationship Between $X_{ij}$ and Codeword Values

| | | | | | | | | | | |
|---|---|---|---|---|---|---|---|---|---|---|
| $X_{01}$ | 1 | 1 | 1 | 1 | 1 | 0 | 0 | 0 | 0 | 0 |
| $X_{02}$ | 0 | 0 | 0 | 0 | 0 | 1 | 1 | 1 | 1 | 1 |
| $X_{03}$ | 1 | 1 | 1 | 1 | 1 | 0 | 0 | 1 | 0 | 0 |
| $X_{04}$ | 1 | 1 | 1 | 0 | 0 | 1 | 1 | 0 | 1 | 0 |
| $X_{05}$ | 0 | 0 | 1 | 1 | 0 | 1 | 0 | 0 | 0 | 1 |
| $X_{06}$ | 0 | 1 | 0 | 0 | 0 | 0 | 1 | 1 | 0 | 1 |
| $X_{10}$ | 1 | 1 | 1 | 1 | 1 | 1 | 1 | 1 | 1 | 1 |
| $X_{11}$ | 1 | 0 | 1 | 0 | 1 | 0 | 1 | 0 | 1 | 0 |
| $X_{12}$ | 1 | 1 | 0 | 0 | 1 | 1 | 0 | 0 | 1 | 1 |
| $X_{13}$ | 0 | 0 | 0 | 1 | 1 | 0 | 1 | 0 | 1 | 0 |
| $X_{14}$ | 1 | 0 | 1 | 0 | 1 | 0 | 1 | 0 | 0 | 1 |
| $X_{15}$ | 1 | 1 | 0 | 1 | 0 | 0 | 0 | 0 | 1 | 1 |
| $X_{16}$ | 1 | 0 | 0 | 0 | 1 | 1 | 0 | 1 | 1 | 1 |
| $X_{20}$ | 0 | 0 | 0 | 0 | 0 | 0 | 0 | 0 | 0 | 0 |
| $X_{21}$ | 0 | 0 | 1 | 1 | 0 | 0 | 1 | 1 | 0 | 0 |
| $X_{22}$ | 0 | 1 | 0 | 1 | 0 | 1 | 0 | 1 | 0 | 1 |
| $X_{23}$ | 1 | 0 | 0 | 1 | 0 | 1 | 1 | 1 | 0 | 0 |
| $X_{24}$ | 0 | 0 | 1 | 0 | 1 | 1 | 1 | 1 | 0 | 0 |
| $X_{25}$ | 0 | 1 | 0 | 1 | 0 | 1 | 0 | 1 | 1 | 0 |
| $X_{26}$ | 0 | 1 | 1 | 0 | 1 | 0 | 0 | 0 | 1 | 1 |
| $X_{30}$ | 1 | 0 | 1 | 0 | 1 | 1 | 1 | 1 | 0 | 1 |
| $X_{31}$ | 0 | 0 | 0 | 0 | 1 | 1 | 0 | 0 | 1 | 0 |
| $X_{32}$ | 0 | 1 | 0 | 1 | 1 | 1 | 1 | 1 | 0 | 0 |
| $X_{33}$ | 1 | 0 | 1 | 1 | 1 | 1 | 0 | 0 | 1 | 0 |
| $X_{34}$ | 1 | 0 | 1 | 1 | 0 | 0 | 1 | 1 | 1 | 1 |
| $X_{35}$ | 1 | 1 | 0 | 1 | 1 | 1 | 1 | 0 | 0 | 1 |
| $X_{36}$ | 0 | 0 | 0 | 0 | 0 | 1 | 1 | 1 | 1 | 1 |
| $X_{40}$ | 1 | 1 | 0 | 1 | 0 | 1 | 0 | 1 | 1 | 1 |
| $X_{41}$ | 1 | 1 | 0 | 0 | 0 | 1 | 1 | 0 | 1 | 0 |
| $X_{42}$ | 1 | 1 | 0 | 0 | 1 | 0 | 1 | 1 | 1 | 0 |
| $X_{43}$ | 1 | 1 | 1 | 0 | 0 | 0 | 0 | 0 | 0 | 1 |
| $X_{44}$ | 1 | 1 | 0 | 0 | 1 | 0 | 1 | 1 | 1 | 0 |
| $X_{45}$ | 1 | 0 | 0 | 0 | 0 | 1 | 0 | 1 | 0 | 0 |
| $X_{46}$ | 1 | 0 | 0 | 0 | 1 | 0 | 0 | 0 | 1 | 1 |
| $X_{50}$ | 0 | 1 | 1 | 1 | 1 | 0 | 1 | 0 | 1 | 1 |
| $X_{51}$ | 0 | 0 | 1 | 1 | 0 | 1 | 0 | 0 | 0 | 1 |
| $X_{52}$ | 0 | 0 | 0 | 1 | 1 | 0 | 0 | 1 | 0 | 1 |
| $X_{53}$ | 0 | 1 | 1 | 1 | 0 | 1 | 1 | 1 | 0 | 0 |
| $X_{54}$ | 0 | 0 | 1 | 0 | 1 | 0 | 1 | 0 | 0 | 0 |
| $X_{55}$ | 0 | 0 | 0 | 1 | 1 | 0 | 0 | 1 | 0 | 1 |
| $X_{56}$ | 0 | 0 | 0 | 1 | 1 | 1 | 1 | 1 | 1 | 0 |
| $X_{60}$ | 1 | 0 | 0 | 1 | 0 | 0 | 1 | 0 | 0 | 0 |
| $X_{61}$ | 0 | 1 | 1 | 0 | 0 | 0 | 0 | 1 | 0 | 0 |
| $X_{62}$ | 1 | 0 | 1 | 0 | 0 | 0 | 0 | 0 | 1 | 1 |
| $X_{63}$ | 0 | 1 | 0 | 1 | 0 | 0 | 0 | 0 | 1 | 0 |
| $X_{64}$ | 0 | 0 | 1 | 0 | 0 | 0 | 1 | 1 | 1 | 0 |
| $X_{65}$ | 0 | 1 | 0 | 0 | 1 | 1 | 0 | 0 | 0 | 0 |
| $X_{66}$ | 0 | 1 | 1 | 0 | 1 | 1 | 0 | 1 | 1 | 1 |

A specific example is given in Table 1-27. In the example, a codebook structure corresponding to a signal in each sending mode satisfies the codebook structure type in Table 1-26, that is, a code distance matrix of the codebook structure is the same as the code distance matrix of the codebook structure type in Table 1-26. A mapping relationship between the signal and the codeword satisfies the encoding scheme in Table 1-26, that is, in the mapping relationship, the code distance matrix of the signal is the same as the code distance matrix of the signal in the encoding scheme as shown in Table 1-26. This embodiment is not limited to the mapping relationship in Table 1-27. Any mapping relationship obtained through simple variation on the basis of Table 1-27 also falls within the scope of this embodiment, for example, sequences among columns are randomly changed on the basis of Table 1-27, or negation is performed on a value of a certain column (1 is changed into 0 or 0 is changed into 1).

Table 1-27 shows the mapping relationship between the joint signals and the codewords that need to be used in the encoder submodule. Thereby, after receiving a signal, the encoder submodule looks up the table for a codeword corresponding to the joint signal, and then outputs the codeword.

In this embodiment, a method for encoding feedback signals of two carriers in a DC-MIMO mode is provided, in which a single-code channel is employed, so that power overhead is saved and a CM value of the system is not affected, thereby enhancing the performance of the system. Moreover, in this embodiment, a suitable codebook structure and a mapping relationship between a feedback signal and a codeword are selected according to BER and detection error cost, so as to minimize the signal detection error cost and increase data transmission efficiency of the system.

A second embodiment of a method for encoding a joint feedback signal according to the present invention is illustrated below.

A difference between this embodiment and the first embodiment of the method for encoding a joint feedback signal lies in the mapping relationship between the sending modes and the codebook structure types. For a mapping relationship between the sending modes and the codebook structure types in this embodiment, reference can be made to Table 1-28.

TABLE 1-28

Mapping Relationship Between Sending Modes and Codebook Structure Types Employed in Second Embodiment of Method for Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-2C-2D | Encoding Scheme 1 for Single Stream-Single Stream Mode |
| Dual Stream-Single Stream | 6A-2B-6C | Encoding Scheme 2 for Dual Stream-Single Stream Mode |
| Single Stream-Dual Stream | 6A-2B-6C | Encoding Scheme 2 for Single Stream-Dual Stream Mode |
| Dual Stream-Dual Stream | 6A-6B-6C-6D | Encoding Scheme 1 for Dual Stream-Dual Stream Mode |

The scheme only needs 24 codewords. According to the mapping relationship between the sending modes and the codebook structures, mapping relationship between the joint feedback signals and codewords are provided in this embodiment, which can be referred to in Table 1-29.

Further, values of the 24 codewords are provided in this embodiment, which can be referred to in Table 1-30.

TABLE 1-30

Codewords and Codeword Values

| A1 | 1 | 1 | 1 | 1 | 1 | 1 | 1 | 1 | 1 | 1 |
|---|---|---|---|---|---|---|---|---|---|---|
| A2 | 0 | 0 | 1 | 1 | 0 | 0 | 1 | 1 | 0 | 0 |
| A3 | 1 | 1 | 0 | 0 | 0 | 1 | 1 | 0 | 0 | 0 |
| A4 | 1 | 0 | 0 | 1 | 0 | 0 | 0 | 0 | 1 | 1 |
| A5 | 0 | 1 | 0 | 0 | 1 | 0 | 0 | 1 | 1 | 0 |
| A6 | 0 | 0 | 1 | 0 | 1 | 1 | 0 | 0 | 0 | 1 |
| C1 | 1 | 1 | 1 | 1 | 1 | 0 | 0 | 0 | 0 | 0 |
| C2 | 0 | 1 | 0 | 1 | 0 | 1 | 0 | 1 | 0 | 1 |
| C3 | 0 | 1 | 1 | 0 | 0 | 0 | 1 | 0 | 1 | 1 |
| C4 | 1 | 0 | 1 | 0 | 0 | 1 | 0 | 1 | 1 | 0 |
| C5 | 0 | 0 | 0 | 1 | 1 | 1 | 1 | 0 | 1 | 0 |
| C6 | 1 | 0 | 0 | 0 | 1 | 0 | 1 | 1 | 0 | 1 |
| B1 | 0 | 0 | 0 | 0 | 0 | 0 | 0 | 0 | 0 | 0 |
| B2 | 1 | 1 | 0 | 0 | 1 | 1 | 0 | 0 | 1 | 1 |
| B3 | 0 | 0 | 1 | 1 | 1 | 0 | 0 | 1 | 1 | 0 |
| B4 | 0 | 1 | 1 | 0 | 1 | 1 | 1 | 1 | 0 | 0 |
| B5 | 1 | 0 | 1 | 1 | 0 | 1 | 1 | 0 | 0 | 1 |
| B6 | 1 | 1 | 0 | 1 | 0 | 0 | 1 | 1 | 1 | 0 |
| D1 | 0 | 0 | 0 | 0 | 0 | 1 | 1 | 1 | 1 | 1 |
| D2 | 1 | 0 | 1 | 0 | 1 | 0 | 1 | 0 | 1 | 0 |
| D3 | 1 | 0 | 0 | 1 | 1 | 1 | 0 | 1 | 0 | 0 |
| D4 | 0 | 0 | 1 | 0 | 1 | 0 | 1 | 0 | 0 | 1 |
| D5 | 1 | 1 | 1 | 0 | 0 | 0 | 0 | 1 | 0 | 1 |
| D6 | 0 | 1 | 1 | 1 | 0 | 1 | 0 | 0 | 1 | 0 |

Mapping relationship between $X_{ij}$ and the codeword values are obtained according to Tables 1-29 and 1-30, which can be referred to in Table 1-31.

TABLE 1-31

Mapping Relationship Between $X_{ij}$ and Codeword Values

| $X_{01}$ | 1 | 1 | 1 | 1 | 1 | 0 | 0 | 0 | 0 | 0 |
|---|---|---|---|---|---|---|---|---|---|---|
| $X_{02}$ | 0 | 0 | 0 | 0 | 0 | 1 | 1 | 1 | 1 | 1 |
| $X_{03}$ | 1 | 1 | 0 | 0 | 0 | 1 | 1 | 0 | 0 | 0 |
| $X_{04}$ | 1 | 0 | 0 | 1 | 0 | 0 | 0 | 0 | 1 | 1 |
| $X_{05}$ | 0 | 1 | 0 | 0 | 1 | 0 | 0 | 1 | 1 | 0 |
| $X_{06}$ | 0 | 0 | 1 | 0 | 1 | 1 | 0 | 0 | 0 | 1 |
| $X_{10}$ | 1 | 1 | 1 | 1 | 1 | 1 | 1 | 1 | 1 | 1 |
| $X_{11}$ | 1 | 0 | 1 | 0 | 1 | 0 | 1 | 0 | 1 | 0 |
| $X_{12}$ | 1 | 1 | 0 | 0 | 1 | 1 | 0 | 0 | 1 | 1 |
| $X_{13}$ | 1 | 1 | 1 | 1 | 1 | 0 | 0 | 0 | 0 | 0 |
| $X_{14}$ | 0 | 1 | 0 | 1 | 0 | 1 | 0 | 1 | 0 | 1 |
| $X_{15}$ | 0 | 1 | 1 | 0 | 0 | 0 | 1 | 0 | 1 | 1 |
| $X_{16}$ | 0 | 0 | 1 | 1 | 0 | 0 | 1 | 1 | 0 | 0 |
| $X_{20}$ | 0 | 0 | 0 | 0 | 0 | 0 | 0 | 0 | 0 | 0 |
| $X_{21}$ | 0 | 0 | 1 | 1 | 0 | 0 | 1 | 1 | 0 | 0 |

TABLE 1-29

Mapping Relationship Between Joint Feedback Signals and Codewords

| | | Secondary | | | | | | |
|---|---|---|---|---|---|---|---|---|
| | | Single Stream | | Single/ Dual Stream | Dual Stream | | | |
| Primary | | ACK | NACK | DTX | ACK_ACK | ACK_NACK | NACK_ACK | NACK_NACK |
| Single Stream | ACK | $X_{11}$ = D2 | $X_{12}$ = B2 | $X_{10}$ = A1 | $X_{13}$ = C1 | $X_{14}$ = C2 | $X_{15}$ = C3 | $X_{16}$ = A2 |
| | NACK | $X_{21}$ = A2 | $X_{22}$ = C2 | $X_{20}$ = B1 | $X_{23}$ = C4 | $X_{24}$ = C5 | $X_{25}$ = C6 | $X_{26}$ = B3 |
| Single/ Dual Stream | DTX | $X_{01}$ = C1 | $X_{02}$ = D1 | $X_{00}$ = DTX | $X_{03}$ = A3 | $X_{04}$ = A4 | $X_{05}$ = A5 | $X_{06}$ = A6 |
| Dual Stream | ACK_ACK | $X_{31}$ = A1 | $X_{32}$ = A4 | $X_{30}$ = C3 | $X_{33}$ = D6 | $X_{34}$ = D1 | $X_{35}$ = D2 | $X_{36}$ = B3 |
| | ACK_NACK | $X_{41}$ = A2 | $X_{42}$ = A5 | $X_{40}$ = C4 | $X_{43}$ = B1 | $X_{44}$ = B5 | $X_{45}$ = D5 | $X_{46}$ = A2 |
| | NACK_ACK | $X_{51}$ = A3 | $X_{52}$ = A6 | $X_{50}$ = C5 | $X_{53}$ = B2 | $X_{54}$ = D4 | $X_{55}$ = B4 | $X_{56}$ = A1 |
| | NACK_NACK | $X_{61}$ = C2 | $X_{62}$ = D3 | $X_{60}$ = C6 | $X_{63}$ = D3 | $X_{64}$ = C2 | $X_{65}$ = C1 | $X_{66}$ = B6 |

TABLE 1-31-continued

Mapping Relationship Between $X_{ij}$ and Codeword Values

| | | | | | | | | | | |
|---|---|---|---|---|---|---|---|---|---|---|
| $X_{22}$ | 0 | 1 | 0 | 1 | 0 | 1 | 0 | 1 | 0 | 1 |
| $X_{23}$ | 1 | 0 | 1 | 0 | 0 | 1 | 0 | 1 | 1 | 0 |
| $X_{24}$ | 0 | 0 | 0 | 1 | 1 | 1 | 1 | 0 | 1 | 0 |
| $X_{25}$ | 1 | 0 | 0 | 0 | 1 | 0 | 1 | 1 | 0 | 1 |
| $X_{26}$ | 0 | 0 | 1 | 1 | 1 | 0 | 0 | 1 | 1 | 1 |
| $X_{30}$ | 0 | 1 | 1 | 0 | 0 | 0 | 1 | 0 | 1 | 1 |
| $X_{31}$ | 1 | 1 | 1 | 1 | 1 | 1 | 1 | 1 | 1 | 1 |
| $X_{32}$ | 1 | 0 | 0 | 1 | 0 | 0 | 0 | 0 | 1 | 1 |
| $X_{33}$ | 0 | 1 | 1 | 1 | 0 | 1 | 0 | 0 | 1 | 0 |
| $X_{34}$ | 0 | 0 | 0 | 0 | 0 | 1 | 1 | 1 | 1 | 1 |
| $X_{35}$ | 1 | 0 | 1 | 0 | 1 | 0 | 1 | 0 | 1 | 0 |
| $X_{36}$ | 0 | 0 | 1 | 1 | 1 | 0 | 0 | 1 | 1 | 1 |
| $X_{40}$ | 1 | 0 | 1 | 0 | 0 | 1 | 0 | 1 | 1 | 0 |
| $X_{41}$ | 0 | 0 | 1 | 1 | 0 | 0 | 1 | 1 | 0 | 0 |
| $X_{42}$ | 0 | 1 | 0 | 0 | 1 | 0 | 0 | 1 | 1 | 0 |
| $X_{43}$ | 0 | 0 | 0 | 0 | 0 | 0 | 0 | 0 | 0 | 0 |
| $X_{44}$ | 1 | 0 | 1 | 1 | 0 | 1 | 1 | 0 | 0 | 1 |
| $X_{45}$ | 1 | 1 | 1 | 0 | 0 | 0 | 0 | 1 | 0 | 1 |
| $X_{46}$ | 0 | 0 | 1 | 1 | 0 | 0 | 1 | 1 | 0 | 0 |
| $X_{50}$ | 0 | 0 | 0 | 1 | 1 | 1 | 1 | 0 | 1 | 0 |
| $X_{51}$ | 1 | 1 | 0 | 0 | 0 | 1 | 1 | 0 | 0 | 0 |
| $X_{52}$ | 0 | 0 | 1 | 0 | 1 | 1 | 0 | 0 | 0 | 1 |
| $X_{53}$ | 1 | 1 | 0 | 0 | 1 | 1 | 0 | 0 | 1 | 1 |
| $X_{54}$ | 0 | 1 | 0 | 1 | 1 | 0 | 1 | 0 | 0 | 1 |
| $X_{55}$ | 0 | 1 | 1 | 0 | 1 | 1 | 1 | 1 | 0 | 0 |
| $X_{56}$ | 1 | 1 | 1 | 1 | 1 | 1 | 1 | 1 | 1 | 1 |
| $X_{60}$ | 1 | 0 | 0 | 0 | 1 | 0 | 1 | 1 | 0 | 1 |
| $X_{61}$ | 0 | 1 | 0 | 1 | 0 | 1 | 0 | 1 | 0 | 1 |
| $X_{62}$ | 1 | 0 | 0 | 1 | 1 | 1 | 0 | 1 | 0 | 0 |
| $X_{63}$ | 1 | 0 | 0 | 1 | 1 | 1 | 0 | 1 | 0 | 0 |
| $X_{64}$ | 0 | 1 | 0 | 1 | 0 | 1 | 0 | 1 | 0 | 1 |
| $X_{65}$ | 1 | 1 | 1 | 1 | 1 | 0 | 0 | 0 | 0 | 1 |
| $X_{66}$ | 1 | 1 | 0 | 1 | 0 | 0 | 1 | 1 | 1 | 0 |

A specific example is given in Table 1-31. In the example, a codebook structure corresponding to a signal in each sending mode satisfies the codebook structure type in Table 1-28, that is, a code distance matrix of the codebook structure is the same as the code distance matrix of the codebook structure type in Table 1-28. A mapping relationship between the signal and the codeword satisfies the encoding scheme in Table 1-28, that is, in the mapping relationship, the code distance matrix of the signal is the same as the code distance matrix of the signal in the encoding scheme as shown in Table 1-28, that is, the mapping scheme in each scheme provided in Table 1-29 is the encoding scheme in Table 1-28 or an equivalent encoding scheme thereof. This embodiment is not limited to the mapping relationship in Table 1-31. Any mapping relationship obtained through simple variation on the basis of Table 1-31 also falls within the scope of this embodiment, for example, sequences among columns are randomly changed on the basis of Table 1-31, or negation is performed on a value of a certain column.

A third embodiment of a method for encoding a joint feedback signal according to the present invention is illustrated below.

A difference between this embodiment and the first embodiment of the method for encoding a joint feedback signal lies in the mapping relationship between the sending modes and the codebook structure types. The mapping relationship between the sending modes and the codebook structure types in this embodiment can be referred to in Table 1-32.

TABLE 1-32

Mapping Relationship Between Sending Modes and Codebook Structure Types Employed in Third Embodiment of Method For Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | A-B-5C-D | Encoding Scheme 2 for Single Stream-Single Stream Mode |
| Dual Stream-Single Stream | 6A-2B-6C | Encoding Scheme 2 for Dual Stream-Single Stream Mode |
| Single Stream-Dual Stream | 6A-2B-6C | Encoding Scheme 2 for Single Stream-Dual Stream Mode |
| Dual Stream-Dual Stream | 6A-6B-6C-6D | Encoding Scheme 1 for Dual Stream-Dual Stream Mode |

The scheme needs 24 codewords in total. According to the mapping relationship between the sending modes and the codebook structures, mapping relationship between the joint feedback signals and codewords are provided in this embodiment, which can be referred to in Table 1-33.

TABLE 1-33

Mapping Relationship Between Joint Feedback Signals and Codewords

| | | Secondary | | | | | | |
|---|---|---|---|---|---|---|---|---|
| | | Single Stream | | Single/Dual Stream | Dual Stream | | | |
| Primary | | ACK | NACK | DTX | ACK_ACK | ACK_NACK | NACK_ACK | NACK_NACK |
| Single Stream | ACK | $X_{11}=C2$ | $X_{12}=C3$ | $X_{10}=A1$ | $X_{13}=C1$ | $X_{14}=C2$ | $X_{15}=C3$ | $X_{16}=A2$ |
| | NACK | $X_{21}=C4$ | $X_{22}=C5$ | $X_{20}=B1$ | $X_{23}=C4$ | $X_{24}=C5$ | $X_{25}=C6$ | $X_{26}=B3$ |
| Single/Dual Stream | DTX | $X_{01}=C1$ | $X_{02}=D1$ | $X_{00}=DTX$ | $X_{03}=A3$ | $X_{04}=A4$ | $X_{05}=A5$ | $X_{06}=A6$ |
| Dual Stream | ACK_ACK | $X_{31}=A1$ | $X_{32}=A4$ | $X_{30}=C3$ | $X_{33}=D6$ | $X_{34}=D1$ | $X_{35}=D2$ | $X_{36}=B3$ |
| | ACK_NACK | $X_{41}=A2$ | $X_{42}=A5$ | $X_{40}=C4$ | $X_{43}=B1$ | $X_{44}=B5$ | $X_{45}=D5$ | $X_{46}=A2$ |
| | NACK_ACK | $X_{51}=A3$ | $X_{52}=A6$ | $X_{50}=C5$ | $X_{53}=B2$ | $X_{54}=D4$ | $X_{55}=B4$ | $X_{56}=A1$ |
| | NACK_NACK | $X_{61}=C2$ | $X_{62}=D3$ | $X_{60}=C6$ | $X_{63}=D3$ | $X_{64}=C2$ | $X_{65}=C1$ | $X_{66}=B6$ |

Further, values of the needed 24 codewords are provided in this embodiment, which can be referred to in Table 1-30.

Mapping relationship between $X_{ij}$ and the codeword values are obtained according to Tables 1-30 and 1-33, which can be referred to in Table 1-34.

TABLE 1-34

Mapping Relationship Between $X_{ij}$ and Codeword Values

| | | | | | | | | | | |
|---|---|---|---|---|---|---|---|---|---|---|
| $X_{01}$ | 1 | 1 | 1 | 1 | 1 | 0 | 0 | 0 | 0 | 0 |
| $X_{02}$ | 0 | 0 | 0 | 0 | 0 | 1 | 1 | 1 | 1 | 1 |
| $X_{03}$ | 1 | 1 | 0 | 0 | 0 | 1 | 1 | 0 | 0 | 0 |
| $X_{04}$ | 1 | 0 | 0 | 1 | 0 | 0 | 0 | 0 | 1 | 1 |
| $X_{05}$ | 0 | 1 | 0 | 0 | 1 | 0 | 0 | 1 | 1 | 0 |
| $X_{06}$ | 0 | 0 | 1 | 0 | 1 | 1 | 0 | 0 | 0 | 1 |
| $X_{10}$ | 1 | 1 | 1 | 1 | 1 | 1 | 1 | 1 | 1 | 1 |
| $X_{11}$ | 0 | 1 | 0 | 1 | 0 | 1 | 0 | 1 | 0 | 1 |
| $X_{12}$ | 0 | 1 | 1 | 0 | 0 | 1 | 0 | 1 | 1 | |
| $X_{13}$ | 1 | 1 | 1 | 1 | 1 | 0 | 0 | 0 | 0 | 0 |
| $X_{14}$ | 0 | 1 | 0 | 1 | 0 | 1 | 0 | 1 | 0 | 1 |
| $X_{15}$ | 0 | 1 | 1 | 0 | 0 | 1 | 0 | 1 | 1 | |
| $X_{16}$ | 0 | 0 | 1 | 1 | 0 | 0 | 1 | 1 | 0 | 0 |
| $X_{20}$ | 0 | 0 | 0 | 0 | 0 | 0 | 0 | 0 | 0 | 0 |
| $X_{21}$ | 1 | 0 | 1 | 0 | 0 | 1 | 0 | 1 | 1 | 0 |
| $X_{22}$ | 0 | 0 | 0 | 1 | 1 | 1 | 1 | 0 | 1 | 0 |
| $X_{23}$ | 1 | 0 | 1 | 0 | 0 | 1 | 0 | 1 | 1 | 0 |
| $X_{24}$ | 0 | 0 | 0 | 1 | 1 | 1 | 1 | 0 | 1 | 0 |
| $X_{25}$ | 1 | 0 | 0 | 0 | 1 | 0 | 1 | 1 | 0 | 1 |
| $X_{26}$ | 0 | 0 | 1 | 1 | 1 | 0 | 0 | 1 | 1 | 1 |
| $X_{30}$ | 0 | 1 | 1 | 0 | 0 | 0 | 1 | 0 | 1 | 1 |
| $X_{31}$ | 1 | 1 | 1 | 1 | 1 | 1 | 1 | 1 | 1 | 1 |
| $X_{32}$ | 1 | 0 | 0 | 1 | 0 | 0 | 0 | 0 | 1 | 1 |
| $X_{33}$ | 0 | 1 | 1 | 1 | 0 | 1 | 0 | 0 | 1 | 0 |
| $X_{34}$ | 0 | 0 | 0 | 0 | 0 | 1 | 1 | 1 | 1 | 1 |
| $X_{35}$ | 1 | 0 | 1 | 0 | 1 | 0 | 1 | 0 | 1 | 0 |
| $X_{36}$ | 0 | 0 | 1 | 1 | 1 | 0 | 0 | 1 | 1 | 1 |
| $X_{40}$ | 1 | 0 | 1 | 0 | 0 | 1 | 0 | 1 | 1 | 0 |
| $X_{41}$ | 0 | 0 | 1 | 1 | 0 | 0 | 1 | 1 | 0 | 0 |
| $X_{42}$ | 0 | 1 | 0 | 0 | 1 | 0 | 0 | 1 | 1 | 0 |
| $X_{43}$ | 0 | 0 | 0 | 0 | 0 | 0 | 0 | 0 | 0 | 0 |
| $X_{44}$ | 1 | 0 | 1 | 1 | 0 | 1 | 1 | 0 | 0 | 1 |
| $X_{45}$ | 1 | 1 | 1 | 0 | 0 | 0 | 0 | 1 | 0 | 1 |
| $X_{46}$ | 0 | 0 | 1 | 1 | 0 | 0 | 1 | 1 | 0 | 0 |
| $X_{50}$ | 0 | 0 | 0 | 1 | 1 | 1 | 1 | 0 | 1 | 0 |
| $X_{51}$ | 1 | 0 | 0 | 0 | 1 | 1 | 0 | 0 | 0 | 1 |
| $X_{52}$ | 0 | 0 | 1 | 0 | 1 | 1 | 0 | 0 | 0 | 1 |
| $X_{53}$ | 1 | 1 | 0 | 0 | 1 | 1 | 0 | 0 | 1 | 1 |
| $X_{54}$ | 0 | 1 | 0 | 1 | 1 | 0 | 1 | 0 | 0 | 1 |
| $X_{55}$ | 0 | 1 | 1 | 0 | 1 | 1 | 1 | 0 | 0 | 0 |
| $X_{56}$ | 1 | 1 | 1 | 1 | 1 | 1 | 1 | 1 | 1 | 1 |
| $X_{60}$ | 1 | 0 | 0 | 1 | 0 | 1 | 1 | 0 | 0 | 1 |
| $X_{61}$ | 0 | 1 | 0 | 1 | 0 | 1 | 0 | 1 | 0 | 1 |
| $X_{62}$ | 1 | 0 | 0 | 1 | 1 | 1 | 0 | 1 | 0 | 0 |
| $X_{63}$ | 1 | 0 | 0 | 1 | 1 | 1 | 0 | 0 | 0 | 0 |
| $X_{64}$ | 0 | 1 | 0 | 1 | 0 | 1 | 0 | 1 | 0 | 1 |
| $X_{65}$ | 1 | 1 | 1 | 1 | 1 | 0 | 0 | 0 | 0 | 0 |
| $X_{66}$ | 1 | 1 | 0 | 1 | 0 | 0 | 1 | 1 | 1 | 0 |

A specific example is given in Table 1-34. This embodiment is not limited to the mapping relationship in Table 1-34. Any mapping relationship obtained through simple variation on the basis of Table 1-34 also falls within the scope of this embodiment, for example, sequences among columns are randomly changed on the basis of Table 1-34, or negation is performed on a value of a certain column.

A fourth embodiment of a method for encoding a joint feedback signal according to the present invention is illustrated below.

A difference between this embodiment and the first embodiment of the method for encoding a joint feedback signal lies in the mapping relationship between the sending modes and the codebook structure types. The mapping relationship between the sending modes and the codebook structure types in this embodiment can be referred to in Table 1-35.

TABLE 1-35

Mapping Relationship Between Sending Modes and Codebook Structure Types Employed in Fourth Embodiment of Method for Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-4C | Encoding Scheme 3 for Single Stream-Single Stream Mode |
| Dual Stream-Single Stream | 6A-2B-6C | Encoding Scheme 3 for Dual Stream-Single Stream Mode |
| Single Stream-Dual Stream | 6A-2B-6C | Encoding Scheme 2 for Single Stream-Dual Stream Mode |
| Dual Stream-Dual Stream | 6A-6B-6C-6D | Encoding Scheme 1 for Dual Stream-Dual Stream Mode |

The scheme needs 24 codewords in total. According to the mapping relationship between the sending modes and the codebook structures, mapping relationship between the joint feedback signals and codewords are provided in this embodiment, which can be referred to in Table 1-36.

TABLE 1-36

Mapping Relationship Between Joint Feedback Signals and Codewords

| | | Secondary | | | | | | |
|---|---|---|---|---|---|---|---|---|
| | | Single Stream | | Single/Dual Stream | Dual Stream | | | |
| | Primary | ACK | NACK | DTX | ACK_ACK | ACK_NACK | NACK_ACK | NACK_NACK |
| Single Stream | ACK | $X_{11}=C1$ | $X_{12}=C2$ | $X_{10}=A1$ | $X_{13}=C1$ | $X_{14}=C2$ | $X_{15}=C3$ | $X_{16}=A2$ |
| | NACK | $X_{21}=C3$ | $X_{22}=C4$ | $X_{20}=B1$ | $X_{23}=C4$ | $X_{24}=C5$ | $X_{25}=C6$ | $X_{26}=B3$ |
| Single/Dual Stream | DTX | $X_{01}=A2$ | $X_{02}=B2$ | $X_{00}=DTX$ | $X_{03}=A3$ | $X_{04}=A4$ | $X_{05}=A5$ | $X_{06}=A6$ |
| Dual Stream | ACK_ACK | $X_{31}=C1$ | $X_{32}=A4$ | $X_{30}=C3$ | $X_{33}=D6$ | $X_{34}=D1$ | $X_{35}=D2$ | $X_{36}=B3$ |
| | ACK_NACK | $X_{41}=A1$ | $X_{42}=A5$ | $X_{40}=C4$ | $X_{43}=B1$ | $X_{44}=B5$ | $X_{45}=D5$ | $X_{46}=A2$ |
| | NACK_ACK | $X_{51}=A3$ | $X_{52}=A6$ | $X_{50}=C5$ | $X_{53}=B2$ | $X_{54}=D4$ | $X_{55}=B4$ | $X_{56}=A1$ |
| | NACK_NACK | $X_{61}=C2$ | $X_{62}=B1$ | $X_{60}=C6$ | $X_{63}=D3$ | $X_{64}=C2$ | $X_{65}=C1$ | $X_{66}=B6$ |

Further, values of the needed 24 codewords are provided in this embodiment, which can be referred to in Table 1-30.

Mapping relationship between $X_{ij}$ and the codeword values are obtained according to Tables 1-30 and 1-36, which can be referred to in Table 1-37.

TABLE 1-37

Mapping Relationship Between $X_{ij}$ and Codeword Values

| | | | | | | | | | | |
|---|---|---|---|---|---|---|---|---|---|---|
| $X_{01}$ | 0 | 0 | 1 | 1 | 0 | 0 | 1 | 1 | 0 | 0 |
| $X_{02}$ | 1 | 1 | 0 | 0 | 1 | 1 | 0 | 0 | 1 | 1 |
| $X_{03}$ | 1 | 1 | 0 | 0 | 0 | 1 | 1 | 0 | 0 | 0 |
| $X_{04}$ | 1 | 0 | 0 | 1 | 0 | 0 | 0 | 0 | 1 | 1 |
| $X_{05}$ | 0 | 1 | 0 | 0 | 1 | 0 | 0 | 1 | 1 | 0 |
| $X_{06}$ | 0 | 0 | 1 | 0 | 1 | 1 | 0 | 0 | 0 | 1 |
| $X_{10}$ | 1 | 1 | 1 | 1 | 1 | 1 | 1 | 1 | 1 | 1 |
| $X_{11}$ | 1 | 1 | 1 | 1 | 1 | 0 | 0 | 0 | 0 | 0 |
| $X_{12}$ | 0 | 1 | 0 | 1 | 0 | 1 | 0 | 1 | 0 | 1 |
| $X_{13}$ | 1 | 1 | 1 | 1 | 1 | 0 | 0 | 0 | 0 | 0 |
| $X_{14}$ | 0 | 1 | 0 | 1 | 0 | 1 | 0 | 1 | 0 | 1 |
| $X_{15}$ | 0 | 1 | 1 | 0 | 0 | 0 | 1 | 0 | 1 | 1 |
| $X_{16}$ | 0 | 0 | 1 | 1 | 0 | 0 | 1 | 1 | 0 | 0 |
| $X_{20}$ | 0 | 0 | 0 | 0 | 0 | 0 | 0 | 0 | 0 | 0 |
| $X_{21}$ | 0 | 1 | 1 | 0 | 0 | 0 | 1 | 0 | 1 | 1 |
| $X_{22}$ | 1 | 0 | 1 | 0 | 0 | 1 | 0 | 1 | 1 | 0 |
| $X_{23}$ | 1 | 0 | 1 | 0 | 0 | 1 | 0 | 1 | 1 | 0 |
| $X_{24}$ | 0 | 0 | 0 | 1 | 1 | 1 | 1 | 0 | 1 | 0 |
| $X_{25}$ | 1 | 0 | 0 | 0 | 1 | 0 | 1 | 1 | 0 | 1 |
| $X_{26}$ | 0 | 0 | 1 | 1 | 1 | 0 | 0 | 1 | 1 | 1 |
| $X_{30}$ | 0 | 1 | 1 | 0 | 0 | 0 | 1 | 0 | 1 | 1 |
| $X_{31}$ | 1 | 1 | 1 | 1 | 1 | 0 | 0 | 0 | 0 | 0 |
| $X_{32}$ | 1 | 0 | 0 | 1 | 0 | 0 | 0 | 0 | 1 | 1 |
| $X_{33}$ | 0 | 1 | 1 | 1 | 0 | 1 | 0 | 0 | 1 | 0 |
| $X_{34}$ | 0 | 0 | 0 | 0 | 0 | 1 | 1 | 1 | 1 | 1 |
| $X_{35}$ | 1 | 0 | 1 | 0 | 1 | 0 | 1 | 0 | 1 | 0 |
| $X_{36}$ | 0 | 0 | 1 | 1 | 1 | 0 | 0 | 1 | 1 | 1 |
| $X_{40}$ | 1 | 0 | 1 | 0 | 0 | 1 | 0 | 1 | 1 | 0 |
| $X_{41}$ | 1 | 1 | 1 | 1 | 1 | 1 | 1 | 1 | 1 | 1 |
| $X_{42}$ | 0 | 1 | 0 | 0 | 1 | 0 | 0 | 1 | 1 | 0 |
| $X_{43}$ | 0 | 0 | 0 | 0 | 0 | 0 | 0 | 0 | 0 | 0 |
| $X_{44}$ | 1 | 0 | 1 | 1 | 0 | 1 | 1 | 0 | 0 | 1 |
| $X_{45}$ | 1 | 1 | 1 | 0 | 0 | 0 | 1 | 0 | 0 | 1 |
| $X_{46}$ | 0 | 0 | 1 | 1 | 0 | 0 | 1 | 1 | 0 | 0 |
| $X_{50}$ | 0 | 0 | 0 | 1 | 1 | 1 | 1 | 0 | 1 | 0 |
| $X_{51}$ | 1 | 1 | 0 | 0 | 0 | 1 | 1 | 0 | 0 | 0 |
| $X_{52}$ | 0 | 0 | 1 | 0 | 1 | 1 | 0 | 0 | 0 | 1 |
| $X_{53}$ | 1 | 1 | 0 | 0 | 1 | 1 | 0 | 0 | 1 | 1 |
| $X_{54}$ | 0 | 1 | 0 | 1 | 1 | 0 | 1 | 0 | 0 | 1 |
| $X_{55}$ | 0 | 1 | 1 | 0 | 1 | 1 | 1 | 1 | 0 | 0 |
| $X_{56}$ | 1 | 1 | 1 | 1 | 1 | 1 | 1 | 1 | 1 | 1 |
| $X_{60}$ | 1 | 0 | 0 | 0 | 1 | 0 | 1 | 1 | 0 | 1 |
| $X_{61}$ | 0 | 1 | 0 | 1 | 0 | 1 | 0 | 1 | 0 | 1 |
| $X_{62}$ | 0 | 0 | 0 | 0 | 0 | 0 | 0 | 0 | 0 | 0 |
| $X_{63}$ | 1 | 0 | 0 | 1 | 1 | 1 | 0 | 1 | 0 | 0 |
| $X_{64}$ | 0 | 1 | 0 | 1 | 0 | 1 | 0 | 1 | 0 | 1 |
| $X_{65}$ | 1 | 1 | 1 | 1 | 1 | 0 | 0 | 0 | 0 | 0 |
| $X_{66}$ | 1 | 1 | 0 | 1 | 0 | 0 | 1 | 1 | 1 | 0 |

A specific example is given in Table 1-37. This embodiment is not limited to the mapping relationship in Table 1-37. Any mapping relationship obtained through simple variation on the basis of Table 1-37 also falls within the scope of this embodiment, for example, sequences among columns are randomly changed on the basis of Table 1-37, or negation is performed on a value of a certain column.

A fifth embodiment of a method for encoding a joint feedback signal according to the present invention is illustrated below.

A difference between this embodiment and the first embodiment of the method for encoding a joint feedback signal lies in the mapping relationship between the sending modes and the codebook structure types. The mapping relationship between the sending modes and the codebook structure types in this embodiment can be referred to in Table 1-38.

TABLE 1-38

Mapping Relationship Between Sending Modes and Codebook Structure Types Employed in Fifth Embodiment of Method For Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-4C | Encoding Scheme 3 for Single Stream-Single Stream Mode |
| Dual Stream-Single Stream | 6A-2B-6C | Encoding Scheme 3 for Dual Stream-Single Stream Mode |
| Single Stream-Dual Stream | 6A-2B-6C | Encoding Scheme 3 for Single Stream-Dual Stream Mode |
| Dual Stream-Dual Stream | 6A-6B-6C-6D | Encoding Scheme 2 for Dual Stream-Dual Stream Mode |

The scheme needs 24 codewords in total. According to the mapping relationship between the sending modes and the codebook structures, mapping relationship between the joint feedback signals and codewords are provided in this embodiment, which can be referred to in Table 1-39.

TABLE 1-39

Mapping Relationship Between Joint Feedback Signals and Codewords

| Primary | | | Secondary | | | | | |
|---|---|---|---|---|---|---|---|---|
| | | Single Stream | | Single/Dual Stream | Dual Stream | | | |
| | | ACK | NACK | DTX | ACK_ACK | ACK_NACK | NACK_ACK | NACK_NACK |
| Single Stream | ACK | $X_{11}=C1$ | $X_{12}=C2$ | $X_{10}=A1$ | $X_{13}=D5$ | $X_{14}=A2$ | $X_{15}=A3$ | $X_{16}=D6$ |
| | NACK | $X_{21}=C3$ | $X_{22}=C4$ | $X_{20}=B1$ | $X_{23}=A4$ | $X_{24}=A5$ | $X_{25}=A6$ | $X_{26}=B2$ |
| Single/Dual Stream | DTX | $X_{01}=A2$ | $X_{02}=B2$ | $X_{00}=DTX$ | $X_{03}=D1$ | $X_{04}=D2$ | $X_{05}=D3$ | $X_{06}=D4$ |
| Dual Stream | ACK_ACK | $X_{31}=C5$ | $X_{32}=A4$ | $X_{30}=C1$ | $X_{33}=B4$ | $X_{34}=D5$ | $X_{35}=B2$ | $X_{36}=B1$ |
| | ACK_NACK | $X_{41}=A1$ | $X_{42}=A5$ | $X_{40}=C2$ | $X_{43}=C5$ | $X_{44}=B3$ | $X_{45}=D6$ | $X_{46}=A6$ |
| | NACK_ACK | $X_{51}=A3$ | $X_{52}=A6$ | $X_{50}=C3$ | $X_{53}=B6$ | $X_{54}=C6$ | $X_{55}=A3$ | $X_{56}=A5$ |
| | NACK_NACK | $X_{61}=C6$ | $X_{62}=B1$ | $X_{60}=C4$ | $X_{63}=B5$ | $X_{64}=A2$ | $X_{65}=A1$ | $X_{66}=A4$ |

Furthermore, values of the needed 24 codewords are provided in this embodiment, which can be referred to in Table 1-30.

Mapping relationship between $X_{ij}$ and the codeword values are obtained according to Tables 1-30 and 1-39, which can be referred to in Table 1-40.

TABLE 1-40

Mapping Relationship Between $X_{ij}$ and Codeword Values

| | | | | | | | | | | |
|---|---|---|---|---|---|---|---|---|---|---|
| $X_{01}$ | 0 | 0 | 1 | 1 | 0 | 0 | 1 | 1 | 0 | 0 |
| $X_{02}$ | 1 | 1 | 0 | 0 | 1 | 1 | 0 | 0 | 1 | 1 |
| $X_{03}$ | 0 | 0 | 0 | 0 | 0 | 1 | 1 | 1 | 1 | 1 |
| $X_{04}$ | 1 | 0 | 1 | 0 | 1 | 0 | 1 | 0 | 1 | 0 |
| $X_{05}$ | 1 | 0 | 0 | 1 | 1 | 1 | 0 | 1 | 0 | 0 |
| $X_{06}$ | 0 | 1 | 0 | 1 | 1 | 0 | 1 | 0 | 0 | 1 |
| $X_{10}$ | 1 | 1 | 1 | 1 | 1 | 1 | 1 | 1 | 1 | 1 |
| $X_{11}$ | 1 | 1 | 1 | 1 | 0 | 0 | 0 | 0 | 0 | 0 |
| $X_{12}$ | 0 | 1 | 0 | 1 | 0 | 1 | 0 | 1 | 0 | 1 |
| $X_{13}$ | 1 | 1 | 1 | 0 | 0 | 0 | 0 | 1 | 0 | 1 |
| $X_{14}$ | 0 | 0 | 1 | 1 | 0 | 0 | 1 | 1 | 1 | 0 |
| $X_{15}$ | 1 | 1 | 0 | 0 | 0 | 1 | 1 | 0 | 0 | 0 |
| $X_{16}$ | 0 | 1 | 1 | 1 | 0 | 1 | 0 | 0 | 1 | 0 |
| $X_{20}$ | 0 | 0 | 0 | 0 | 0 | 0 | 0 | 0 | 0 | 0 |
| $X_{21}$ | 0 | 1 | 1 | 0 | 0 | 0 | 1 | 0 | 1 | 1 |
| $X_{22}$ | 1 | 0 | 1 | 0 | 0 | 1 | 0 | 1 | 1 | 0 |
| $X_{23}$ | 1 | 0 | 0 | 1 | 0 | 0 | 0 | 0 | 1 | 1 |
| $X_{24}$ | 0 | 1 | 0 | 0 | 1 | 0 | 0 | 1 | 1 | 0 |
| $X_{25}$ | 0 | 0 | 1 | 0 | 1 | 1 | 0 | 0 | 0 | 1 |
| $X_{26}$ | 1 | 1 | 0 | 0 | 1 | 1 | 0 | 0 | 1 | 1 |
| $X_{30}$ | 1 | 1 | 1 | 1 | 1 | 0 | 0 | 0 | 0 | 0 |
| $X_{31}$ | 0 | 0 | 0 | 1 | 1 | 1 | 1 | 0 | 1 | 0 |
| $X_{32}$ | 1 | 0 | 0 | 1 | 0 | 0 | 0 | 0 | 1 | 1 |
| $X_{33}$ | 0 | 1 | 1 | 0 | 1 | 1 | 1 | 1 | 0 | 0 |
| $X_{34}$ | 1 | 1 | 1 | 0 | 0 | 0 | 0 | 1 | 0 | 1 |
| $X_{35}$ | 1 | 1 | 0 | 0 | 1 | 1 | 0 | 0 | 1 | 1 |
| $X_{36}$ | 0 | 0 | 0 | 0 | 0 | 0 | 0 | 0 | 0 | 0 |
| $X_{40}$ | 0 | 1 | 0 | 1 | 0 | 1 | 0 | 1 | 0 | 1 |
| $X_{41}$ | 1 | 1 | 1 | 1 | 1 | 1 | 1 | 1 | 1 | 1 |
| $X_{42}$ | 0 | 1 | 0 | 0 | 1 | 0 | 0 | 1 | 1 | 0 |
| $X_{43}$ | 0 | 0 | 1 | 1 | 1 | 1 | 0 | 1 | 0 | 0 |
| $X_{44}$ | 0 | 0 | 1 | 1 | 1 | 0 | 0 | 1 | 1 | 1 |
| $X_{45}$ | 0 | 1 | 1 | 1 | 0 | 1 | 0 | 0 | 1 | 0 |
| $X_{46}$ | 0 | 0 | 1 | 0 | 1 | 1 | 0 | 0 | 0 | 1 |
| $X_{50}$ | 0 | 1 | 1 | 0 | 0 | 0 | 1 | 0 | 1 | 1 |
| $X_{51}$ | 1 | 1 | 0 | 0 | 0 | 1 | 1 | 0 | 0 | 0 |
| $X_{52}$ | 0 | 0 | 1 | 0 | 1 | 1 | 0 | 0 | 0 | 1 |
| $X_{53}$ | 1 | 1 | 0 | 1 | 0 | 0 | 1 | 1 | 1 | 0 |
| $X_{54}$ | 1 | 0 | 0 | 0 | 1 | 0 | 1 | 1 | 0 | 1 |
| $X_{55}$ | 1 | 1 | 0 | 0 | 0 | 1 | 1 | 0 | 0 | 0 |
| $X_{56}$ | 0 | 1 | 0 | 0 | 1 | 0 | 0 | 1 | 1 | 0 |
| $X_{60}$ | 1 | 0 | 1 | 0 | 0 | 1 | 0 | 1 | 1 | 0 |
| $X_{61}$ | 1 | 0 | 0 | 0 | 1 | 0 | 1 | 1 | 0 | 1 |
| $X_{62}$ | 0 | 0 | 0 | 0 | 0 | 0 | 0 | 0 | 0 | 0 |
| $X_{63}$ | 1 | 0 | 1 | 1 | 0 | 1 | 1 | 0 | 0 | 1 |
| $X_{64}$ | 0 | 0 | 1 | 1 | 0 | 0 | 1 | 1 | 0 | 0 |
| $X_{65}$ | 1 | 1 | 1 | 1 | 1 | 1 | 1 | 1 | 1 | 1 |
| $X_{66}$ | 1 | 0 | 0 | 1 | 0 | 0 | 0 | 0 | 1 | 1 |

A specific example is given in Table 1-40. This embodiment is not limited to the mapping relationship in Table 1-40. Any mapping relationship obtained through simple variation on the basis of Table 1-40 also falls within the scope of this embodiment, for example, sequences among columns are randomly changed on the basis of Table 1-40, or negation is performed on a value of a certain column.

A sixth embodiment of a method for encoding a joint feedback signal according to the present invention is illustrated below.

A difference between this embodiment and the first embodiment of the method for encoding a joint feedback signal lies in the mapping relationship between the sending modes and the codebook structure types. The mapping relationship between the sending modes and the codebook structure types in this embodiment can be referred to in Table 1-41.

TABLE 1-41

Mapping Relationship Between Sending Modes and Codebook Structure Types Employed in Sixth Embodiment of Method For Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | A-B-5C-D | Encoding Scheme 2 for Single Stream-Single Stream Mode |
| Dual Stream-Single Stream | 6A-3C-3D-E-F | Encoding Scheme 1 for Dual Stream-Single Stream Mode |
| Single Stream-Dual Stream | 6A-3C-3D-E-F | Encoding Scheme 1 for Single Stream-Dual Stream Mode |
| Dual Stream-Dual Stream | 6A-6B-6C-6D | Encoding Scheme 1 for Dual Stream-Dual Stream Mode |

The scheme needs 24 codewords in total. According to the mapping relationship between the sending modes and the codebook structures, a specific example of the mapping relationship between the joint feedback signals and codewords is provided in this embodiment, which can be referred to in Table 1-42.

TABLE 1-42

Mapping Relationship Between $X_{ij}$ and Codeword Values

| | | | | | | | | | | |
|---|---|---|---|---|---|---|---|---|---|---|
| $X_{01}$ | 1 | 1 | 1 | 1 | 1 | 0 | 0 | 0 | 0 | 0 |
| $X_{02}$ | 0 | 0 | 0 | 0 | 0 | 1 | 1 | 1 | 1 | 1 |
| $X_{03}$ | 1 | 1 | 1 | 1 | 1 | 0 | 0 | 1 | 0 | 0 |
| $X_{04}$ | 1 | 1 | 1 | 0 | 0 | 1 | 1 | 0 | 1 | 0 |
| $X_{05}$ | 0 | 0 | 1 | 1 | 0 | 1 | 0 | 0 | 0 | 1 |
| $X_{06}$ | 0 | 1 | 0 | 0 | 0 | 0 | 1 | 1 | 0 | 1 |
| $X_{10}$ | 1 | 1 | 1 | 1 | 1 | 1 | 1 | 1 | 1 | 1 |
| $X_{11}$ | 0 | 1 | 0 | 0 | 1 | 0 | 1 | 0 | 0 | 1 |
| $X_{12}$ | 0 | 1 | 1 | 0 | 0 | 1 | 0 | 1 | 1 | 0 |
| $X_{13}$ | 0 | 0 | 0 | 1 | 1 | 0 | 1 | 0 | 1 | 0 |
| $X_{14}$ | 1 | 0 | 1 | 0 | 1 | 0 | 1 | 0 | 0 | 1 |
| $X_{15}$ | 1 | 1 | 0 | 1 | 0 | 0 | 0 | 0 | 1 | 1 |
| $X_{16}$ | 1 | 0 | 0 | 0 | 1 | 1 | 0 | 1 | 1 | 1 |
| $X_{20}$ | 0 | 0 | 0 | 0 | 0 | 0 | 0 | 0 | 0 | 0 |
| $X_{21}$ | 1 | 0 | 1 | 0 | 0 | 1 | 0 | 1 | 1 | 0 |
| $X_{22}$ | 0 | 0 | 0 | 1 | 1 | 1 | 1 | 0 | 1 | 0 |
| $X_{23}$ | 1 | 0 | 0 | 1 | 0 | 1 | 1 | 1 | 0 | 0 |
| $X_{24}$ | 0 | 0 | 1 | 0 | 1 | 1 | 1 | 1 | 0 | 0 |
| $X_{25}$ | 0 | 1 | 0 | 1 | 0 | 1 | 0 | 1 | 1 | 0 |
| $X_{26}$ | 0 | 1 | 1 | 0 | 1 | 0 | 0 | 0 | 1 | 1 |
| $X_{30}$ | 1 | 0 | 0 | 0 | 1 | 1 | 1 | 1 | 0 | 1 |
| $X_{31}$ | 0 | 0 | 0 | 0 | 1 | 1 | 0 | 0 | 1 | 0 |
| $X_{32}$ | 0 | 1 | 0 | 1 | 1 | 1 | 1 | 1 | 0 | 0 |
| $X_{33}$ | 1 | 0 | 1 | 1 | 1 | 1 | 0 | 0 | 1 | 0 |
| $X_{34}$ | 1 | 0 | 1 | 0 | 0 | 0 | 1 | 1 | 1 | 1 |
| $X_{35}$ | 1 | 1 | 0 | 1 | 1 | 1 | 0 | 0 | 0 | 1 |
| $X_{36}$ | 0 | 0 | 0 | 0 | 0 | 1 | 1 | 0 | 1 | 1 |
| $X_{40}$ | 1 | 1 | 0 | 1 | 0 | 1 | 0 | 1 | 1 | 1 |
| $X_{41}$ | 1 | 1 | 1 | 0 | 0 | 1 | 1 | 0 | 1 | 0 |
| $X_{42}$ | 1 | 1 | 0 | 0 | 1 | 0 | 1 | 1 | 1 | 0 |
| $X_{43}$ | 1 | 1 | 1 | 0 | 0 | 0 | 0 | 0 | 0 | 1 |
| $X_{44}$ | 1 | 1 | 0 | 0 | 1 | 0 | 1 | 1 | 1 | 0 |
| $X_{45}$ | 1 | 0 | 0 | 0 | 0 | 1 | 0 | 1 | 0 | 0 |
| $X_{46}$ | 1 | 0 | 0 | 0 | 1 | 0 | 0 | 0 | 1 | 1 |
| $X_{50}$ | 0 | 1 | 1 | 1 | 1 | 0 | 1 | 0 | 1 | 1 |
| $X_{51}$ | 0 | 0 | 1 | 1 | 0 | 1 | 0 | 0 | 0 | 1 |
| $X_{52}$ | 0 | 0 | 0 | 1 | 1 | 0 | 0 | 1 | 0 | 1 |
| $X_{53}$ | 0 | 1 | 1 | 1 | 0 | 1 | 1 | 1 | 0 | 0 |
| $X_{54}$ | 0 | 0 | 1 | 0 | 1 | 0 | 1 | 0 | 0 | 0 |
| $X_{55}$ | 0 | 0 | 0 | 1 | 1 | 0 | 1 | 0 | 0 | 1 |
| $X_{56}$ | 0 | 0 | 0 | 1 | 1 | 1 | 1 | 1 | 0 | 0 |
| $X_{60}$ | 1 | 0 | 0 | 0 | 0 | 1 | 0 | 0 | 0 | 0 |
| $X_{61}$ | 0 | 1 | 0 | 0 | 0 | 0 | 0 | 1 | 0 | 0 |
| $X_{62}$ | 1 | 0 | 1 | 0 | 0 | 0 | 0 | 0 | 1 | 1 |
| $X_{63}$ | 0 | 1 | 0 | 1 | 0 | 0 | 0 | 0 | 1 | 0 |
| $X_{64}$ | 0 | 0 | 1 | 0 | 0 | 0 | 0 | 1 | 1 | 0 |

TABLE 1-42-continued

Mapping Relationship Between $X_{ij}$ and Codeword Values

| | | | | | | | | | | |
|---|---|---|---|---|---|---|---|---|---|---|
| $X_{65}$ | 0 | 1 | 0 | 0 | 1 | 1 | 0 | 0 | 0 | 0 |
| $X_{66}$ | 0 | 1 | 1 | 0 | 1 | 1 | 0 | 1 | 1 | 1 |

A specific example is given in Table 1-42. This embodiment is not limited to the mapping relationship in Table 1-42. Any mapping relationship obtained through simple variation on the basis of Table 1-42 also falls within the scope of this embodiment, for example, sequences among columns are randomly changed on the basis of Table 1-42, or negation is performed on a value of a certain column.

A seventh embodiment of a method for encoding a joint feedback signal according to the present invention is illustrated below.

A difference between this embodiment and the first embodiment of the method for encoding a joint feedback signal lies in the mapping relationship between the sending modes and the codebook structure types. This embodiment covers the feedback scheme for a single-carrier configured with MIMO in content and is slightly more preferred than the first embodiment in decoding performance. The used codewords are as follows.

TABLE 1-43

Mapping Relationship Between $X_{ij}$ and Codeword Values

| | | | | | | | | | | |
|---|---|---|---|---|---|---|---|---|---|---|
| $X_{01}$ | 1 | 1 | 1 | 1 | 1 | 0 | 0 | 0 | 0 | 0 |
| $X_{02}$ | 0 | 0 | 0 | 1 | 1 | 1 | 1 | 0 | 1 | 0 |
| $X_{03}$ | 1 | 1 | 1 | 1 | 1 | 0 | 0 | 1 | 0 | 0 |
| $X_{04}$ | 1 | 1 | 1 | 0 | 0 | 1 | 1 | 0 | 1 | 0 |
| $X_{05}$ | 0 | 0 | 1 | 1 | 0 | 1 | 0 | 0 | 0 | 1 |
| $X_{06}$ | 0 | 1 | 0 | 0 | 0 | 0 | 1 | 1 | 0 | 1 |
| $X_{10}$ | 1 | 1 | 1 | 1 | 1 | 1 | 1 | 1 | 1 | 1 |
| $X_{11}$ | 0 | 1 | 0 | 1 | 0 | 1 | 0 | 1 | 0 | 1 |
| $X_{12}$ | 0 | 1 | 1 | 0 | 0 | 1 | 0 | 1 | 1 | 1 |
| $X_{13}$ | 0 | 0 | 0 | 1 | 1 | 0 | 1 | 0 | 1 | 0 |
| $X_{14}$ | 1 | 0 | 1 | 0 | 1 | 0 | 1 | 0 | 0 | 1 |
| $X_{15}$ | 1 | 1 | 0 | 1 | 0 | 0 | 0 | 0 | 1 | 1 |
| $X_{16}$ | 1 | 0 | 0 | 0 | 1 | 1 | 0 | 1 | 1 | 1 |
| $X_{20}$ | 0 | 0 | 0 | 0 | 0 | 0 | 0 | 0 | 0 | 0 |
| $X_{21}$ | 1 | 0 | 1 | 0 | 0 | 1 | 0 | 1 | 1 | 0 |
| $X_{22}$ | 0 | 0 | 0 | 1 | 1 | 1 | 1 | 0 | 1 | 0 |
| $X_{23}$ | 1 | 0 | 0 | 1 | 0 | 1 | 1 | 1 | 0 | 0 |
| $X_{24}$ | 0 | 0 | 1 | 0 | 1 | 1 | 1 | 1 | 0 | 0 |
| $X_{25}$ | 0 | 1 | 0 | 1 | 0 | 1 | 0 | 1 | 1 | 0 |
| $X_{26}$ | 0 | 1 | 1 | 0 | 1 | 0 | 0 | 0 | 1 | 1 |
| $X_{30}$ | 1 | 0 | 1 | 0 | 1 | 1 | 1 | 1 | 0 | 1 |
| $X_{31}$ | 0 | 1 | 0 | 0 | 1 | 1 | 0 | 0 | 0 | 0 |
| $X_{32}$ | 1 | 0 | 0 | 0 | 1 | 0 | 0 | 0 | 1 | 1 |
| $X_{33}$ | 1 | 0 | 1 | 1 | 1 | 1 | 0 | 0 | 1 | 0 |
| $X_{34}$ | 1 | 0 | 1 | 1 | 0 | 0 | 1 | 1 | 1 | 0 |
| $X_{35}$ | 1 | 1 | 0 | 1 | 1 | 1 | 1 | 0 | 0 | 1 |
| $X_{36}$ | 0 | 0 | 0 | 0 | 0 | 1 | 1 | 0 | 1 | 1 |
| $X_{40}$ | 1 | 1 | 0 | 1 | 0 | 1 | 0 | 1 | 1 | 1 |
| $X_{41}$ | 1 | 1 | 1 | 0 | 0 | 1 | 1 | 0 | 1 | 0 |
| $X_{42}$ | 1 | 1 | 0 | 0 | 1 | 0 | 1 | 1 | 1 | 0 |
| $X_{43}$ | 1 | 1 | 1 | 0 | 0 | 0 | 0 | 0 | 0 | 1 |
| $X_{44}$ | 1 | 1 | 0 | 0 | 1 | 0 | 1 | 1 | 1 | 0 |
| $X_{45}$ | 1 | 0 | 0 | 0 | 0 | 1 | 0 | 1 | 0 | 0 |
| $X_{46}$ | 1 | 0 | 0 | 0 | 1 | 0 | 0 | 0 | 1 | 1 |
| $X_{50}$ | 0 | 1 | 1 | 1 | 1 | 0 | 1 | 0 | 1 | 1 |
| $X_{51}$ | 0 | 0 | 1 | 1 | 0 | 1 | 0 | 0 | 0 | 1 |
| $X_{52}$ | 0 | 0 | 0 | 1 | 1 | 0 | 0 | 1 | 0 | 1 |
| $X_{53}$ | 0 | 1 | 1 | 1 | 0 | 1 | 1 | 1 | 0 | 0 |
| $X_{54}$ | 0 | 0 | 1 | 0 | 1 | 0 | 1 | 0 | 0 | 0 |
| $X_{55}$ | 0 | 0 | 0 | 1 | 1 | 0 | 0 | 1 | 0 | 1 |
| $X_{56}$ | 0 | 0 | 0 | 1 | 1 | 1 | 1 | 1 | 1 | 0 |
| $X_{60}$ | 1 | 0 | 0 | 1 | 0 | 0 | 1 | 0 | 0 | 0 |
| $X_{61}$ | 0 | 0 | 1 | 0 | 0 | 0 | 1 | 1 | 1 | 0 |
| $X_{62}$ | 0 | 1 | 1 | 0 | 1 | 1 | 1 | 0 | 0 | 0 |
| $X_{63}$ | 0 | 1 | 0 | 1 | 0 | 0 | 0 | 0 | 1 | 1 |
| $X_{64}$ | 0 | 0 | 1 | 0 | 0 | 0 | 0 | 1 | 1 | 0 |

TABLE 1-43-continued

Mapping Relationship Between $X_{ij}$ and Codeword Values

| | | | | | | | | | | |
|---|---|---|---|---|---|---|---|---|---|---|
| $X_{65}$ | 0 | 1 | 0 | 0 | 1 | 1 | 0 | 0 | 0 | 0 |
| $X_{66}$ | 0 | 1 | 1 | 0 | 1 | 1 | 0 | 1 | 1 | 1 |

A specific example is given in Table 1-43. This embodiment is not limited to the mapping relationship in Table 1-43. Any mapping relationship obtained through simple variation on the basis of Table 1-43 also falls within the scope of this embodiment, for example, sequences among columns are randomly changed on the basis of Table 1-43, or negation is performed on a value of a certain column.

An eighth embodiment of a method for encoding a joint feedback signal according to the present invention is illustrated below.

This embodiment is the same as the first embodiment in the codebook structure type used in each sending mode in the method for encoding a joint feedback signal. However, a difference between the two embodiments lies in that this embodiment also considers performance in a PRE/POST mode. The mapping relationship between the sending modes and the codebook structure types in this embodiment can be referred to in Table 1-44.

TABLE 1-44

Mapping Relationship Between Sending Modes and Codebook Structure Types Employed in Eighth Embodiment of Method For Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-2C-2D | Table 1-15, Encoding Scheme 1 for Single Stream-Single Stream Mode |
| Dual Stream-Single Stream | 6A-3C-3D-E-F | Table 1-21, Encoding Scheme 1 for Dual Stream-Single Stream Mode |
| Single Stream-Dual Stream | 6A-3C-3D-E-F | Table 1-18, Encoding Scheme 1 for Single Stream-Dual Stream Mode |
| Dual Stream-Dual Stream | 6A-6B-6C-6D | Table 1-24, Encoding Scheme 1 for Dual Stream-Dual Stream Mode |

A specific example is given. A codebook structure used in each sending mode satisfies the codebook structure type and a mapping relationship provided in Table 1-44, and at the same time enables preferred performance when the PRE/POST mode is employed. Mapping relationship between $X_{ij}$ and the codeword values can be referred to in Table 1-45.

TABLE 1-45

Mapping Relationship Between $X_{ij}$ and Codeword Values

| | | | | | | | | | | | |
|---|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 0 | 0 | 1 | 1 | 0 | 1 |
| D/NA | $X_{05}$ | 0 | 0 | 0 | 1 | 1 | 1 | 1 | 1 | 1 | 0 |
| D/NN | $X_{06}$ | 1 | 1 | 1 | 1 | 1 | 0 | 0 | 1 | 0 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 0 | 1 | 0 | 0 | 1 | 1 | 0 | 0 | 0 |

TABLE 1-45-continued

Mapping Relationship Between $X_{ij}$ and Codeword Values

| | | | | | | | | | | |
|---|---|---|---|---|---|---|---|---|---|---|
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 1 | 0 | 0 | 1 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 0 | 0 | 0 | 1 | 1 | 0 | 0 | 1 | 0 |
| AA/N | $X_{32}$ | 0 | 1 | 0 | 1 | 1 | 1 | 1 | 1 | 0 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 0 | 1 | 1 | 1 | 1 |
| AA/NA | $X_{35}$ | 1 | 1 | 0 | 1 | 1 | 1 | 1 | 0 | 0 | 1 |
| AA/NN | $X_{36}$ | 0 | 1 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 1 | 1 | 0 | 1 | 0 |
| AN/N | $X_{42}$ | 1 | 1 | 0 | 0 | 1 | 0 | 1 | 1 | 1 | 0 |
| AN/AA | $X_{43}$ | 0 | 0 | 0 | 1 | 1 | 0 | 0 | 1 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 1 | 0 | 1 | 0 | 0 | 0 | 1 |
| NA/D | $X_{50}$ | 0 | 1 | 1 | 1 | 1 | 0 | 1 | 0 | 1 | 1 |
| NA/A | $X_{51}$ | 0 | 0 | 1 | 1 | 0 | 1 | 0 | 0 | 0 | 1 |
| NA/N | $X_{52}$ | 0 | 0 | 0 | 1 | 1 | 0 | 0 | 1 | 0 | 1 |
| NA/AA | $X_{53}$ | 1 | 1 | 0 | 0 | 1 | 0 | 1 | 1 | 1 | 0 |
| NA/AN | $X_{54}$ | 0 | 0 | 1 | 0 | 1 | 0 | 1 | 0 | 0 | 0 |
| NA/NA | $X_{55}$ | 1 | 0 | 1 | 1 | 1 | 1 | 0 | 0 | 1 | 0 |
| NA/NN | $X_{56}$ | 1 | 1 | 1 | 0 | 0 | 1 | 1 | 0 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 1 | 0 | 0 | 0 | 0 | 1 | 0 | 0 |
| NN/N | $X_{62}$ | 1 | 0 | 1 | 0 | 0 | 0 | 0 | 0 | 1 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 0 |
| NN/NN | $X_{66}$ | 0 | 0 | 0 | 0 | 0 | 1 | 1 | 0 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

In order to further improve the performance in the PRE/POST sending mode, the PRE/POST may use new codewords. A pair of feasible alternate codewords are provided in Table 1-46.

TABLE 1-46

A Pair of New PRE/POST Codewords Applicable in Schemes of the Eighth Embodiment
PRE/POST Indication Information

| | | | | | | | | | | |
|---|---|---|---|---|---|---|---|---|---|---|
| PRE | 0 | 0 | 1 | 1 | 0 | 0 | 0 | 1 | 1 | 1 |
| POST | 1 | 1 | 0 | 0 | 1 | 1 | 1 | 0 | 0 | 0 |

A specific example is given in Table 1-45. This embodiment is not limited to the mapping relationship in Table 1-45. Any mapping relationship obtained through simple variation on the basis of Table 1-45 also falls within the scope of this embodiment, for example, sequences among columns are randomly changed on the basis of Table 1-45, or negation is performed on a value of a certain column. In addition, equivalent variation or equivalent encoding and mapping is performed on the codebook structure in each sending mode, which also falls within the protection scope as long as the codebook structure type in each mode is not changed.

The new PRE/POST codewords provided in Table 1-46 have a characteristic that: a minimum code distance is at least four after PRE/POST codewords are included in the single stream-DTX, DTX-single stream, dual stream-DTX, and DTX-dual stream modes.

It is assumed that when the Node B schedules data on both carriers of a dual-carrier, the PRE/POST is not used during the detection of HARQ-ACK signals, and when the Node B only schedules data on one carrier of the dual-carrier, the PRE/POST is used during the detection of the HARQ-ACK signals. Therefore, a scheme having better performance is obtained according to Tables 1-44 and 1-45, as shown in Table 1-47.

TABLE 1-47

Mapping Relationship Between $X_{ij}$ and Codeword Values

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 0 | 1 | 1 | 0 | 0 | 1 |
| D/NA | $X_{05}$ | 0 | 0 | 0 | 1 | 1 | 1 | 1 | 1 | 1 | 0 |
| D/NN | $X_{06}$ | 1 | 1 | 1 | 1 | 1 | 1 | 0 | 0 | 0 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 0 | 1 | 0 | 0 | 0 | 1 | 1 | 0 | 0 |
| A/AN | $X_{14}$ | 1 | 0 | 0 | 1 | 0 | 1 | 1 | 0 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 0 | 0 | 1 | 1 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 1 | 1 | 1 | 0 | 1 | 0 | 0 | 1 | 0 |
| AA/N | $X_{32}$ | 0 | 1 | 1 | 1 | 0 | 1 | 1 | 1 | 0 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 1 | 1 | 0 | 1 | 1 |
| AA/NA | $X_{35}$ | 1 | 1 | 0 | 1 | 1 | 0 | 1 | 1 | 0 | 1 |
| AA/NN | $X_{36}$ | 0 | 1 | 1 | 0 | 1 | 1 | 1 | 0 | 0 | 0 |
| AN/D | $X_{40}$ | 1 | 0 | 1 | 0 | 1 | 0 | 1 | 0 | 1 | 1 |
| AN/A | $X_{41}$ | 1 | 1 | 0 | 0 | 1 | 1 | 0 | 1 | 1 | 0 |
| AN/N | $X_{42}$ | 1 | 1 | 1 | 0 | 0 | 0 | 1 | 1 | 1 | 0 |
| AN/AA | $X_{43}$ | 0 | 0 | 0 | 1 | 1 | 0 | 0 | 0 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 1 | 0 | 0 | 0 | 1 | 0 | 1 |
| NA/D | $X_{50}$ | 0 | 1 | 1 | 1 | 1 | 1 | 1 | 0 | 1 | 1 |
| NA/A | $X_{51}$ | 0 | 0 | 0 | 1 | 1 | 1 | 0 | 0 | 0 | 1 |
| NA/N | $X_{52}$ | 0 | 0 | 1 | 1 | 0 | 0 | 0 | 1 | 0 | 1 |
| NA/AA | $X_{53}$ | 1 | 1 | 0 | 0 | 1 | 1 | 1 | 0 | 1 | 0 |
| NA/AN | $X_{54}$ | 0 | 0 | 1 | 0 | 1 | 0 | 1 | 0 | 0 | 0 |
| NA/NA | $X_{55}$ | 1 | 0 | 1 | 1 | 1 | 0 | 0 | 1 | 1 | 0 |
| NA/NN | $X_{56}$ | 1 | 1 | 1 | 0 | 0 | 1 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 0 | 0 | 1 | 0 | 0 | 1 | 0 | 0 |
| NN/N | $X_{62}$ | 1 | 0 | 0 | 0 | 0 | 0 | 0 | 0 | 1 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 1 | 0 | 0 | 1 | 0 |
| NN/NA | $X_{65}$ | 0 | 1 | 0 | 0 | 1 | 0 | 0 | 1 | 0 | 0 |
| NN/NN | $X_{66}$ | 0 | 0 | 0 | 0 | 0 | 0 | 1 | 1 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

A ninth embodiment of a method for encoding a joint feedback signal according to the present invention is illustrated below.

The method for encoding a joint feedback signal in this embodiment employs another combination of codebook structure types. However, when specific codewords are given, this embodiment also considers the performance in the PRE/POST mode. The mapping relationship between the sending modes and the codebook structure types in this embodiment can be referred to in Table 1-48.

TABLE 1-48

Mapping Relationship Between Sending Modes and Codebook Structure Types Employed in Ninth Embodiment of Method For Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-4C | Table 1-17, Encoding Scheme 3 for Single Stream-Single Stream Mode |
| Dual Stream-Single Stream | 6A-2B-6C | Table 1-23, Encoding Scheme 3 for Dual Stream-ingle Stream Mode |
| Single Stream-Dual Stream | 6A-3C-3D-E-F | Table 1-18, Encoding Scheme 1 for Single Stream-Dual Stream Mode |
| Dual Stream-Dual Stream | 6A-6B-6C-6D | Table 1-24, Encoding Scheme 1 for Dual Stream-Dual Stream Mode |

Specific codewords that satisfy the constraints in Table 1-48 are shown in Table 1-49.

TABLE 1-49

Mapping Relationship Between $X_{ij}$ and Codeword Values

| D/A | $X_{01}$ | 0 | 0 | 0 | 0 | 0 | 0 | 1 | 1 | 1 | 1 |
|---|---|---|---|---|---|---|---|---|---|---|---|
| D/N | $X_{02}$ | 1 | 1 | 1 | 1 | 1 | 1 | 0 | 0 | 0 | 0 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 0 | 1 | 1 | 0 | 0 | 1 |
| D/NA | $X_{05}$ | 0 | 0 | 0 | 1 | 1 | 1 | 1 | 1 | 1 | 0 |
| D/NN | $X_{06}$ | 1 | 1 | 1 | 1 | 1 | 0 | 0 | 1 | 0 | 0 |
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 1 | 0 | 1 | 0 | 0 | 1 |
| A/AA | $X_{13}$ | 1 | 0 | 1 | 0 | 0 | 1 | 1 | 0 | 0 | 0 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 1 | 0 | 0 | 1 | 1 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 0 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 1 | 1 | 0 | 0 | 0 | 1 | 0 | 0 | 0 |
| AA/N | $X_{32}$ | 1 | 1 | 1 | 0 | 0 | 1 | 1 | 0 | 1 | 0 |
| AA/AA | $X_{33}$ | 0 | 1 | 1 | 0 | 1 | 0 | 1 | 1 | 1 | 1 |
| AA/AN | $X_{34}$ | 1 | 0 | 1 | 1 | 0 | 0 | 1 | 1 | 1 | 1 |
| AA/NA | $X_{35}$ | 1 | 1 | 0 | 1 | 1 | 1 | 1 | 0 | 0 | 1 |
| AA/NN | $X_{36}$ | 0 | 0 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 0 | 1 | 1 | 1 | 0 | 0 | 1 | 1 | 0 |
| AN/N | $X_{42}$ | 0 | 0 | 1 | 1 | 0 | 1 | 0 | 0 | 0 | 1 |
| AN/AA | $X_{43}$ | 0 | 0 | 0 | 1 | 1 | 0 | 0 | 1 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 0 | 1 | 0 | 0 | 0 | 0 | 1 |
| NA/D | $X_{50}$ | 0 | 1 | 1 | 1 | 1 | 0 | 1 | 0 | 1 | 1 |
| NA/A | $X_{51}$ | 0 | 1 | 0 | 1 | 1 | 1 | 1 | 1 | 0 | 0 |
| NA/N | $X_{52}$ | 1 | 0 | 0 | 0 | 1 | 0 | 0 | 0 | 0 | 1 |
| NA/AA | $X_{53}$ | 1 | 0 | 0 | 0 | 1 | 0 | 1 | 1 | 0 | 0 |
| NA/AN | $X_{54}$ | 0 | 0 | 1 | 0 | 0 | 1 | 0 | 1 | 0 | 0 |
| NA/NA | $X_{55}$ | 1 | 0 | 1 | 1 | 1 | 0 | 1 | 0 | 1 | 0 |
| NA/NN | $X_{56}$ | 1 | 1 | 1 | 0 | 0 | 1 | 0 | 1 | 0 | 0 |
| NN/D | $X_{60}$ | 1 | 0 | 0 | 1 | 0 | 0 | 1 | 0 | 0 | 0 |
| NN/A | $X_{61}$ | 0 | 0 | 0 | 0 | 1 | 1 | 0 | 0 | 1 | 0 |
| NN/N | $X_{62}$ | 0 | 1 | 0 | 0 | 0 | 1 | 1 | 0 | 0 | 1 |

TABLE 1-49-continued

Mapping Relationship Between $X_{ij}$ and Codeword Values

| NN/AA | $X_{63}$ | 0 | 1 | 0 | 1 | 0 | 0 | 0 | 0 | 1 | 0 |
|---|---|---|---|---|---|---|---|---|---|---|---|
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 1 |
| NN/NN | $X_{66}$ | 0 | 0 | 0 | 0 | 0 | 1 | 1 | 0 | 1 | 1 |

PRE/POST Indication Information

| PRE | 0 | 0 | 1 | 0 | 0 | 1 | 0 | 0 | 1 | 0 |
|---|---|---|---|---|---|---|---|---|---|---|
| POST | 0 | 1 | 0 | 0 | 1 | 0 | 0 | 1 | 0 | 0 |

In order to further improve the performance in the PRE/POST sending mode, the PRE/POST may use new codewords. A pair of feasible alternate codewords are provided in Table 1-50.

TABLE 1-50

A Pair of New PRE/POST Codewords Applicable in Schemes of the Ninth Embodiment
PRE/POST Indication Information

| PRE | 0 | 1 | 1 | 0 | 0 | 1 | 0 | 0 | 1 | 0 |
|---|---|---|---|---|---|---|---|---|---|---|
| POST | 0 | 1 | 0 | 0 | 1 | 0 | 0 | 1 | 1 | 0 |

A specific example is given in Table 1-49. This embodiment is not limited to the mapping relationship in Table 1-49. Any mapping relationship obtained through simple variation on the basis of Table 1-49 also falls within the scope of this embodiment, for example, sequences among columns are randomly changed on the basis of Table 1-49, or negation is performed on a value of a certain column. In addition, equivalent variation or equivalent encoding and mapping is performed on the codebook structure in each sending mode, which also falls within the protection scope as long as the codebook structure type in each mode is not changed.

The new PRE/POST codewords provided in Table 1-50 have a characteristic that: a minimum code distance is at least four after PRE/POST codewords are included in the single stream-DTX, DTX-single stream, dual stream-DTX, and DTX-dual stream modes.

It is assumed that when the Node B schedules data on both carriers of a dual-carrier, the PRE/POST is not used during the detection of HARQ-ACK signals, and when the Node B only schedules data on one carrier of the dual-carrier, the PRE/POST is used during the detection of the HARQ-ACK signals. Therefore, a scheme having better performance is obtained according to Tables 1-48 and 1-49, as shown in Table 1-51.

TABLE 1-51

Mapping Relationship Between $X_{ij}$ and Codeword Values

| D/A | $X_{01}$ | 0 | 0 | 0 | 0 | 0 | 0 | 1 | 1 | 1 | 1 |
|---|---|---|---|---|---|---|---|---|---|---|---|
| D/N | $X_{02}$ | 1 | 1 | 1 | 1 | 1 | 1 | 0 | 0 | 0 | 0 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 0 | 1 | 1 | 0 | 0 | 1 |
| D/NA | $X_{05}$ | 0 | 0 | 0 | 1 | 1 | 1 | 1 | 1 | 1 | 0 |
| D/NN | $X_{06}$ | 1 | 1 | 1 | 1 | 1 | 0 | 0 | 0 | 0 | 0 |
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 0 | 1 | 0 | 0 | 0 | 1 |
| A/AA | $X_{13}$ | 1 | 0 | 1 | 0 | 0 | 0 | 1 | 1 | 0 | 0 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 0 | 0 | 1 | 1 | 1 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |

TABLE 1-51-continued

Mapping Relationship Between $X_{ij}$ and Codeword Values

| N/AA | $X_{23}$ | 1 | 1 | 0 | 1 | 0 | 0 | 1 | 0 | 1 | 0 |
|---|---|---|---|---|---|---|---|---|---|---|---|
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 1 | 0 | 0 | 1 | 0 | 0 | 1 | 0 | 0 |
| AA/N | $X_{32}$ | 1 | 1 | 0 | 0 | 1 | 1 | 1 | 0 | 1 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 1 | 1 | 0 | 1 | 1 |
| AA/NA | $X_{35}$ | 1 | 1 | 0 | 1 | 1 | 0 | 1 | 1 | 0 | 1 |
| AA/NN | $X_{36}$ | 0 | 1 | 1 | 1 | 0 | 1 | 1 | 0 | 0 | 0 |
| AN/D | $X_{40}$ | 1 | 1 | 0 | 1 | 0 | 1 | 0 | 1 | 1 | 1 |
| AN/A | $X_{41}$ | 1 | 0 | 1 | 1 | 1 | 0 | 0 | 1 | 1 | 0 |
| AN/N | $X_{42}$ | 0 | 0 | 0 | 1 | 1 | 1 | 0 | 0 | 0 | 1 |
| AN/AA | $X_{43}$ | 0 | 0 | 0 | 1 | 1 | 1 | 0 | 0 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 1 | 0 | 0 | 0 | 1 | 0 | 1 |
| NA/D | $X_{50}$ | 0 | 1 | 1 | 1 | 1 | 0 | 1 | 0 | 1 | 1 |
| NA/A | $X_{51}$ | 0 | 1 | 1 | 0 | 1 | 1 | 1 | 0 | 0 | 0 |
| NA/N | $X_{52}$ | 1 | 1 | 1 | 0 | 0 | 0 | 0 | 0 | 0 | 1 |
| NA/AA | $X_{53}$ | 1 | 0 | 0 | 1 | 1 | 1 | 0 | 1 | 0 |  |
| NA/AN | $X_{54}$ | 0 | 0 | 1 | 0 | 1 | 0 | 0 | 0 | 0 | 0 |
| NA/NA | $X_{55}$ | 1 | 0 | 1 | 1 | 1 | 0 | 0 | 1 | 1 | 0 |
| NA/NN | $X_{56}$ | 1 | 1 | 1 | 0 | 0 | 1 | 1 | 0 | 0 |  |
| NN/D | $X_{60}$ | 1 | 0 | 0 | 1 | 0 | 0 | 1 | 0 | 0 | 0 |
| NN/A | $X_{61}$ | 0 | 0 | 1 | 0 | 0 | 1 | 0 | 0 | 1 | 0 |
| NN/N | $X_{62}$ | 0 | 1 | 0 | 0 | 0 | 1 | 1 | 0 | 0 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 1 | 0 | 0 | 1 | 0 |
| NN/NA | $X_{65}$ | 0 | 1 | 0 | 0 | 1 | 0 | 0 | 1 | 0 | 0 |
| NN/NN | $X_{66}$ | 0 | 0 | 0 | 0 | 0 | 0 | 1 | 1 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

A tenth embodiment of a method for encoding a joint feedback signal according to the present invention is illustrated below.

In this embodiment, a new codebook structure type is designed for the dual stream-dual stream mode. The codewords in the codebook structure type are from a 32-bit codebook structure having a minimum code distance of four. The codebook structure is composed of sixteen pairs of inverse codes, which are expressed as G1~G16 and H1~H16. Hi is an inverse code of Gi, that is, the code distance is ten. The relations between G and H codewords are shown in Tables 1-7 to 1-9.

Twenty four codewords are needed in the dual stream-dual stream sending mode, and altogether twenty six codewords are needed if the PRE/POST codewords are included. The twenty six codewords may be selected from G1~G16 and H1~H16.

The method for encoding a joint feedback signal in this embodiment employs another combination of codebook structure types. However, when specific codewords are given, all codewords related to the HARQ-ACK specified in R8 of the TS25.212 in the 3GPP Protocol, including the PRE/POST, are compatible. The mapping relationship between the sending modes and the codebook structure types can be referred to in Table 1-52.

TABLE 1-52

Mapping Relationship Between Sending Modes and Codebook Structure Types Employed in Tenth Embodiment of Method for Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-2C-2D | Table 1-15, Encoding Scheme 1 for Single Stream-Single Stream Mode |
| Dual Stream-Single Stream | {A1, A2, A5, A6} ∪ 2B-3C-3D-E-F | Table 1-53, Encoding Scheme 4 for Dual Stream-Single Stream Mode |
| Single Stream-Dual Stream | 6A-2B-2C-D ∪{D3~D5} | Table 1-54, Encoding Scheme 4 for Single Stream-Dual Stream Mode |
| Dual Stream-Dual Stream | {G7~G16} ∪{H1~H8} ∪{H9~H16} | Table 1-55, Encoding Scheme 3 for Dual Stream-Dual Stream Mode |

The encoding and mapping schemes in the codebook structure types described in the above table are shown in Tables 1-53, 1-54, and 1-55, respectively.

TABLE 1-53

Encoding Scheme 4 for Dual Stream-Single Stream Mode

| | | Secondary Single Stream | | |
|---|---|---|---|---|
| Primary | | ACK | NACK | DTX |
| Dual Stream | DTX | $X_{01}$ = E1 | $X_{02}$ = F1 | $X_{00}$ = DTX |
| | ACK_ACK | $X_{31}$ = B2 | $X_{32}$ = C3 | $X_{30}$ = A1 |
| | ACK_NACK | $X_{41}$ = C1 | $X_{42}$ = D2 | $X_{40}$ = A2 |
| | NACK_ACK | $X_{51}$ = C2 | $X_{52}$ = D1 | $X_{50}$ = A5 |
| | NACK_NACK | $X_{61}$ = D3 | $X_{62}$ = B1 | $X_{60}$ = A6 |

TABLE 1-54

Encoding Scheme 4 for Single Stream-Dual Stream Mode

| | | Secondary Dual Stream | | | | |
|---|---|---|---|---|---|---|
| Primary | | DTX | ACK_ACK | ACK_NACK | NACK_ACK | NACK_NACK |
| Single Stream | ACK | $X_{10}$ = C1 | $X_{13}$ = D3 | $X_{14}$ = D4 | $X_{15}$ = D5 | $X_{16}$ = C2 |
| | NACK | $X_{20}$ = D1 | $X_{23}$ = B2 | $X_{24}$ = A5 | $X_{25}$ = A6 | $X_{26}$ = B1 |
| | DTX | $X_{00}$ = DTX | $X_{03}$ = A1 | $X_{04}$ = A2 | $X_{05}$ = A3 | $X_{06}$ = A4 |

TABLE 1-55

Encoding Scheme 3 for Dual Stream-Dual Stream Mode

| | | Secondary Dual Stream | | | | |
|---|---|---|---|---|---|---|
| | Primary | DTX | ACK_ACK | ACK_NACK | NACK_ACK | NACK_NACK |
| Dual Stream | DTX | $X_{00}$ = DTX | $X_{03}$ = G12 | $X_{04}$ = G13 | $X_{05}$ = G14 | $X_{06}$ = H4 |
| | ACK_ACK | $X_{30}$ = H1 | $X_{33}$ = G7 | $X_{34}$ = G8 | $X_{35}$ = G9 | $X_{36}$ = G10 |
| | ACK_NACK | $X_{40}$ = H2 | $X_{43}$ = G11 | $X_{44}$ = G14 | $X_{45}$ = G16 | $X_{46}$ = H3 |
| | NACK_ACK | $X_{50}$ = H7 | $X_{53}$ = H5 | $X_{54}$ = H6 | $X_{55}$ = H11 | $X_{56}$ = H12 |
| | NACK_NACK | $X_{60}$ = H8 | $X_{63}$ = H13 | $X_{64}$ = H14 | $X_{65}$ = H15 | $X_{66}$ = H16 |

Specific codewords that satisfy the constraints in Table 1-52 are shown in Table 1-56.

TABLE 1-56

Mapping Relationship Between $X_{ij}$ and Codeword Values

| | | | | | | | | | | | |
|---|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 0 | 0 | 1 | 1 | 1 | 1 | 0 | 0 | 0 | 1 |
| D/AN | $X_{04}$ | 0 | 1 | 1 | 0 | 0 | 1 | 1 | 1 | 0 | 0 |
| D/NA | $X_{05}$ | 0 | 0 | 0 | 0 | 1 | 0 | 1 | 1 | 1 | 1 |
| D/NN | $X_{06}$ | 1 | 1 | 1 | 0 | 1 | 0 | 0 | 0 | 1 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 1 | 0 | 0 | 1 | 1 | 1 | 0 | 0 | 1 |
| A/AN | $X_{14}$ | 0 | 1 | 1 | 1 | 0 | 0 | 1 | 0 | 1 | 1 |
| A/NA | $X_{15}$ | 1 | 0 | 1 | 1 | 1 | 0 | 1 | 1 | 0 | 0 |
| A/NN | $X_{16}$ | 1 | 0 | 1 | 0 | 0 | 0 | 1 | 0 | 0 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 0 | 0 | 1 | 1 | 0 | 0 | 0 | 1 | 1 |
| N/AN | $X_{24}$ | 1 | 0 | 0 | 1 | 0 | 1 | 1 | 0 | 1 | 0 |
| N/NA | $X_{25}$ | 1 | 1 | 0 | 1 | 0 | 0 | 0 | 1 | 0 | 1 |
| N/NN | $X_{26}$ | 1 | 1 | 0 | 0 | 0 | 0 | 1 | 1 | 1 | 0 |
| AA/D | $X_{30}$ | 1 | 0 | 1 | 0 | 1 | 1 | 1 | 1 | 0 | 1 |
| AA/A | $X_{31}$ | 0 | 1 | 0 | 1 | 0 | 0 | 0 | 0 | 1 | 0 |
| AA/N | $X_{32}$ | 0 | 1 | 1 | 1 | 0 | 1 | 1 | 1 | 0 | 0 |
| AA/AA | $X_{33}$ | 1 | 0 | 0 | 0 | 0 | 1 | 0 | 1 | 0 | 0 |
| AA/AN | $X_{34}$ | 0 | 0 | 1 | 1 | 0 | 0 | 1 | 1 | 1 | 0 |
| AA/NA | $X_{35}$ | 1 | 1 | 0 | 1 | 1 | 0 | 1 | 0 | 0 | 1 |
| AA/NN | $X_{36}$ | 1 | 1 | 0 | 0 | 0 | 0 | 1 | 1 | 1 | 0 |
| AN/D | $X_{40}$ | 1 | 1 | 0 | 1 | 0 | 1 | 0 | 1 | 1 | 1 |
| AN/A | $X_{41}$ | 0 | 0 | 0 | 1 | 1 | 1 | 0 | 0 | 0 | 1 |
| AN/N | $X_{42}$ | 0 | 0 | 1 | 1 | 0 | 0 | 0 | 1 | 0 | 1 |
| AN/AA | $X_{43}$ | 0 | 0 | 0 | 0 | 0 | 0 | 0 | 0 | 1 | 1 |
| AN/AN | $X_{44}$ | 1 | 0 | 1 | 0 | 1 | 1 | 0 | 1 | 0 | 1 |
| AN/NA | $X_{45}$ | 1 | 0 | 0 | 1 | 1 | 0 | 0 | 0 | 1 | 1 |
| AN/NN | $X_{46}$ | 1 | 0 | 1 | 1 | 1 | 0 | 0 | 1 | 0 | 0 |
| NA/D | $X_{50}$ | 0 | 1 | 1 | 1 | 1 | 0 | 0 | 1 | 0 | 1 |
| NA/A | $X_{51}$ | 1 | 0 | 0 | 0 | 1 | 1 | 1 | 0 | 1 | 0 |
| NA/N | $X_{52}$ | 1 | 1 | 1 | 0 | 0 | 1 | 1 | 1 | 1 | 0 |
| NA/AA | $X_{53}$ | 0 | 1 | 0 | 1 | 1 | 1 | 1 | 0 | 0 | 0 |
| NA/AN | $X_{54}$ | 0 | 1 | 1 | 0 | 1 | 1 | 0 | 1 | 1 | 1 |
| NA/NA | $X_{55}$ | 1 | 0 | 0 | 0 | 1 | 1 | 1 | 0 | 1 | 0 |
| NA/NN | $X_{56}$ | 0 | 0 | 0 | 1 | 1 | 1 | 0 | 1 | 1 | 0 |
| NN/D | $X_{60}$ | 1 | 0 | 0 | 1 | 0 | 0 | 1 | 0 | 0 | 0 |
| NN/A | $X_{61}$ | 1 | 0 | 0 | 0 | 0 | 1 | 0 | 0 | 1 | 1 |
| NN/N | $X_{62}$ | 0 | 0 | 1 | 0 | 1 | 0 | 1 | 0 | 0 | 0 |
| NN/AA | $X_{63}$ | 1 | 1 | 1 | 1 | 0 | 1 | 0 | 0 | 0 | 1 |
| NN/AN | $X_{64}$ | 0 | 1 | 0 | 0 | 0 | 1 | 1 | 0 | 1 | 1 |
| NN/NA | $X_{65}$ | 1 | 1 | 1 | 0 | 0 | 0 | 1 | 0 | 0 | 1 |
| NN/NN | $X_{66}$ | 0 | 1 | 1 | 1 | 0 | 0 | 0 | 1 | 0 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

A specific example is given in Table 1-56. This embodiment is not limited to the mapping relationship in Table 1-56. Any mapping relationship obtained through simple variation on the basis of Table 1-56 also falls within the scope of this embodiment, for example, sequences among columns are randomly changed on the basis of Table 1-56, or negation is performed on a value of a certain column. In addition, equivalent variation or equivalent encoding and mapping is performed on the codebook structure in each sending mode, which also falls within the protection scope as long as the codebook structure type in each mode is not changed.

An eleventh embodiment of a method for encoding a joint feedback signal according to the present invention is illustrated below.

A difference between this embodiment and the tenth embodiment lies in that this embodiment employs a new combination of codebook structure types. However, when specific codewords are given, all codewords related to the HARQ-ACK specified in R7 of the TS25.212 in the 3GPP Protocol, including the PRE/POST, are compatible, as shown in Table 1-2. The mapping relationship between the sending modes and the codebook structure types can be referred to in Table 1-57.

TABLE 1-57

Mapping Relationship Between Sending Modes and Codebook Structure Types Employed in Eleventh Embodiment of Method for Encoding Joint Feedback Signal

| Sending Mode | Codebook structure Type | Encoding Scheme |
|---|---|---|
| Single Stream-DTX | A-B | — |
| DTX-Single Stream | A-B | — |
| Dual Stream-DTX | 4A | — |
| DTX-Dual Stream | 4A | — |
| Single Stream-Single Stream | 2A-2B-4C | Table 1-17, Encoding Scheme 3 for Single Stream-Single Stream Mode |
| Dual Stream-Single Stream | 4A-3B-6C-D | Table 1-56, Encoding Scheme 5 for Dual Stream-Single Stream Mode |
| Single Stream-Dual Stream | {6A-2B-2C-D} ∪{D3~D5} | Table 1-52, Encoding Scheme 4 for Single Stream-Dual Stream Mode |
| Dual Stream-Dual Stream | {G7~G16} ∪{H1~H8} ∪{H9~H16} | Table 1-53, Encoding Scheme 3 for Dual Stream-Dual Stream Mode |

TABLE 1-58

Encoding Scheme 5 for Dual Stream-Single Stream Mode

| | | Secondary Single Stream | | |
|---|---|---|---|---|
| | Primary | ACK | NACK | DTX |
| Dual Stream | DTX | $X_{01}$ = D1 | $X_{02}$ = C1 | $X_{00}$ = DTX |
| | ACK_ACK | $X_{31}$ = C2 | $X_{32}$ = B2 | $X_{30}$ = A1 |

TABLE 1-58-continued

Encoding Scheme 5 for Dual Stream-Single Stream Mode

| | | Secondary Single Stream | | |
|---|---|---|---|---|
| Primary | ACK | NACK | DTX | |
| ACK_NACK | $X_{41}$ = C3 | $X_{42}$ = B3 | $X_{40}$ = A2 | |
| NACK_ACK | $X_{51}$ = C4 | $X_{52}$ = C6 | $X_{50}$ = A3 | |
| NACK_NACK | $X_{61}$ = C5 | $X_{62}$ = B1 | $X_{60}$ = A4 | |

Specific codewords that satisfy the constraints in Table 1-57 are shown in Table 1-59.

TABLE 1-59

Mapping Relationship Between $X_{ij}$ and Codeword Values

| D/A | $X_{01}$ | 0 | 0 | 0 | 0 | 0 | 0 | 1 | 1 | 1 | 1 |
|---|---|---|---|---|---|---|---|---|---|---|---|
| D/N | $X_{02}$ | 1 | 1 | 1 | 1 | 1 | 1 | 0 | 0 | 0 | 0 |
| D/AA | $X_{03}$ | 0 | 0 | 1 | 1 | 1 | 1 | 0 | 0 | 0 | 1 |
| D/AN | $X_{04}$ | 0 | 1 | 1 | 0 | 0 | 1 | 1 | 1 | 0 | 0 |
| D/NA | $X_{05}$ | 0 | 0 | 0 | 0 | 1 | 0 | 1 | 1 | 1 | 1 |
| D/NN | $X_{06}$ | 1 | 1 | 1 | 0 | 1 | 0 | 0 | 0 | 1 | 0 |
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 1 | 0 | 1 | 0 | 0 | 1 |
| A/AA | $X_{13}$ | 1 | 1 | 0 | 0 | 1 | 1 | 1 | 0 | 0 | 1 |
| A/AN | $X_{14}$ | 0 | 1 | 1 | 1 | 0 | 0 | 1 | 0 | 1 | 1 |
| A/NA | $X_{15}$ | 1 | 0 | 1 | 1 | 1 | 0 | 1 | 1 | 0 | 0 |
| A/NN | $X_{16}$ | 1 | 0 | 1 | 0 | 0 | 0 | 1 | 0 | 0 | 1 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |
| N/AA | $X_{23}$ | 1 | 0 | 0 | 1 | 1 | 0 | 0 | 0 | 1 | 1 |
| N/AN | $X_{24}$ | 1 | 0 | 0 | 1 | 0 | 1 | 1 | 0 | 1 | 0 |
| N/NA | $X_{25}$ | 1 | 1 | 0 | 1 | 0 | 0 | 0 | 1 | 0 | 1 |
| N/NN | $X_{26}$ | 1 | 1 | 0 | 0 | 0 | 0 | 1 | 1 | 1 | 0 |
| AA/D | $X_{30}$ | 1 | 0 | 1 | 0 | 1 | 1 | 1 | 0 | 1 | 1 |
| AA/A | $X_{31}$ | 1 | 0 | 0 | 1 | 0 | 0 | 0 | 0 | 1 | 1 |
| AA/N | $X_{32}$ | 0 | 0 | 1 | 0 | 1 | 0 | 1 | 0 | 0 | 0 |
| AA/AA | $X_{33}$ | 1 | 0 | 0 | 0 | 0 | 1 | 0 | 1 | 0 | 0 |
| AA/AN | $X_{34}$ | 0 | 0 | 1 | 1 | 0 | 0 | 1 | 1 | 1 | 0 |
| AA/NA | $X_{35}$ | 1 | 1 | 0 | 1 | 1 | 0 | 1 | 1 | 0 | 1 |
| AA/NN | $X_{36}$ | 1 | 1 | 0 | 0 | 0 | 1 | 1 | 1 | 1 | 0 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 0 | 1 | 1 | 1 | 0 |
| AN/N | $X_{42}$ | 1 | 0 | 0 | 0 | 0 | 1 | 0 | 1 | 0 | 0 |
| AN/AA | $X_{43}$ | 0 | 0 | 0 | 0 | 0 | 0 | 0 | 0 | 0 | 1 |
| AN/AN | $X_{44}$ | 1 | 0 | 1 | 1 | 0 | 1 | 1 | 0 | 1 | 1 |
| AN/NA | $X_{45}$ | 1 | 0 | 0 | 1 | 1 | 0 | 0 | 0 | 1 | 1 |
| AN/NN | $X_{46}$ | 1 | 0 | 1 | 1 | 1 | 0 | 1 | 0 | 0 | 0 |
| NA/D | $X_{50}$ | 0 | 1 | 1 | 1 | 1 | 0 | 1 | 0 | 1 | 1 |
| NA/A | $X_{51}$ | 0 | 0 | 1 | 1 | 0 | 0 | 1 | 0 | 0 | 1 |
| NA/N | $X_{52}$ | 0 | 1 | 0 | 0 | 0 | 1 | 1 | 0 | 0 | 1 |
| NA/AA | $X_{53}$ | 0 | 1 | 0 | 1 | 1 | 1 | 0 | 0 | 0 | 0 |
| NA/AN | $X_{54}$ | 0 | 1 | 1 | 0 | 1 | 0 | 1 | 1 | 1 | 0 |
| NA/NA | $X_{55}$ | 1 | 0 | 0 | 0 | 1 | 1 | 0 | 1 | 0 | 0 |
| NA/NN | $X_{56}$ | 0 | 0 | 0 | 1 | 1 | 1 | 0 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 0 | 0 | 1 | 1 | 1 | 1 | 1 | 0 | 0 |
| NN/N | $X_{62}$ | 0 | 1 | 0 | 1 | 0 | 0 | 0 | 1 | 0 | 0 |
| NN/AA | $X_{63}$ | 1 | 1 | 1 | 1 | 0 | 1 | 0 | 0 | 0 | 0 |
| NN/AN | $X_{64}$ | 0 | 1 | 0 | 0 | 0 | 1 | 1 | 0 | 1 | 1 |
| NN/NA | $X_{65}$ | 1 | 1 | 1 | 0 | 0 | 0 | 1 | 0 | 0 | 1 |
| NN/NN | $X_{66}$ | 0 | 1 | 1 | 1 | 0 | 0 | 1 | 0 | 0 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

A specific example is given in Table 1-59. This embodiment is not limited to the mapping relationship in Table 1-59. Any mapping relationship obtained through simple variation on the basis of Table 1-59 also falls within the scope of this embodiment, for example, sequences among columns are randomly changed on the basis of Table 1-59, or negation is performed on a value of a certain column. In addition, equivalent variation or equivalent encoding and mapping is performed on the codebook structure in each sending mode, which also falls within the protection scope as long as the codebook structure type in each mode is not changed.

In conclusion, in the embodiments of the present invention, a solution for HARQ-ACK signal feedback in the DC-MIMO technology is provided. According to the above descriptions, furthermore, the embodiments of the present invention are also applicable to a dual-code channel, thus providing a technical solution for HARQ-ACK information feedback with more than three carriers or less than four carriers using four MIMOs.

For ease of description, definitions of the following terms are specified in the embodiments of the present invention:

SC: a feedback scheme for a single-carrier configured with no MIMO, that is, the feedback scheme corresponding to Table 1-1;

SC-MIMO: a feedback scheme for a single-carrier configured with MIMO, that is, the feedback scheme corresponding to Table 1-2;

DC: a feedback scheme for a dual-carrier configured with no MIMO, that is, the feedback scheme corresponding to Table 1-3; and DC-MIMO: a feedback scheme for a dual-carrier configured with MIMO.

Referring to Table 1-60, a solution for a dual-code channel is provided according to the total number of carriers and the number of carriers that use MIMO.

Table 1-60. Technical Solution for HARQ-ACK Information Feedback of Dual-Code Channel With More than Three Carriers or Less than Four Carriers Using Four MIMOs.

| Total Number of Carriers | Number of Carriers that Use MIMO | Technical Solution For Dual-Code Channel | | |
|---|---|---|---|---|
| | | Code Channel | Carrier Information on Code Channel | Encoding Scheme |
| 3 | 0 | First code channel | First carrier | SC |
| | | Second code channel | Second and third carriers | DC |
| 3 | 1 | First code channel | First carrier | SC-MIMO |
| | | Second code channel | Second and third carriers | DC |
| 3 | 1 | First code channel | First and second carriers | DC-MIMO |
| | | Second code channel | Third carrier | SC |
| 3 | 2 | First code channel | First carrier | SC-MIMO |
| | | Second code channel | Second and third carriers | DC-MIMO |
| 3 | 2 | First code channel | First and second carriers | DC-MIMO |
| | | Second code channel | Third carrier | SC |
| 3 | 3 | First code channel | First carrier | SC-MIMO |
| | | Second code channel | Second and third carriers | DC-MIMO |
| 4 | 0 | First code channel | First and second carriers | DC |
| | | Second code channel | Third and fourth carriers | DC |
| 4 | 1 | First code channel | First and second carriers | DC-MIMO |
| | | Second code channel | Third and fourth carriers | DC |

-continued

| Total Number of Carriers | Number of Carriers that Use MIMO | Code Channel | Carrier Information on Code Channel | Encoding Scheme |
|---|---|---|---|---|
| 4 | 2 | First code channel | First and second carriers | DC-MIMO |
| | | Second code channel | Third and fourth carriers | DC |
| 4 | 2 | First code channel | First and third carriers | DC-MIMO |
| | | Second code channel | Second and fourth carriers | DC-MIMO |
| 4 | 3 | First code channel | First and second carriers | DC-MIMO |
| | | Second code channel | Third and fourth carriers | DC-MIMO |
| 4 | 4 | First code channel | First and second carriers | DC-MIMO |
| | | Second code channel | Third and fourth carriers | DC-MIMO |

For example, when the total number of carriers is four and the number of carriers that use MIMO is four, information of the first carrier and the second carrier can be borne in the first code channel, and information of the third carrier and the fourth carrier can be borne in the second code channel. The DC-MIMO scheme is employed in the first code channel, and the DC-MIMO scheme is also employed in the second code channel.

In Table 1-60, the MIMO is configured on the preceding several carriers by default. For example, if one MIMO is configured, it is considered that the MIMO is configured on the first carrier, and if two MIMOs are configured, it is considered that the MIMOs are configured on the first carrier and the second carrier, and so on. Moreover, for carriers that are configured with no MIMO, the feedback information may be regarded as feedback information of the MIMO single stream. In practical applications, the carriers may be numbered in a different way, but the mapping can be performed according to the MIMO configuration on the carriers and the carrier numbers in Table 1-60.

As the DC-MIMO scheme under research in the embodiments of the present invention is compatible with SC, SC-MIMO, and DC, each code channel may use the DC-MIMO encoding mode only. (For a carrier that is configured with no MIMO, the feedback signal is regarded as the feedback signal in the MIMO single stream mode; and the single-carrier may be regarded as a dual-carrier in which the second carrier is merely fed back with DTX. Specific mapping relationship are shown in Table 1-61.

TABLE 1-61

Mapping Relationship Between the Prior Art and DC-MIMO Feedback Schemes

| The Prior Art | Corresponding Scheme In DC-MIMO |
|---|---|
| SC | Single stream-DTX or DTX-single stream |
| SC-MIMO | Dual stream-DTX or DTX-dual stream |
| DC | Single stream-single stream |

In the foregoing mapping relationship, both the three carriers to four carriers-4 MIMOs may use two code channels to solve the signal feedback problem. Each code channel uses the DC-MIMO encoding mode. However, the carrier distribution also needs to be designated. The specific distribution is the same as that in Table 1-60.

An embodiment of a signal encoding device according to the present invention is illustrated below.

Figure 3:
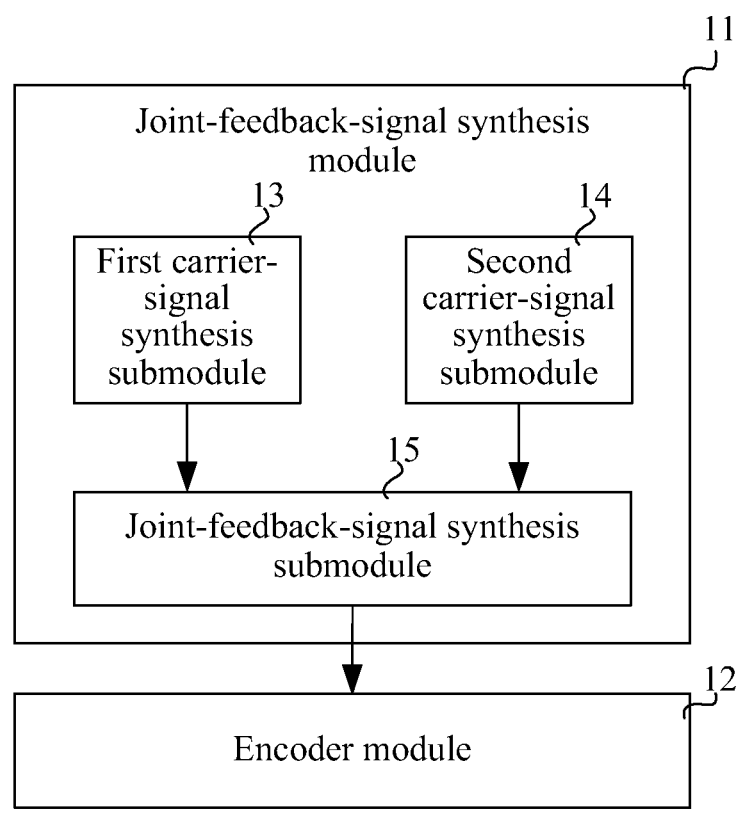
FIG. 3 is a schematic structural view of a signal encoding device according to an embodiment of the present invention.

FIG. 3 is a schematic structural view of an embodiment of a signal encoding device according to the present invention, which specifically includes a joint-feedback-signal synthesis module 11 and an encoder module 12. The joint-feedback-signal synthesis module 11 is configured to, when two carriers are configured with MIMO, combine HARQ-ACK signals of the two carriers into a joint feedback signal. The encoder module 12 is configured to map the joint feedback signal into a codeword according to predetermined a mapping relationship between signals and codewords.

Further, the joint-feedback-signal synthesis module 11 further includes a first carrier-signal synthesis submodule 13, a second carrier-signal synthesis submodule 14, and a joint-feedback-signal synthesis submodule 15. The first carrier-signal synthesis submodule 13 and the second carrier-signal synthesis submodule 14 combine the HARQ-ACK signals of the carriers into carrier feedback signals corresponding to the carriers, respectively. The joint-feedback-signal synthesis submodule 15 combines the two carrier feedback signals into a joint feedback signal.

Persons of ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, a Compact Disk Read-Only Memory (CD-ROM), a Read-Only Memory (ROM) or a Random Access Memory (RAM).

It should be noted that the above embodiments are merely provided for elaborating the technical solutions of the present invention, but are not intended to limit the present invention. Although the present invention has been described in detail with reference to the foregoing embodiments, it is apparent that those skilled in the art can make various modifications and variations to the invention without departing from the spirit and scope of the invention. The invention shall cover the modifications and variations provided that they fall in the scope of protection defined by the following claims or their equivalents.

What is claimed is:

1. A method for encoding a joint feedback signal, the method comprising:
   selecting a codebook structure satisfying a specific code distance relation or an equivalent codebook structure thereof for each sending mode of a plurality of sending modes; and
   encoding a joint feedback signal in each sending mode,
   wherein the sending modes comprise single stream-discontinuous transmission (DTX), DTX-single stream, dual stream-DTX, DTX-dual stream, single stream-single stream, dual stream-single stream, single stream-dual stream, and dual stream-dual stream;
   wherein a codebook structure type of a codebook structure corresponding to the single stream-DTX or DTX-single stream sending mode comprises A-B or 2A, and codewords comprised in the codebook structure are A1 and B1 or A1 and A2, respectively;
   wherein a codebook structure type of a codebook structure corresponding to the dual stream-DTX or DTX-dual stream sending mode comprises 4A, or 3A-C, or 2A-2C, or A-B-2C, or A-B-C-D, and codewords comprised in the codebook structure are A1, A2, A3, and A4, or A1, A2, A3, and C1, or A1, A2, C1, and C2, or A1, B1, C1, and C2, or A1, B1, C1, and D1, respectively;

wherein a codebook structure type of a codebook structure corresponding to the single stream-single stream sending mode comprises 2A-2B-2C-2D, or A-B-5C-D, or 2A-2B-4C, or A-B-6C, or 2A-6C, or 4A-4C, and codewords comprised in the codebook structure are A1, A2, B1, B2, C1, C2, D1, and D2, or A1, B1, C1, C2, C3, C4, C5, and D1, or A1, A2, B1, B2, C1, C2, C3, and C4, or A1, B1, C1, C2, C3, C4, C5, and C6, or A1, A2, C1, C2, C3, C4, C5, and C6, or A1, A2, A3, A4, C1, C2, C3, and C4, respectively;

wherein a codebook structure type of a codebook structure corresponding to the dual stream-single stream or single stream-dual stream sending mode comprises 6A-2B-6C, or 6A-B-6C-D, or 6A-3C-3D-E-F, or 4A-4B-3C-3D, or 4A-3B-6C-D, or {A1, A2, A5, A6}∪2B-3C-3D-E-F, or 6A-2B-2C-D∪{D3~D5}, and codewords comprised in the codebook structure are A1, A2, A3, A4, A5, A6, B1, B2, C1, C2, C3, C4, C5, and C6, or A1, A2, A3, A4, A5, A6, B1, C1, C2, C3, C4, C5, C6, and D1, or A1, A2, A3, A4, A5, A6, C1, C2, C3, D1, D2, D3, E1, and F1, or A1, A2, A3, A4, B1, B2, B3, B4, C1, C2, C3, D1, D2, and D3, or A1, A2, A3, A4, B1, B2, B3, C1, C2, C3, C4, C5, C6, and D1, or A1, A2, A5, A6, B1, B2, C1, C2, C3, D1, D2, D3, E1, and F1, or A1, A2, A3, A4, A5, A6, B1, B2, C1, C2, D1, D3, D4, and D5, respectively; and wherein a codebook structure type of a codebook structure corresponding to the dual stream-dual stream sending mode comprises 6A-6B-6C-6D, and codewords comprised in the codebook structure are A1, A2, A3, A4, A5, A6, B1, B2, B3, B4, B5, B6, C1, C2, C3, C4, C5, C6, D1, D2, D3, D4, D5, and D6, or the codebook structure type of the codebook structure corresponding to the dual stream-dual stream sending mode further comprises a codebook structure type represented by a codebook structure formed of 24 codewords randomly selected from 16G-16H, code distance relations between all the codewords are shown in Tables 2-1, 2-2, and 2-3;

wherein Table 2-1 comprises:

|    | A1 | A2 | A3 | A4 | A5 | A6 | B1 | B2 | B3 | B4 | B5 | B6 |
|----|----|----|----|----|----|----|----|----|----|----|----|----|
| A1 | 0  | 6  | 6  | 6  | 6  | 6  | 10 | 4  | 4  | 4  | 4  | 4  |
| A2 | 6  | 0  | 6  | 6  | 6  | 6  | 4  | 10 | 4  | 4  | 4  | 4  |
| A3 | 6  | 6  | 0  | 6  | 6  | 6  | 4  | 4  | 10 | 4  | 4  | 4  |
| A4 | 6  | 6  | 6  | 0  | 6  | 6  | 4  | 4  | 4  | 10 | 4  | 4  |
| A5 | 6  | 6  | 6  | 6  | 0  | 6  | 4  | 4  | 4  | 4  | 10 | 4  |
| A6 | 6  | 6  | 6  | 6  | 6  | 0  | 4  | 4  | 4  | 4  | 4  | 10 |
| B1 | 10 | 4  | 4  | 4  | 4  | 4  | 0  | 6  | 6  | 6  | 6  | 6  |
| B2 | 4  | 10 | 4  | 4  | 4  | 4  | 6  | 0  | 6  | 6  | 6  | 6  |
| B3 | 4  | 4  | 10 | 4  | 4  | 4  | 6  | 6  | 0  | 6  | 6  | 6  |
| B4 | 4  | 4  | 4  | 10 | 4  | 4  | 6  | 6  | 6  | 0  | 6  | 6  |
| B5 | 4  | 4  | 4  | 4  | 10 | 4  | 6  | 6  | 6  | 6  | 0  | 6  |
| B6 | 4  | 4  | 4  | 4  | 4  | 10 | 6  | 6  | 6  | 6  | 6  | 0  |
| C1 | 5  | 5  | 5  | 5  | 5  | 5  | 5  | 5  | 5  | 5  | 5  | 5  |
| C2 | 5  | 5  | 5  | 5  | 5  | 5  | 5  | 5  | 5  | 5  | 5  | 5  |
| C3 | 5  | 5  | 5  | 5  | 5  | 5  | 5  | 5  | 5  | 5  | 5  | 5  |
| C4 | 5  | 5  | 5  | 5  | 5  | 5  | 5  | 5  | 5  | 5  | 5  | 5  |
| C5 | 5  | 5  | 5  | 5  | 5  | 5  | 5  | 5  | 5  | 5  | 5  | 5  |
| C6 | 5  | 5  | 5  | 5  | 5  | 5  | 5  | 5  | 5  | 5  | 5  | 5  |
| D1 | 5  | 5  | 5  | 5  | 5  | 5  | 5  | 5  | 5  | 5  | 5  | 5  |
| D2 | 5  | 5  | 5  | 5  | 5  | 5  | 5  | 5  | 5  | 5  | 5  | 5  |
| D3 | 5  | 5  | 5  | 5  | 5  | 5  | 5  | 5  | 5  | 5  | 5  | 5  |
| D4 | 5  | 5  | 5  | 5  | 5  | 5  | 5  | 5  | 5  | 5  | 5  | 5  |
| D5 | 5  | 5  | 5  | 5  | 5  | 5  | 5  | 5  | 5  | 5  | 5  | 5  |
| D6 | 5  | 5  | 5  | 5  | 5  | 5  | 5  | 5  | 5  | 5  | 5  | 5  | wherein Table 2-2 comprises:

|    | C1 | C2 | C3 | C4 | C5 | C6 | D1 | D2 | D3 | D4 | D5 | D6 |
|----|----|----|----|----|----|----|----|----|----|----|----|----|
| A1 | 5  | 5  | 5  | 5  | 5  | 5  | 5  | 5  | 5  | 5  | 5  | 5  |
| A2 | 5  | 5  | 5  | 5  | 5  | 5  | 5  | 5  | 5  | 5  | 5  | 5  |
| A3 | 5  | 5  | 5  | 5  | 5  | 5  | 5  | 5  | 5  | 5  | 5  | 5  |
| A4 | 5  | 5  | 5  | 5  | 5  | 5  | 5  | 5  | 5  | 5  | 5  | 5  |
| A5 | 5  | 5  | 5  | 5  | 5  | 5  | 5  | 5  | 5  | 5  | 5  | 5  |
| A6 | 5  | 5  | 5  | 5  | 5  | 5  | 5  | 5  | 5  | 5  | 5  | 5  |
| B1 | 5  | 5  | 5  | 5  | 5  | 5  | 5  | 5  | 5  | 5  | 5  | 5  |
| B2 | 5  | 5  | 5  | 5  | 5  | 5  | 5  | 5  | 5  | 5  | 5  | 5  |
| B3 | 5  | 5  | 5  | 5  | 5  | 5  | 5  | 5  | 5  | 5  | 5  | 5  |
| B4 | 5  | 5  | 5  | 5  | 5  | 5  | 5  | 5  | 5  | 5  | 5  | 5  |
| B5 | 5  | 5  | 5  | 5  | 5  | 5  | 5  | 5  | 5  | 5  | 5  | 5  |
| B6 | 5  | 5  | 5  | 5  | 5  | 5  | 5  | 5  | 5  | 5  | 5  | 5  |
| C1 | 0  | 6  | 6  | 6  | 6  | 6  | 10 | 4  | 4  | 4  | 4  | 4  |
| C2 | 6  | 0  | 6  | 6  | 6  | 6  | 4  | 10 | 4  | 4  | 4  | 4  |
| C3 | 6  | 6  | 0  | 6  | 6  | 6  | 4  | 4  | 10 | 4  | 4  | 4  |
| C4 | 6  | 6  | 6  | 0  | 6  | 6  | 4  | 4  | 4  | 10 | 4  | 4  |
| C5 | 6  | 6  | 6  | 6  | 0  | 6  | 4  | 4  | 4  | 4  | 10 | 4  |
| C6 | 6  | 6  | 6  | 6  | 6  | 0  | 4  | 4  | 4  | 4  | 4  | 10 |
| D1 | 10 | 4  | 4  | 4  | 4  | 4  | 0  | 6  | 6  | 6  | 6  | 6  |
| D2 | 4  | 10 | 4  | 4  | 4  | 4  | 6  | 0  | 6  | 6  | 6  | 6  |
| D3 | 4  | 4  | 10 | 4  | 4  | 4  | 6  | 6  | 0  | 6  | 6  | 6  |
| D4 | 4  | 4  | 4  | 10 | 4  | 4  | 6  | 6  | 6  | 0  | 6  | 6  |
| D5 | 4  | 4  | 4  | 4  | 10 | 4  | 6  | 6  | 6  | 6  | 0  | 6  |
| D6 | 4  | 4  | 4  | 4  | 4  | 10 | 6  | 6  | 6  | 6  | 6  | 0  | wherein Table 2-3 comprises:

|    | A1 | A2 | A3 | A4 | A5 | A6 | C1 | C2 | C3 | D1 | D2 | D3 | E1 | F1 |
|----|----|----|----|----|----|----|----|----|----|----|----|----|----|----|
| E1 | 6  | 6  | 6  | 4  | 4  | 4  | 5  | 5  | 5  | 5  | 5  | 5  | 0  | 10 |
| F1 | 4  | 4  | 4  | 6  | 6  | 6  | 5  | 5  | 5  | 5  | 5  | 5  | 10 | 0  | wherein Table 2-4 comprises:

|     | G1 | G2 | G3 | G4 | G5 | G6 | G7 | G8 |
|-----|----|----|----|----|----|----|----|----|
| G1  | 0  | 6  | 6  | 6  | 6  | 6  | 6  | 6  |
| G2  | 6  | 0  | 6  | 6  | 6  | 6  | 6  | 6  |
| G3  | 6  | 6  | 0  | 6  | 6  | 6  | 6  | 4  |
| G4  | 6  | 6  | 6  | 0  | 6  | 6  | 4  | 6  |
| G5  | 6  | 6  | 6  | 6  | 0  | 6  | 4  | 4  |
| G6  | 6  | 6  | 6  | 6  | 6  | 0  | 4  | 4  |
| G7  | 6  | 6  | 6  | 4  | 4  | 4  | 0  | 6  |
| G8  | 6  | 6  | 4  | 6  | 4  | 4  | 6  | 0  |
| G9  | 6  | 6  | 4  | 4  | 6  | 4  | 6  | 6  |
| G10 | 6  | 6  | 4  | 4  | 4  | 6  | 6  | 6  |
| G11 | 6  | 4  | 6  | 6  | 4  | 4  | 6  | 6  |
| G12 | 6  | 4  | 4  | 4  | 6  | 6  | 4  | 4  |
| G13 | 6  | 4  | 6  | 4  | 6  | 4  | 6  | 4  |
| G14 | 6  | 4  | 6  | 4  | 4  | 6  | 4  | 6  |
| G15 | 6  | 4  | 4  | 6  | 6  | 4  | 6  | 4  |
| G16 | 6  | 4  | 4  | 6  | 4  | 6  | 4  | 6  |

|     | G9 | G10 | G11 | G12 | G13 | G14 | G15 | G16 |
|-----|----|-----|-----|-----|-----|-----|-----|-----|
| G1  | 6  | 6   | 6   | 6   | 6   | 6   | 6   | 6   |
| G2  | 6  | 6   | 4   | 4   | 4   | 4   | 4   | 4   |
| G3  | 4  | 4   | 6   | 4   | 6   | 4   | 6   | 4   |
| G4  | 4  | 4   | 6   | 4   | 4   | 4   | 4   | 6   |
| G5  | 6  | 4   | 4   | 6   | 6   | 4   | 4   | 4   |
| G6  | 4  | 6   | 4   | 6   | 4   | 6   | 4   | 4   |
| G7  | 6  | 6   | 6   | 4   | 6   | 4   | 6   | 4   |
| G8  | 6  | 6   | 6   | 4   | 4   | 6   | 4   | 6   |
| G9  | 0  | 6   | 4   | 6   | 4   | 6   | 4   | 6   |
| G10 | 6  | 0   | 4   | 6   | 4   | 6   | 6   | 4   |
| G11 | 4  | 4   | 0   | 4   | 6   | 6   | 6   | 6   |
| G12 | 6  | 6   | 4   | 0   | 6   | 6   | 6   | 6   |
| G13 | 4  | 4   | 6   | 6   | 0   | 4   | 6   | 6   |

-continued

|     | H1 | H2 | H3 | H4 | H5 | H6 | H7 | H8 |
|-----|----|----|----|----|----|----|----|----|
| G14 | 4  | 6  | 6  | 6  | 4  | 0  | 6  | 6  |
| G15 | 4  | 6  | 6  | 6  | 6  | 6  | 0  | 4  |
| G16 | 6  | 4  | 6  | 6  | 6  | 6  | 4  | 0  | wherein Table 2-5 comprises:

|     | H1 | H2 | H3 | H4 | H5 | H6 | H7 | H8 |
|-----|----|----|----|----|----|----|----|----|
| H1  | 0  | 6  | 6  | 6  | 6  | 6  | 6  | 6  |
| H2  | 6  | 0  | 6  | 6  | 6  | 6  | 6  | 6  |
| H3  | 6  | 6  | 0  | 6  | 6  | 6  | 6  | 4  |
| H4  | 6  | 6  | 6  | 0  | 6  | 6  | 4  | 6  |
| H5  | 6  | 6  | 6  | 6  | 0  | 6  | 4  | 4  |
| H6  | 6  | 6  | 6  | 6  | 6  | 0  | 4  | 4  |
| H7  | 6  | 6  | 6  | 4  | 4  | 4  | 0  | 6  |
| H8  | 6  | 6  | 4  | 6  | 4  | 4  | 6  | 0  |
| H9  | 6  | 6  | 4  | 4  | 6  | 4  | 6  | 6  |
| H10 | 6  | 6  | 4  | 4  | 4  | 6  | 6  | 6  |
| H11 | 6  | 4  | 6  | 6  | 4  | 4  | 6  | 6  |
| H12 | 6  | 4  | 4  | 4  | 6  | 6  | 4  | 4  |
| H13 | 6  | 4  | 6  | 4  | 6  | 6  | 4  | 4  |
| H14 | 6  | 4  | 4  | 6  | 4  | 6  | 4  | 6  |
| H15 | 6  | 4  | 6  | 4  | 4  | 6  | 6  | 4  |
| H16 | 6  | 4  | 4  | 6  | 6  | 4  | 4  | 6  |

|     | H9 | H10 | H11 | H12 | H13 | H14 | H15 | H16 |
|-----|----|-----|-----|-----|-----|-----|-----|-----|
| H1  | 6  | 6   | 6   | 6   | 6   | 6   | 6   | 6   |
| H2  | 6  | 6   | 4   | 4   | 4   | 4   | 4   | 4   |
| H3  | 4  | 4   | 6   | 4   | 6   | 4   | 6   | 4   |
| H4  | 4  | 4   | 6   | 4   | 4   | 6   | 4   | 6   |
| H5  | 6  | 4   | 4   | 6   | 6   | 4   | 4   | 6   |
| H6  | 4  | 6   | 4   | 6   | 6   | 6   | 6   | 4   |
| H7  | 6  | 6   | 6   | 4   | 4   | 4   | 6   | 4   |
| H8  | 6  | 6   | 6   | 4   | 4   | 6   | 4   | 6   |
| H9  | 0  | 6   | 4   | 6   | 4   | 6   | 4   | 6   |
| H10 | 6  | 0   | 4   | 6   | 4   | 6   | 6   | 4   |
| H11 | 4  | 4   | 0   | 4   | 6   | 6   | 6   | 6   |
| H12 | 6  | 6   | 4   | 0   | 6   | 6   | 6   | 6   |
| H13 | 6  | 4   | 6   | 6   | 0   | 4   | 6   | 6   |
| H14 | 4  | 6   | 6   | 6   | 4   | 0   | 6   | 6   |
| H15 | 4  | 6   | 6   | 6   | 6   | 6   | 0   | 4   |
| H16 | 6  | 4   | 6   | 6   | 6   | 6   | 4   | 0   | wherein Table 2-6 comprises:

|     | H1 | H2 | H3 | H4 | H5 | H6 | H7 | H8 |
|-----|----|----|----|----|----|----|----|----|
| G1  | 10 | 4  | 4  | 4  | 4  | 4  | 4  | 4  |
| G2  | 4  | 10 | 4  | 4  | 4  | 4  | 4  | 4  |
| G3  | 4  | 4  | 10 | 4  | 4  | 4  | 4  | 6  |
| G4  | 4  | 4  | 4  | 10 | 4  | 4  | 6  | 4  |
| G5  | 4  | 4  | 4  | 4  | 10 | 4  | 6  | 6  |
| G6  | 4  | 4  | 4  | 4  | 4  | 10 | 6  | 6  |
| G7  | 4  | 4  | 4  | 6  | 6  | 6  | 10 | 4  |
| G8  | 4  | 4  | 6  | 4  | 6  | 6  | 4  | 10 |
| G9  | 4  | 4  | 6  | 6  | 4  | 6  | 4  | 4  |
| G10 | 4  | 4  | 6  | 6  | 6  | 4  | 4  | 4  |
| G11 | 4  | 6  | 4  | 4  | 6  | 6  | 4  | 4  |
| G12 | 4  | 6  | 6  | 6  | 4  | 4  | 6  | 6  |
| G13 | 4  | 6  | 4  | 6  | 4  | 4  | 6  | 6  |
| G14 | 4  | 6  | 6  | 4  | 6  | 4  | 6  | 4  |
| G15 | 4  | 6  | 4  | 6  | 6  | 4  | 4  | 6  |
| G16 | 4  | 6  | 6  | 4  | 4  | 6  | 6  | 4  |

|     | H9 | H10 | H11 | H12 | H13 | H14 | H15 | H16 |
|-----|----|-----|-----|-----|-----|-----|-----|-----|
| G1  | 4  | 4   | 4   | 4   | 4   | 4   | 4   | 4   |
| G2  | 4  | 4   | 6   | 6   | 6   | 6   | 4   | 6   |
| G3  | 6  | 6   | 4   | 6   | 4   | 6   | 6   | 4   |
| G4  | 6  | 6   | 6   | 4   | 6   | 4   | 4   | 6   |
| G5  | 4  | 6   | 6   | 4   | 4   | 6   | 6   | 4   |
| G6  | 6  | 4   | 6   | 4   | 6   | 4   | 4   | 6   |
| G7  | 4  | 4   | 4   | 6   | 4   | 6   | 4   | 6   |
| G8  | 4  | 4   | 4   | 6   | 6   | 4   | 6   | 4   |
| G9  | 10 | 4   | 6   | 4   | 4   | 6   | 6   | 4   |
| G10 | 4  | 10  | 6   | 4   | 6   | 4   | 4   | 6   |
| G11 | 6  | 6   | 10  | 6   | 4   | 4   | 4   | 4   |
| G12 | 4  | 4   | 6   | 10  | 4   | 4   | 4   | 4   |
| G13 | 4  | 6   | 4   | 4   | 10  | 6   | 4   | 4   |
| G14 | 6  | 4   | 4   | 4   | 6   | 10  | 4   | 4   |
| G15 | 6  | 4   | 4   | 4   | 4   | 4   | 10  | 6   |
| G16 | 4  | 6   | 4   | 4   | 4   | 4   | 6   | 10  | wherein, values in Tables 2-1, 2-2, 2-3, 2-4, 2-5, and 2-6 represent code distances between corresponding codewords.

2. The method according to claim 1, wherein
$X_{ij}$ represents the joint feedback signal, a Primary carrier feedback signal of the joint feedback signal is a signal corresponding to a number i, and a Secondary carrier feedback signal of the joint feedback signal is a signal corresponding to a number j, where $0 \le i \le 6$, $0 \le j \le 6$, and signals corresponding to numbers 0-6 are DTX, ACKnowledgement (ACK), Negative ACKnowledgement (NACK), ACK_ACK, ACK_NACK, NACK_ACK, and NACK_NACK in sequence; and
when the codewords comprised in the codebook structure corresponding to the single stream-single stream sending mode are A1, A2, B1, B2, C1, C2, D1, and D2, the encoding the joint feedback signal in the single stream-single stream sending mode comprises:
encoding joint feedback signals $X_{11}$, $X_{12}$, $X_{10}$, $X_{21}$, $X_{22}$, $X_{20}$, $X_{01}$, and $X_{02}$ into D2, B2, A1, A2, C2, B1, C1, and D1, respectively; or
when the codewords comprised in the codebook structure corresponding to the single stream-single stream sending mode are A1, B1, C1, C2, C3, C4, C5, and D1, the encoding the joint feedback signal in the single stream-single stream sending mode comprises:
encoding and mapping the joint feedback signals $X_{11}$, $X_{12}$, $X_{10}$, $X_{21}$, $X_{22}$, $X_{20}$, $X_{01}$, and $X_{02}$ into C2, C3, A1, C4, C5, B1, C1, and D1, respectively; or
when the codewords comprised in the codebook structure corresponding to the single stream-single stream sending mode are A1, A2, B1, B2, C1, C2, C3, and C4, the encoding the joint feedback signal in the single stream-single stream sending mode comprises:
encoding and mapping the joint feedback signals $X_{11}$, $X_{12}$, $X_{10}$, $X_{21}$, $X_{22}$, $X_{20}$, $X_{01}$, and $X_{02}$ into C1, C2, A1, C3, C4, B1, A2, and B2, respectively.

3. The method according to claim 1, wherein
$X_{ij}$ represents the joint feedback signal, a Primary carrier signal of the joint feedback signal is a signal corresponding to a number i, and a Secondary carrier signal of the joint feedback signal is a signal corresponding to a number j, where $0 \le i \le 6$, $0 \le j \le 6$, and signals corresponding to numbers 0-6 are DTX, ACK, NACK, ACK_ACK, ACK_NACK, NACK_ACK, and NACK_NACK in sequence; and
when the codewords comprised in the codebook structure corresponding to the single stream-dual stream sending mode are A1, A2, A3, A4, A5, A6, C1, C2, C3, D1, D2, D3, E1, and F1, the encoding the joint feedback signal in the single stream-dual stream sending mode comprises:
encoding joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into E1, A3, C1, C2, A4, F1, C3, D2, D1, D3, A1, A2, A5, and A6, respectively; or when the codewords comprised in the codebook structure corresponding to the single stream-dual stream sending mode are A1, A2, A3, A4, A5, A6, B1, B2, C1, C2, C3, C4, C5, and C6, the encoding the joint feedback signal in the single stream-dual stream sending mode comprises:

encoding the joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into A1, C1, C2, C3, A3, B1, C4, C5, C6, B2, A2, A4, A5, and A6, respectively; or when the codewords comprised in the codebook structure corresponding to the single stream-dual stream sending mode are A1, A2, A3, A4, A5, A6, B1, B2, C1, C2, C3, C4, C5, and C6, the encoding the joint feedback signal in the single stream-dual stream sending mode comprises:

encoding the joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into A1, C5, A2, A3, C6, B1, A4, A5, A6, B2, C1, C2, C3, and C4, respectively; or when the codewords comprised in the codebook structure corresponding to the single stream-dual stream sending mode are A1, A2, A3, A4, A5, A6, B1, B2, C1, C2, D1, D3, D4, and D5, the encoding the joint feedback signal in the single stream-dual stream sending mode comprises:

encoding the joint feedback signals $X_{10}$, $X_{13}$, $X_{14}$, $X_{15}$, $X_{16}$, $X_{20}$, $X_{23}$, $X_{24}$, $X_{25}$, $X_{26}$, $X_{03}$, $X_{04}$, $X_{05}$, and $X_{06}$ into C1, D3, D4, D5, C2, D1, B2, A5, A6, B1, A1, A2, A3, and A4, respectively.

4. The method according to claim 1, wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \leq i \leq 6$, $0 \leq j \leq 6$, and signals corresponding to numbers 0-6 are DTX, ACK, NACK, ACK_ACK, ACK_NACK, NACK_ACK, and NACK_NACK in sequence; and when the codewords comprised in the codebook structure corresponding to the dual stream-single stream sending mode are A1, A2, A3, A4, A5, A6, C1, C2, C3, D1, D2, D3, E1, and F1, the encoding the joint feedback signal in the dual stream-single stream sending mode comprises:

encoding joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into E1, F1, A3, C3, A1, C1, D2, A2, C2, D1, A5, A4, D3, and A6 respectively; or when the codewords comprised in the codebook structure corresponding to the dual stream-single stream sending mode are A1, A2, A3, A4, A5, A6, B1, B2, C1, C2, C3, C4, C5, and C6, the encoding the joint feedback signal in the dual stream-single stream sending mode comprises:

encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into A1, B1, C1, C4, A2, C2, C5, A4, C3, C6, A5, A3, B2, and A6, respectively; or when the codewords comprised in the codebook structure corresponding to the dual stream-single stream sending mode are A1, A2, A3, A4, A5, A6, B1, B2, C1, C2, C3, C4, C5, and C6, the encoding the joint feedback signal in the dual stream-single stream sending mode comprises:

encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into A1, B1, C5, A4, C1, A2, A5, C2, A3, A6, C3, C6, B2, and C4, respectively; or when the codewords comprised in the codebook structure corresponding to the dual stream-single stream sending mode are A1, A2, A5, A6, B1, B2, C1, C2, C3, D1, D2, D3, E1, and F1, the encoding the joint feedback signal in the dual stream-single stream sending mode comprises:

encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into E1, F1, B2, C3, A1, C1, D2, A2, C2, D1, A5, D3, B1, and A6, respectively; or when the codewords comprised in the codebook structure corresponding to the dual stream-single stream sending mode are A1, A2, A3, A4, B1, B2, B3, C1, C2, C3, C4, C5, C6, and D1, the encoding the joint feedback signal in the dual stream-single stream sending mode comprises:

encoding the joint feedback signals $X_{01}$, $X_{02}$, $X_{31}$, $X_{32}$, $X_{30}$, $X_{41}$, $X_{42}$, $X_{40}$, $X_{51}$, $X_{52}$, $X_{50}$, $X_{61}$, $X_{62}$, and $X_{60}$ into D1, C1, C2, B2, A1, C3, B3, A2, C4, C6, A3, C5, B1, and A4, respectively.

5. The method according to claim 1, wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \leq i \leq 6$, $0 \leq j \leq 6$, and signals corresponding to numbers 0-6 are DTX, ACK, NACK, ACK_ACK, ACK_NACK, NACK_ACK, and NACK_NACK in sequence; and when the codewords comprised in the codebook structure corresponding to the dual stream-dual stream sending mode are A1, A2, A3, A4, A5, A6, B1, B2, B3, B4, B5, B6, C1, C2, C3, C4, C5, C6, D1, D2, D3, D4, D5, and D6, the encoding the joint feedback signal in the dual stream-dual stream sending mode comprises:

encoding joint feedback signals $X_{03}$, $X_{04}$, $X_{05}$, $X_{06}$, $X_{30}$, $X_{33}$, $X_{34}$, $X_{35}$, $X_{36}$, $X_{40}$, $X_{43}$, $X_{44}$, $X_{45}$, $X_{46}$, $X_{50}$, $X_{53}$, $X_{54}$, $X_{55}$, $X_{56}$, $X_{60}$, $X_{63}$, $X_{64}$, $X_{65}$, and $X_{66}$ into C1, C2, C3, C4, A1, B4, B5, B6, D1, A2, D5, D3, B3, C6, A3, D6, B2, D2, C5, A4, B1, A6, A5, and D4, respectively; or the encoding the joint feedback signal in the dual stream-dual stream sending mode comprises:

encoding the joint feedback signals $X_{03}$, $X_{04}$, $X_{05}$, $X_{06}$, $X_{30}$, $X_{33}$, $X_{34}$, $X_{35}$, $X_{36}$, $X_{40}$, $X_{43}$, $X_{44}$, $X_{45}$, $X_{46}$, $X_{50}$, $X_{53}$, $X_{54}$, $X_{55}$, $X_{56}$, $X_{60}$, $X_{63}$, $X_{64}$, $X_{65}$, and $X_{66}$ into B1, B2, B3, B4, A1, D4, B5, D2, D1, A2, A5, D3, B6, C6, A3, D6, A6, C3, C5, A4, D5, C2, C1, and C4, respectively; or when the codewords comprised in the codebook structure corresponding to the dual stream-dual stream sending mode are G7, G8, G9, G10, G11, G12, G13, G14, G15, G16, H1, H2, H3, H4, H5, H6, H7, H8, H9, H10, H11, H12, H13, H14, H15, and H16, the encoding the joint feedback signal in the dual stream-dual stream sending mode comprises:

encoding the joint feedback signals $X_{03}$, $X_{04}$, $X_{05}$, $X_{06}$, $X_{30}$, $X_{33}$, $X_{34}$, $X_{35}$, $X_{36}$, $X_{40}$, $X_{43}$, $X_{44}$, $X_{45}$, $X_{46}$, $X_{50}$, $X_{53}$, $X_{54}$, $X_{55}$, $X_{56}$, $X_{60}$, $X_{63}$, $X_{64}$, $X_{65}$, and $X_{66}$ into G12, G13, G14, H4, H1, G7, G8, G9, G10, H2, G11, G14, G16, H3, H7, H5, H6, H11, H12, H8, H13, H14, H15, and H16, respectively.

6. The method according to claim 1, wherein the codebook structure corresponding to the single stream-DTX sending mode is a subset of an intersection between the codebook structure corresponding to the single stream-single stream sending mode and the codebook structure corresponding to the single stream-dual stream sending mode;

the codebook structure corresponding to the DTX-single stream sending mode is a subset of an intersection between the codebook structure corresponding to the single stream-single stream sending mode and the codebook structure corresponding to the dual stream-single stream sending mode;

the codebook structure corresponding to the dual stream-DTX sending mode is a subset of an intersection between the codebook structure corresponding to the dual stream-single stream sending mode and the codebook structure corresponding to the dual stream-dual stream sending mode; and the codebook structure corresponding to the DTX-dual stream sending mode is a subset of an intersection between the codebook structure corresponding to the single stream-dual stream sending mode and the codebook structure corresponding to the dual stream-dual stream sending mode.

7. The method according to claim 6, wherein when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-2C-2D, a codebook structure type of the codebook structure corresponding to the dual stream-single stream sending mode is 6A-3C-3D-E-F, a codebook structure type of the codebook structure corresponding to the single stream-dual stream sending mode is 6A-3C-3D-E-F, and a codebook structure type of the codebook structure corresponding to the dual stream-dual stream sending mode is 6A-6B-6C-6D, mapping relationship between the joint feedback signals and codewords for encoding thereof are shown in Table 2-7;

wherein Table 2-7 comprises:

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 0 |
| D/AA | $X_{03}$ | 1 | 1 | 1 | 1 | 1 | 0 | 0 | 1 | 0 | 0 |
| D/AN | $X_{04}$ | 1 | 1 | 1 | 0 | 0 | 1 | 1 | 0 | 1 | 0 |
| D/NA | $X_{05}$ | 0 | 0 | 1 | 1 | 0 | 1 | 0 | 0 | 0 | 1 |
| D/NN | $X_{06}$ | 0 | 1 | 0 | 0 | 0 | 0 | 1 | 1 | 0 | 1 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 0 | 0 | 0 | 1 | 1 | 0 | 1 | 0 | 1 | 0 |
| A/AN | $X_{14}$ | 1 | 0 | 1 | 0 | 1 | 0 | 1 | 0 | 0 | 1 |
| A/NA | $X_{15}$ | 1 | 1 | 0 | 1 | 0 | 0 | 0 | 0 | 1 | 1 |
| A/NN | $X_{16}$ | 1 | 0 | 0 | 0 | 1 | 1 | 0 | 1 | 1 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 1 |
| N/N | $X_{22}$ | 0 | 1 | 0 | 1 | 0 | 1 | 0 | 1 | 0 | 1 |
| N/AA | $X_{23}$ | 1 | 0 | 0 | 1 | 0 | 1 | 1 | 1 | 0 | 0 |
| N/AN | $X_{24}$ | 0 | 0 | 1 | 0 | 1 | 1 | 1 | 0 | 0 | 0 |
| N/NA | $X_{25}$ | 0 | 1 | 0 | 1 | 0 | 1 | 0 | 1 | 1 | 0 |
| N/NN | $X_{26}$ | 0 | 1 | 1 | 0 | 1 | 0 | 0 | 0 | 1 | 1 |
| AA/D | $X_{30}$ | 1 | 0 | 1 | 0 | 1 | 1 | 1 | 1 | 0 | 1 |
| AA/A | $X_{31}$ | 0 | 0 | 0 | 0 | 1 | 1 | 0 | 0 | 1 | 0 |
| AA/N | $X_{32}$ | 0 | 1 | 0 | 1 | 1 | 1 | 1 | 1 | 0 | 0 |
| AA/AA | $X_{33}$ | 1 | 0 | 1 | 1 | 1 | 0 | 0 | 0 | 1 | 0 |
| AA/AN | $X_{34}$ | 1 | 0 | 1 | 0 | 0 | 1 | 1 | 1 | 0 | 1 |
| AA/NA | $X_{35}$ | 1 | 1 | 0 | 1 | 1 | 1 | 0 | 0 | 1 | 0 |
| AA/NN | $X_{36}$ | 0 | 0 | 1 | 0 | 1 | 0 | 0 | 1 | 1 | 0 |
| AN/D | $X_{40}$ | 1 | 1 | 0 | 1 | 0 | 0 | 1 | 0 | 1 | 1 |
| AN/A | $X_{41}$ | 1 | 1 | 1 | 0 | 0 | 1 | 1 | 0 | 1 | 0 |
| AN/N | $X_{42}$ | 1 | 0 | 1 | 0 | 1 | 0 | 1 | 1 | 0 | 0 |
| AN/AA | $X_{43}$ | 1 | 1 | 1 | 0 | 0 | 0 | 0 | 0 | 0 | 1 |
| AN/AN | $X_{44}$ | 1 | 1 | 0 | 0 | 1 | 0 | 1 | 1 | 1 | 0 |
| AN/NA | $X_{45}$ | 1 | 0 | 0 | 0 | 0 | 1 | 0 | 1 | 0 | 0 |
| AN/NN | $X_{46}$ | 1 | 0 | 0 | 0 | 1 | 0 | 0 | 0 | 1 | 1 |
| NA/D | $X_{50}$ | 0 | 1 | 1 | 1 | 1 | 0 | 1 | 0 | 1 | 1 |
| NA/A | $X_{51}$ | 0 | 0 | 1 | 1 | 0 | 1 | 0 | 0 | 0 | 1 |
| NA/N | $X_{52}$ | 0 | 0 | 0 | 1 | 1 | 0 | 0 | 1 | 0 | 1 |
| NA/AA | $X_{53}$ | 0 | 1 | 1 | 1 | 0 | 1 | 1 | 1 | 0 | 0 |
| NA/AN | $X_{54}$ | 0 | 0 | 1 | 0 | 1 | 0 | 1 | 0 | 0 | 0 |
| NA/NA | $X_{55}$ | 0 | 0 | 0 | 1 | 1 | 0 | 0 | 1 | 0 | 1 |
| NA/NN | $X_{56}$ | 0 | 0 | 0 | 1 | 1 | 1 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 1 | 0 | 0 | 0 | 1 | 0 | 0 | 0 |
| NN/N | $X_{62}$ | 1 | 0 | 1 | 0 | 0 | 0 | 0 | 0 | 1 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 0 |
| NN/NN | $X_{66}$ | 0 | 1 | 1 | 0 | 1 | 1 | 0 | 1 | 1 | 1 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \leq i \leq 6$, $0 \leq j \leq 6$, and signals corresponding to numbers 0-6 are DTX, ACK, NACK, ACK_ACK, ACK_NACK, NACK_ACK, and NACK_NACK in sequence.

8. The method according to claim 6, wherein when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-2C-2D, a codebook structure type of the codebook structure corresponding to the dual stream-single stream sending mode is 6A-2B-6C, a codebook structure type of the codebook structure corresponding to the single stream-dual stream sending mode is 6A-2B-6C, and a codebook structure type of the codebook structure corresponding to the dual stream-dual stream sending mode is 6A-6B-6C-6D, mapping relationship between the joint feedback signals and codewords for encoding thereof are shown in Table 2-8;

wherein Table 2-8 comprises:

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 1 | 0 | 0 | 0 | 1 | 1 | 0 | 0 | 0 |
| D/AN | $X_{04}$ | 1 | 0 | 0 | 1 | 0 | 0 | 0 | 0 | 1 | 1 |
| D/NA | $X_{05}$ | 0 | 1 | 0 | 0 | 1 | 0 | 0 | 1 | 1 | 0 |
| D/NN | $X_{06}$ | 0 | 0 | 1 | 0 | 1 | 1 | 0 | 0 | 0 | 1 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 1 | 1 | 1 | 1 | 0 | 0 | 0 | 0 | 0 |
| A/AN | $X_{14}$ | 0 | 1 | 0 | 0 | 0 | 1 | 0 | 1 | 0 | 1 |
| A/NA | $X_{15}$ | 0 | 1 | 1 | 0 | 0 | 0 | 1 | 0 | 1 | 1 |
| A/NN | $X_{16}$ | 0 | 0 | 1 | 1 | 0 | 0 | 1 | 1 | 0 | 0 |
| N/D | $X_{20}$ | 0 | 0 | 0 | 0 | 0 | 0 | 0 | 0 | 0 | 0 |
| N/A | $X_{21}$ | 0 | 0 | 1 | 0 | 1 | 1 | 0 | 0 | 0 | 1 |
| N/N | $X_{22}$ | 0 | 1 | 0 | 1 | 0 | 1 | 0 | 1 | 0 | 1 |
| N/AA | $X_{23}$ | 1 | 0 | 1 | 0 | 0 | 0 | 1 | 0 | 1 | 0 |
| N/AN | $X_{24}$ | 0 | 0 | 0 | 1 | 1 | 1 | 1 | 0 | 1 | 0 |
| N/NA | $X_{25}$ | 1 | 0 | 0 | 0 | 1 | 0 | 1 | 1 | 0 | 1 |

| | | | | | | | | | | |
|---|---|---|---|---|---|---|---|---|---|---|
| N/NN | $X_{26}$ | 0 | 0 | 1 | 1 | 1 | 0 | 0 | 1 | 1 | 1 |
| AA/D | $X_{30}$ | 0 | 1 | 1 | 0 | 0 | 0 | 1 | 0 | 1 | 1 |
| AA/A | $X_{31}$ | 1 | 1 | 1 | 1 | 1 | 1 | 1 | 1 | 1 | 1 |
| AA/N | $X_{32}$ | 1 | 0 | 0 | 1 | 0 | 0 | 0 | 0 | 1 | 1 |
| AA/AA | $X_{33}$ | 0 | 1 | 1 | 1 | 0 | 1 | 0 | 0 | 1 | 0 |
| AA/AN | $X_{34}$ | 0 | 0 | 0 | 0 | 0 | 1 | 1 | 1 | 1 | 1 |
| AA/NA | $X_{35}$ | 1 | 0 | 1 | 0 | 1 | 0 | 1 | 0 | 1 | 0 |
| AA/NN | $X_{36}$ | 0 | 0 | 1 | 1 | 1 | 0 | 0 | 1 | 1 | 1 |
| AN/D | $X_{40}$ | 1 | 0 | 1 | 0 | 0 | 1 | 0 | 1 | 1 | 0 |
| AN/A | $X_{41}$ | 0 | 0 | 1 | 1 | 0 | 0 | 1 | 1 | 0 | 0 |
| AN/N | $X_{42}$ | 0 | 1 | 0 | 0 | 1 | 0 | 0 | 1 | 1 | 0 |
| AN/AA | $X_{43}$ | 0 | 0 | 0 | 0 | 0 | 0 | 0 | 0 | 0 | 0 |
| AN/AN | $X_{44}$ | 1 | 0 | 1 | 1 | 0 | 1 | 1 | 0 | 0 | 1 |
| AN/NA | $X_{45}$ | 1 | 1 | 1 | 0 | 0 | 0 | 1 | 0 | 0 | 1 |
| AN/NN | $X_{46}$ | 0 | 0 | 1 | 1 | 0 | 0 | 1 | 1 | 0 | 0 |
| NA/D | $X_{50}$ | 0 | 0 | 0 | 1 | 1 | 1 | 1 | 0 | 1 | 0 |
| NA/A | $X_{51}$ | 1 | 1 | 0 | 0 | 0 | 1 | 1 | 0 | 0 | 0 |
| NA/N | $X_{52}$ | 0 | 0 | 1 | 0 | 1 | 1 | 0 | 0 | 0 | 1 |
| NA/AA | $X_{53}$ | 1 | 1 | 0 | 0 | 1 | 1 | 0 | 0 | 1 | 1 |
| NA/AN | $X_{54}$ | 0 | 1 | 0 | 1 | 1 | 0 | 1 | 0 | 0 | 1 |
| NA/NA | $X_{55}$ | 0 | 1 | 1 | 0 | 1 | 1 | 1 | 1 | 0 | 0 |
| NA/NN | $X_{56}$ | 1 | 1 | 1 | 1 | 1 | 1 | 1 | 1 | 1 | 1 |
| NN/D | $X_{60}$ | 1 | 0 | 0 | 0 | 1 | 0 | 1 | 1 | 0 | 1 |
| NN/A | $X_{61}$ | 0 | 1 | 0 | 1 | 0 | 1 | 0 | 1 | 0 | 1 |
| NN/N | $X_{62}$ | 1 | 0 | 0 | 1 | 1 | 1 | 0 | 1 | 0 | 0 |
| NN/AA | $X_{63}$ | 1 | 0 | 0 | 1 | 1 | 1 | 0 | 1 | 0 | 0 |
| NN/AN | $X_{64}$ | 0 | 1 | 0 | 1 | 0 | 1 | 0 | 1 | 0 | 1 |
| NN/NA | $X_{65}$ | 1 | 1 | 1 | 1 | 1 | 0 | 0 | 0 | 0 | 0 |
| NN/NN | $X_{66}$ | 1 | 1 | 0 | 1 | 0 | 0 | 1 | 1 | 1 | 0 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \le i \le 6$, $0 \le j \le 6$, and signals corresponding to numbers 0-6 are DTX, ACK, NACK, ACK_ACK, ACK_NACK, NACK_ACK, and NACK_NACK in sequence.

9. The method according to claim 6, wherein
when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is A-B-5C-D, a codebook structure type of the codebook structure corresponding to the dual stream-single stream sending mode is 6A-2B-6C, a codebook structure type of the codebook structure corresponding to the single stream-dual stream sending mode is 6A-2B-6C, and a codebook structure type of the codebook structure corresponding to the dual stream-dual stream sending mode is 6A-6B-6C-6D, mapping relationship between the joint feedback signals and codewords for encoding thereof are shown in Table 2-9;
wherein Table 2-9 comprises:

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 1 | 0 | 0 | 0 | 1 | 1 | 0 | 0 | 0 |
| D/AN | $X_{04}$ | 1 | 0 | 0 | 1 | 0 | 0 | 0 | 0 | 1 | 1 |
| D/NA | $X_{05}$ | 0 | 1 | 0 | 0 | 1 | 0 | 0 | 1 | 1 | 0 |
| D/NN | $X_{06}$ | 0 | 0 | 1 | 0 | 1 | 1 | 0 | 0 | 0 | 1 |
| A/D | $X_{10}$ | 1 | 1 | 1 | 1 | 1 | 1 | 1 | 1 | 1 | 1 |
| A/A | $X_{11}$ | 0 | 1 | 0 | 1 | 0 | 1 | 0 | 1 | 0 | 1 |
| A/N | $X_{12}$ | 0 | 1 | 1 | 0 | 0 | 0 | 1 | 0 | 1 | 1 |
| A/AA | $X_{13}$ | 1 | 1 | 1 | 1 | 1 | 0 | 0 | 0 | 0 | 0 |
| A/AN | $X_{14}$ | 0 | 1 | 0 | 1 | 0 | 1 | 0 | 1 | 0 | 1 |
| A/NA | $X_{15}$ | 0 | 1 | 1 | 0 | 0 | 0 | 1 | 0 | 1 | 1 |
| A/NN | $X_{16}$ | 0 | 0 | 1 | 1 | 0 | 0 | 1 | 1 | 0 | 0 |
| N/D | $X_{20}$ | 0 | 0 | 0 | 0 | 0 | 0 | 0 | 0 | 0 | 0 |
| N/A | $X_{21}$ | 1 | 0 | 1 | 0 | 0 | 1 | 0 | 1 | 1 | 0 |
| N/N | $X_{22}$ | 0 | 0 | 0 | 1 | 1 | 1 | 0 | 1 | 1 | 0 |
| N/AA | $X_{23}$ | 1 | 0 | 1 | 0 | 0 | 1 | 0 | 1 | 1 | 0 |
| N/AN | $X_{24}$ | 0 | 0 | 0 | 1 | 1 | 1 | 1 | 0 | 1 | 0 |
| N/NA | $X_{25}$ | 1 | 0 | 0 | 0 | 1 | 0 | 1 | 1 | 0 | 1 |
| N/NN | $X_{26}$ | 0 | 0 | 1 | 1 | 0 | 0 | 1 | 1 | 0 | 0 |
| AA/D | $X_{30}$ | 0 | 1 | 1 | 0 | 0 | 1 | 0 | 1 | 1 | 0 |
| AA/A | $X_{31}$ | 1 | 1 | 1 | 1 | 1 | 1 | 1 | 1 | 1 | 1 |
| AA/N | $X_{32}$ | 1 | 0 | 0 | 1 | 0 | 0 | 0 | 0 | 1 | 1 |
| AA/AA | $X_{33}$ | 0 | 1 | 1 | 1 | 0 | 1 | 0 | 0 | 1 | 0 |
| AA/AN | $X_{34}$ | 0 | 0 | 0 | 0 | 0 | 1 | 1 | 1 | 1 | 1 |
| AA/NA | $X_{35}$ | 1 | 0 | 1 | 0 | 1 | 0 | 1 | 0 | 1 | 0 |
| AA/NN | $X_{36}$ | 0 | 0 | 1 | 1 | 1 | 0 | 0 | 1 | 1 | 1 |
| AN/D | $X_{40}$ | 1 | 0 | 1 | 0 | 0 | 1 | 0 | 1 | 1 | 0 |
| AN/A | $X_{41}$ | 0 | 0 | 1 | 1 | 0 | 0 | 1 | 1 | 0 | 0 |
| AN/N | $X_{42}$ | 0 | 1 | 0 | 0 | 1 | 0 | 0 | 1 | 1 | 0 |
| AN/AA | $X_{43}$ | 0 | 0 | 0 | 0 | 0 | 0 | 0 | 0 | 0 | 0 |
| AN/AN | $X_{44}$ | 1 | 0 | 1 | 1 | 0 | 1 | 1 | 0 | 0 | 1 |
| AN/NA | $X_{45}$ | 1 | 1 | 1 | 0 | 0 | 0 | 1 | 0 | 0 | 1 |
| AN/NN | $X_{46}$ | 0 | 0 | 1 | 1 | 0 | 0 | 1 | 1 | 0 | 0 |
| NA/D | $X_{50}$ | 0 | 0 | 0 | 1 | 1 | 1 | 1 | 0 | 1 | 0 |
| NA/A | $X_{51}$ | 1 | 1 | 0 | 0 | 0 | 1 | 1 | 0 | 0 | 0 |
| NA/N | $X_{52}$ | 0 | 0 | 1 | 0 | 1 | 1 | 0 | 0 | 0 | 1 |
| NA/AA | $X_{53}$ | 1 | 1 | 0 | 0 | 1 | 1 | 0 | 0 | 1 | 1 |
| NA/AN | $X_{54}$ | 0 | 1 | 0 | 1 | 1 | 0 | 1 | 0 | 0 | 1 |
| NA/NA | $X_{55}$ | 0 | 1 | 1 | 0 | 1 | 1 | 1 | 1 | 0 | 0 |
| NA/NN | $X_{56}$ | 1 | 1 | 1 | 1 | 1 | 1 | 1 | 1 | 1 | 1 |
| NN/D | $X_{60}$ | 1 | 0 | 0 | 0 | 1 | 0 | 1 | 1 | 0 | 1 |
| NN/A | $X_{61}$ | 0 | 1 | 0 | 1 | 0 | 1 | 0 | 1 | 0 | 1 |
| NN/N | $X_{62}$ | 1 | 0 | 0 | 1 | 1 | 1 | 0 | 1 | 0 | 0 |
| NN/AA | $X_{63}$ | 1 | 0 | 0 | 1 | 1 | 1 | 0 | 1 | 0 | 0 |
| NN/AN | $X_{64}$ | 0 | 1 | 0 | 1 | 0 | 1 | 0 | 1 | 0 | 1 |
| NN/NA | $X_{65}$ | 1 | 1 | 1 | 1 | 1 | 0 | 0 | 0 | 0 | 0 |
| NN/NN | $X_{66}$ | 1 | 1 | 0 | 1 | 0 | 0 | 1 | 1 | 1 | 0 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \le i \le 6$, $0 \le j \le 6$, and signals corresponding to numbers 0-6 are DTX, ACK, NACK, ACK_ACK, ACK_NACK, NACK_ACK, and NACK_NACK in sequence.

10. The method according to claim 6, wherein
when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-4C, a codebook structure type of the codebook structure corresponding to the dual stream-single stream sending mode is 6A-2B-6C, a codebook structure type of the codebook structure corresponding to the single stream-dual stream sending mode is 6A-2B-6C, and a codebook structure type of the codebook structure corresponding to the dual stream-dual stream sending mode is 6A-6B-6C-6D, mapping relationship between the joint feedback signals and codewords for encoding thereof are shown in Table 2-10;

wherein Table 2-10 comprises:

| | | | | | | | | | | |
|---|---|---|---|---|---|---|---|---|---|---|
| D/A | $X_{01}$ | 0 | 0 | 1 | 1 | 0 | 0 | 1 | 1 | 0 | 0 |
| D/N | $X_{02}$ | 1 | 1 | 0 | 0 | 1 | 1 | 0 | 0 | 1 | 1 |
| D/AA | $X_{03}$ | 1 | 1 | 0 | 0 | 0 | 1 | 1 | 0 | 0 | 0 |
| D/AN | $X_{04}$ | 1 | 0 | 0 | 1 | 0 | 0 | 0 | 0 | 1 | 1 |
| D/NA | $X_{05}$ | 0 | 1 | 0 | 0 | 1 | 0 | 0 | 1 | 1 | 0 |
| D/NN | $X_{06}$ | 0 | 0 | 1 | 0 | 1 | 1 | 0 | 0 | 0 | 1 |
| A/D | $X_{10}$ | 1 | 1 | 1 | 1 | 1 | 1 | 1 | 1 | 1 | 1 |
| A/A | $X_{11}$ | 1 | 1 | 1 | 1 | 1 | 0 | 0 | 0 | 0 | 0 |
| A/N | $X_{12}$ | 0 | 1 | 0 | 1 | 0 | 1 | 0 | 1 | 0 | 1 |
| A/AA | $X_{13}$ | 1 | 1 | 1 | 1 | 1 | 0 | 0 | 0 | 0 | 0 |
| A/AN | $X_{14}$ | 0 | 1 | 0 | 1 | 0 | 1 | 0 | 1 | 0 | 1 |
| A/NA | $X_{15}$ | 0 | 1 | 1 | 0 | 0 | 0 | 1 | 0 | 1 | 1 |
| A/NN | $X_{16}$ | 0 | 0 | 1 | 1 | 0 | 0 | 1 | 1 | 0 | 0 |
| N/D | $X_{20}$ | 0 | 0 | 0 | 0 | 0 | 0 | 0 | 0 | 0 | 0 |
| N/A | $X_{21}$ | 0 | 1 | 1 | 0 | 0 | 0 | 1 | 0 | 1 | 1 |
| N/N | $X_{22}$ | 1 | 0 | 1 | 0 | 0 | 1 | 0 | 1 | 1 | 0 |
| N/AA | $X_{23}$ | 1 | 0 | 1 | 0 | 0 | 1 | 0 | 1 | 1 | 1 |
| N/AN | $X_{24}$ | 0 | 0 | 0 | 1 | 1 | 1 | 1 | 0 | 1 | 0 |
| N/NA | $X_{25}$ | 1 | 0 | 0 | 0 | 1 | 0 | 1 | 1 | 0 | 1 |
| N/NN | $X_{26}$ | 0 | 0 | 1 | 1 | 1 | 0 | 0 | 1 | 1 | 0 |
| AA/D | $X_{30}$ | 0 | 1 | 1 | 0 | 0 | 0 | 1 | 0 | 1 | 1 |
| AA/A | $X_{31}$ | 1 | 1 | 1 | 1 | 1 | 0 | 0 | 0 | 0 | 0 |
| AA/N | $X_{32}$ | 1 | 0 | 0 | 1 | 0 | 0 | 0 | 0 | 1 | 1 |
| AA/AA | $X_{33}$ | 0 | 1 | 1 | 1 | 0 | 1 | 0 | 0 | 1 | 0 |
| AA/AN | $X_{34}$ | 0 | 0 | 0 | 0 | 1 | 1 | 1 | 1 | 1 | 1 |
| AA/NA | $X_{35}$ | 1 | 0 | 1 | 0 | 1 | 0 | 1 | 0 | 1 | 0 |
| AA/NN | $X_{36}$ | 0 | 0 | 1 | 1 | 1 | 0 | 0 | 1 | 1 | 1 |
| AN/D | $X_{40}$ | 1 | 0 | 1 | 0 | 0 | 1 | 0 | 1 | 1 | 0 |
| AN/A | $X_{41}$ | 1 | 1 | 1 | 1 | 1 | 1 | 1 | 1 | 1 | 1 |
| AN/N | $X_{42}$ | 0 | 1 | 0 | 0 | 1 | 0 | 0 | 1 | 1 | 0 |
| AN/AA | $X_{43}$ | 0 | 0 | 0 | 0 | 0 | 0 | 0 | 0 | 0 | 0 |
| AN/AN | $X_{44}$ | 1 | 0 | 1 | 1 | 0 | 1 | 1 | 0 | 0 | 1 |
| AN/NA | $X_{45}$ | 1 | 1 | 1 | 0 | 0 | 0 | 0 | 1 | 0 | 1 |
| AN/NN | $X_{46}$ | 0 | 0 | 1 | 1 | 0 | 0 | 0 | 1 | 1 | 0 |
| NA/D | $X_{50}$ | 0 | 0 | 0 | 1 | 1 | 1 | 1 | 0 | 1 | 0 |
| NA/A | $X_{51}$ | 1 | 1 | 0 | 0 | 0 | 1 | 1 | 0 | 0 | 0 |
| NA/N | $X_{52}$ | 0 | 0 | 1 | 0 | 1 | 1 | 0 | 0 | 0 | 1 |
| NA/AA | $X_{53}$ | 1 | 1 | 0 | 0 | 1 | 1 | 0 | 0 | 1 | 1 |
| NA/AN | $X_{54}$ | 0 | 1 | 0 | 1 | 1 | 0 | 1 | 0 | 0 | 1 |
| NA/NA | $X_{55}$ | 0 | 1 | 1 | 0 | 1 | 1 | 1 | 1 | 0 | 0 |
| NA/NN | $X_{56}$ | 1 | 1 | 1 | 1 | 1 | 1 | 1 | 1 | 1 | 1 |
| NN/D | $X_{60}$ | 1 | 0 | 0 | 0 | 1 | 0 | 1 | 1 | 1 | 0 |
| NN/A | $X_{61}$ | 0 | 1 | 0 | 1 | 0 | 1 | 0 | 1 | 0 | 1 |
| NN/N | $X_{62}$ | 0 | 0 | 0 | 0 | 0 | 0 | 0 | 0 | 0 | 0 |
| NN/AA | $X_{63}$ | 1 | 0 | 0 | 0 | 1 | 1 | 1 | 0 | 0 | 0 |
| NN/AN | $X_{64}$ | 0 | 1 | 0 | 0 | 1 | 0 | 1 | 0 | 1 | 0 |
| NN/NA | $X_{65}$ | 1 | 1 | 1 | 1 | 1 | 0 | 0 | 0 | 0 | 0 |
| NN/NN | $X_{66}$ | 1 | 1 | 0 | 1 | 0 | 0 | 1 | 1 | 1 | 0 | or mapping relationship between the joint feedback signals and codewords for encoding thereof are shown in Table 2-11;

wherein Table 2-11 comprises:

| | | | | | | | | | | |
|---|---|---|---|---|---|---|---|---|---|---|
| D/A | $X_{01}$ | 0 | 0 | 1 | 1 | 0 | 0 | 1 | 1 | 0 | 0 |
| D/N | $X_{02}$ | 1 | 1 | 0 | 0 | 1 | 1 | 0 | 0 | 1 | 1 |
| D/AA | $X_{03}$ | 0 | 0 | 0 | 0 | 1 | 1 | 1 | 1 | 1 | 1 |
| D/AN | $X_{04}$ | 1 | 0 | 1 | 0 | 1 | 0 | 1 | 0 | 1 | 0 |
| D/NA | $X_{05}$ | 1 | 0 | 0 | 1 | 1 | 1 | 0 | 1 | 0 | 0 |
| D/NN | $X_{06}$ | 0 | 1 | 0 | 1 | 1 | 0 | 1 | 0 | 0 | 1 |
| A/D | $X_{10}$ | 1 | 1 | 1 | 1 | 1 | 1 | 1 | 1 | 1 | 1 |
| A/A | $X_{11}$ | 1 | 1 | 1 | 1 | 0 | 0 | 0 | 0 | 0 | 0 |
| A/N | $X_{12}$ | 0 | 1 | 0 | 1 | 0 | 1 | 0 | 1 | 0 | 1 |
| A/AA | $X_{13}$ | 1 | 1 | 1 | 0 | 0 | 0 | 0 | 1 | 0 | 1 |
| A/AN | $X_{14}$ | 0 | 0 | 1 | 1 | 0 | 0 | 1 | 1 | 0 | 0 |
| A/NA | $X_{15}$ | 1 | 0 | 0 | 0 | 1 | 1 | 0 | 0 | 0 | 0 |
| A/NN | $X_{16}$ | 0 | 1 | 1 | 0 | 1 | 0 | 0 | 0 | 1 | 0 |
| N/D | $X_{20}$ | 0 | 0 | 0 | 0 | 0 | 0 | 0 | 0 | 0 | 0 |
| N/A | $X_{21}$ | 0 | 1 | 1 | 0 | 0 | 0 | 1 | 0 | 1 | 1 |
| N/N | $X_{22}$ | 1 | 0 | 1 | 0 | 1 | 0 | 0 | 1 | 0 | 1 |
| N/AA | $X_{23}$ | 1 | 0 | 0 | 0 | 1 | 1 | 0 | 0 | 1 | 1 |
| N/AN | $X_{24}$ | 0 | 0 | 1 | 0 | 0 | 1 | 1 | 1 | 0 | 0 |
| N/NA | $X_{25}$ | 0 | 0 | 1 | 0 | 1 | 1 | 0 | 0 | 0 | 1 |
| N/NN | $X_{26}$ | 1 | 1 | 0 | 0 | 1 | 1 | 0 | 0 | 1 | 1 |
| AA/D | $X_{30}$ | 1 | 1 | 1 | 1 | 1 | 0 | 0 | 0 | 0 | 0 |
| AA/A | $X_{31}$ | 0 | 0 | 0 | 1 | 1 | 1 | 1 | 0 | 1 | 0 |
| AA/N | $X_{32}$ | 1 | 0 | 0 | 1 | 0 | 0 | 0 | 0 | 1 | 1 |
| AA/AA | $X_{33}$ | 0 | 1 | 1 | 0 | 1 | 1 | 1 | 1 | 0 | 0 |
| AA/AN | $X_{34}$ | 1 | 1 | 1 | 0 | 0 | 0 | 1 | 0 | 0 | 1 |
| AA/NA | $X_{35}$ | 1 | 1 | 0 | 0 | 1 | 1 | 0 | 0 | 1 | 1 |
| AA/NN | $X_{36}$ | 0 | 0 | 0 | 0 | 0 | 0 | 0 | 0 | 0 | 0 |
| AN/D | $X_{40}$ | 0 | 0 | 1 | 0 | 1 | 0 | 1 | 0 | 1 | 1 |
| AN/A | $X_{41}$ | 1 | 1 | 1 | 1 | 1 | 1 | 1 | 1 | 1 | 1 |
| AN/N | $X_{42}$ | 0 | 1 | 0 | 0 | 1 | 0 | 0 | 1 | 1 | 0 |
| AN/AA | $X_{43}$ | 0 | 0 | 0 | 1 | 1 | 1 | 1 | 0 | 1 | 0 |
| AN/AN | $X_{44}$ | 0 | 0 | 1 | 1 | 1 | 0 | 0 | 1 | 1 | 1 |
| AN/NA | $X_{45}$ | 0 | 1 | 1 | 1 | 0 | 1 | 0 | 1 | 1 | 0 |
| AN/NN | $X_{46}$ | 0 | 0 | 1 | 0 | 1 | 1 | 0 | 0 | 0 | 1 |
| NA/D | $X_{50}$ | 0 | 1 | 1 | 0 | 0 | 0 | 1 | 0 | 1 | 1 |
| NA/A | $X_{51}$ | 1 | 1 | 0 | 0 | 0 | 1 | 1 | 0 | 0 | 0 |
| NA/N | $X_{52}$ | 0 | 0 | 1 | 0 | 1 | 1 | 0 | 0 | 0 | 1 |
| NA/AA | $X_{53}$ | 1 | 1 | 0 | 1 | 0 | 0 | 1 | 1 | 1 | 0 |
| NA/AN | $X_{54}$ | 1 | 0 | 0 | 0 | 1 | 0 | 1 | 1 | 0 | 1 |
| NA/NA | $X_{55}$ | 1 | 1 | 0 | 0 | 0 | 1 | 1 | 0 | 0 | 0 |
| NA/NN | $X_{56}$ | 0 | 1 | 0 | 0 | 1 | 0 | 0 | 1 | 1 | 0 |
| NN/D | $X_{60}$ | 1 | 0 | 1 | 0 | 0 | 1 | 0 | 1 | 1 | 0 |
| NN/A | $X_{61}$ | 1 | 0 | 0 | 0 | 1 | 0 | 1 | 1 | 0 | 1 |
| NN/N | $X_{62}$ | 0 | 0 | 0 | 0 | 0 | 0 | 0 | 0 | 0 | 0 |
| NN/AA | $X_{63}$ | 1 | 0 | 1 | 1 | 0 | 1 | 1 | 0 | 0 | 1 |
| NN/AN | $X_{64}$ | 0 | 0 | 1 | 1 | 0 | 0 | 1 | 1 | 0 | 0 |
| NN/NA | $X_{65}$ | 1 | 1 | 1 | 1 | 1 | 1 | 1 | 1 | 1 | 1 |
| NN/NN | $X_{66}$ | 1 | 0 | 0 | 1 | 0 | 0 | 0 | 0 | 1 | 1 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \leq i \leq 6$, $0 \leq j \leq 6$, and signals corresponding to numbers 0-6 are DTX, ACK, NACK, ACK_ACK, ACK_NACK, NACK_ACK, and NACK_NACK in sequence.

11. The method according to claim 6, wherein when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is A-B-5C-D, a codebook structure type of the codebook structure corresponding to the dual stream-single stream sending mode is 6A-3C-3D-E-F, a codebook structure type of the codebook structure corresponding to the single stream-dual stream sending mode is 6A-3C-3D-E-F, and a codebook structure type of the codebook structure corresponding to the dual stream-dual stream sending mode is 6A-6B-6C-6D, mapping relationship between the joint feedback signals and codewords for encoding thereof are shown in Table 2-12;

wherein Table 2-12 comprises:

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 1 | 1 | 1 | 1 | 0 | 0 | 1 | 0 | 0 |
| D/AN | $X_{04}$ | 1 | 1 | 1 | 0 | 0 | 1 | 1 | 0 | 1 | 0 |
| D/NA | $X_{05}$ | 0 | 0 | 1 | 0 | 1 | 0 | 0 | 0 | 0 | 1 |
| D/NN | $X_{06}$ | 0 | 1 | 0 | 0 | 0 | 0 | 1 | 1 | 0 | 1 |
| A/D | $X_{10}$ | 1 | 1 | 1 | 1 | 1 | 1 | 1 | 1 | 1 | 1 |

-continued

| | | | | | | | | | | | |
|---|---|---|---|---|---|---|---|---|---|---|---|
| A/A | $X_{11}$ | 0 | 1 | 0 | 1 | 0 | 1 | 0 | 1 | 0 | 1 |
| A/N | $X_{12}$ | 0 | 1 | 1 | 0 | 0 | 0 | 1 | 0 | 1 | 1 |
| A/AA | $X_{13}$ | 0 | 0 | 0 | 1 | 1 | 0 | 1 | 0 | 1 | 0 |
| A/AN | $X_{14}$ | 1 | 0 | 1 | 0 | 1 | 0 | 1 | 0 | 0 | 1 |
| A/NA | $X_{15}$ | 1 | 1 | 0 | 1 | 0 | 0 | 0 | 0 | 1 | 1 |
| A/NN | $X_{16}$ | 1 | 0 | 0 | 0 | 1 | 1 | 0 | 1 | 1 | 1 |
| N/D | $X_{20}$ | 0 | 0 | 0 | 0 | 0 | 0 | 0 | 0 | 0 | 0 |
| N/A | $X_{21}$ | 1 | 0 | 1 | 0 | 0 | 1 | 0 | 1 | 1 | 0 |
| N/N | $X_{22}$ | 0 | 0 | 0 | 1 | 1 | 1 | 1 | 0 | 1 | 0 |
| N/AA | $X_{23}$ | 1 | 0 | 0 | 1 | 0 | 1 | 1 | 1 | 0 | 0 |
| N/AN | $X_{24}$ | 0 | 0 | 1 | 0 | 1 | 1 | 1 | 1 | 0 | 0 |
| N/NA | $X_{25}$ | 0 | 1 | 0 | 1 | 0 | 1 | 0 | 1 | 1 | 0 |
| N/NN | $X_{26}$ | 0 | 1 | 1 | 0 | 1 | 0 | 0 | 0 | 1 | 1 |
| AA/D | $X_{30}$ | 1 | 0 | 1 | 0 | 1 | 1 | 1 | 1 | 0 | 1 |
| AA/A | $X_{31}$ | 0 | 0 | 0 | 0 | 1 | 1 | 0 | 0 | 1 | 0 |
| AA/N | $X_{32}$ | 0 | 1 | 0 | 1 | 1 | 1 | 1 | 0 | 0 | 0 |
| AA/AA | $X_{33}$ | 1 | 0 | 1 | 1 | 1 | 1 | 0 | 0 | 1 | 0 |
| AA/AN | $X_{34}$ | 1 | 0 | 1 | 1 | 0 | 0 | 1 | 1 | 1 | 1 |
| AA/NA | $X_{35}$ | 1 | 1 | 0 | 1 | 1 | 1 | 1 | 0 | 0 | 1 |
| AA/NN | $X_{36}$ | 0 | 0 | 0 | 0 | 0 | 1 | 1 | 0 | 1 | 1 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 1 | 1 | 0 | 1 | 0 |
| AN/N | $X_{42}$ | 1 | 0 | 0 | 1 | 0 | 1 | 1 | 1 | 1 | 0 |
| AN/AA | $X_{43}$ | 1 | 1 | 1 | 0 | 0 | 0 | 0 | 0 | 0 | 1 |
| AN/AN | $X_{44}$ | 1 | 1 | 0 | 0 | 1 | 0 | 1 | 1 | 1 | 0 |
| AN/NA | $X_{45}$ | 1 | 0 | 0 | 0 | 0 | 1 | 0 | 1 | 0 | 0 |
| AN/NN | $X_{46}$ | 1 | 0 | 0 | 0 | 1 | 0 | 0 | 0 | 1 | 1 |
| NA/D | $X_{50}$ | 0 | 1 | 1 | 1 | 1 | 0 | 1 | 0 | 1 | 1 |
| NA/A | $X_{51}$ | 0 | 0 | 1 | 1 | 0 | 1 | 0 | 0 | 0 | 1 |
| NA/N | $X_{52}$ | 0 | 0 | 0 | 1 | 1 | 0 | 0 | 1 | 0 | 1 |
| NA/AA | $X_{53}$ | 0 | 1 | 1 | 1 | 0 | 1 | 1 | 1 | 0 | 0 |
| NA/AN | $X_{54}$ | 0 | 0 | 1 | 0 | 1 | 0 | 1 | 0 | 0 | 0 |
| NA/NA | $X_{55}$ | 0 | 0 | 0 | 1 | 1 | 0 | 0 | 1 | 0 | 1 |
| NA/NN | $X_{56}$ | 0 | 0 | 0 | 1 | 1 | 1 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 1 | 0 | 0 | 0 | 1 | 0 | 0 | 0 |
| NN/N | $X_{62}$ | 1 | 0 | 1 | 0 | 0 | 0 | 0 | 0 | 1 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 0 |
| NN/NN | $X_{66}$ | 0 | 1 | 1 | 0 | 1 | 1 | 0 | 1 | 1 | 1 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \le i \le 6$, $0 \le j \le 6$, and signals corresponding to numbers 0-6 are DTX, ACK, NACK, ACK_ACK, ACK_NACK, NACK_ACK, and NACK_NACK in sequence.

12. The method according to claim 6, wherein
mapping relationship between the joint feedback signals and codewords for encoding thereof are shown in Table 2-13;
wherein Table 2-13 comprises:

| | | | | | | | | | | | |
|---|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 1 | 1 | 1 | 1 | 0 | 1 | 0 |
| D/AA | $X_{03}$ | 1 | 1 | 1 | 1 | 1 | 0 | 0 | 1 | 0 | 0 |
| D/AN | $X_{04}$ | 1 | 1 | 0 | 0 | 0 | 1 | 1 | 0 | 1 | 0 |
| D/NA | $X_{05}$ | 0 | 0 | 1 | 0 | 1 | 0 | 0 | 0 | 0 | 1 |
| D/NN | $X_{06}$ | 0 | 1 | 0 | 0 | 0 | 0 | 1 | 1 | 0 | 1 |
| A/D | $X_{10}$ | 1 | 1 | 1 | 1 | 1 | 1 | 1 | 1 | 1 | 1 |
| A/A | $X_{11}$ | 0 | 1 | 0 | 1 | 0 | 1 | 0 | 1 | 0 | 1 |
| A/N | $X_{12}$ | 0 | 1 | 1 | 0 | 0 | 0 | 1 | 0 | 1 | 1 |
| A/AA | $X_{13}$ | 0 | 0 | 0 | 1 | 1 | 0 | 1 | 0 | 1 | 0 |
| A/AN | $X_{14}$ | 1 | 0 | 1 | 0 | 1 | 0 | 1 | 0 | 0 | 1 |
| A/NA | $X_{15}$ | 1 | 1 | 0 | 1 | 0 | 0 | 0 | 0 | 1 | 1 |
| A/NN | $X_{16}$ | 1 | 0 | 0 | 0 | 1 | 1 | 0 | 1 | 1 | 1 |
| N/D | $X_{20}$ | 0 | 0 | 0 | 0 | 0 | 0 | 0 | 0 | 0 | 0 |
| N/A | $X_{21}$ | 1 | 0 | 1 | 0 | 0 | 1 | 0 | 1 | 1 | 0 |
| N/N | $X_{22}$ | 0 | 0 | 0 | 1 | 1 | 1 | 1 | 0 | 1 | 0 |
| N/AA | $X_{23}$ | 1 | 0 | 0 | 1 | 0 | 1 | 1 | 1 | 0 | 0 |
| N/AN | $X_{24}$ | 0 | 0 | 1 | 0 | 1 | 1 | 1 | 1 | 0 | 0 |
| N/NA | $X_{25}$ | 0 | 1 | 0 | 1 | 0 | 1 | 0 | 1 | 1 | 0 |
| N/NN | $X_{26}$ | 0 | 1 | 1 | 0 | 1 | 0 | 0 | 0 | 1 | 1 |
| AA/D | $X_{30}$ | 1 | 0 | 1 | 0 | 1 | 1 | 1 | 1 | 0 | 1 |
| AA/A | $X_{31}$ | 0 | 1 | 0 | 0 | 1 | 1 | 1 | 0 | 0 | 0 |
| AA/N | $X_{32}$ | 1 | 0 | 0 | 0 | 1 | 0 | 0 | 0 | 1 | 1 |
| AA/AA | $X_{33}$ | 1 | 0 | 1 | 1 | 1 | 1 | 0 | 0 | 1 | 0 |
| AA/AN | $X_{34}$ | 1 | 0 | 1 | 1 | 0 | 0 | 1 | 1 | 1 | 1 |
| AA/NA | $X_{35}$ | 1 | 1 | 0 | 1 | 1 | 1 | 0 | 0 | 1 | 1 |
| AA/NN | $X_{36}$ | 0 | 0 | 0 | 0 | 1 | 1 | 0 | 1 | 1 | 1 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 1 | 1 | 0 | 1 | 0 |
| AN/N | $X_{42}$ | 1 | 1 | 0 | 0 | 1 | 0 | 1 | 1 | 1 | 0 |
| AN/AA | $X_{43}$ | 1 | 1 | 1 | 0 | 0 | 0 | 0 | 0 | 0 | 1 |
| AN/AN | $X_{44}$ | 1 | 1 | 0 | 0 | 1 | 0 | 1 | 1 | 1 | 0 |
| AN/NA | $X_{45}$ | 1 | 0 | 0 | 0 | 0 | 1 | 0 | 1 | 0 | 0 |
| AN/NN | $X_{46}$ | 1 | 0 | 0 | 0 | 1 | 0 | 0 | 0 | 1 | 1 |
| NA/D | $X_{50}$ | 0 | 1 | 1 | 1 | 1 | 0 | 1 | 0 | 1 | 1 |
| NA/A | $X_{51}$ | 0 | 0 | 1 | 1 | 0 | 1 | 0 | 0 | 0 | 1 |
| NA/N | $X_{52}$ | 0 | 0 | 0 | 1 | 1 | 0 | 0 | 1 | 0 | 1 |
| NA/AA | $X_{53}$ | 0 | 1 | 1 | 1 | 0 | 1 | 1 | 1 | 0 | 0 |
| NA/AN | $X_{54}$ | 0 | 0 | 1 | 0 | 1 | 0 | 1 | 0 | 0 | 0 |
| NA/NA | $X_{55}$ | 0 | 0 | 0 | 1 | 1 | 0 | 0 | 1 | 0 | 1 |
| NA/NN | $X_{56}$ | 0 | 0 | 0 | 1 | 1 | 1 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 0 | 1 | 0 | 0 | 0 | 0 | 1 | 1 | 0 |
| NN/N | $X_{62}$ | 0 | 1 | 1 | 1 | 0 | 1 | 1 | 1 | 0 | 0 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 0 |
| NN/NN | $X_{66}$ | 0 | 1 | 1 | 0 | 1 | 1 | 0 | 1 | 1 | 1 | wherein $X_{ij}$ represents the joint feedback signal, a Primary carrier signal of the joint feedback signal is a signal corresponding to a number i, and a Secondary carrier signal of the joint feedback signal is a signal corresponding to a number j, where $0 \le i \le 6$, $0 \le j \le 6$, and signals corresponding to numbers 0-6 are DTX, ACK, NACK, ACK_ACK, ACK_NACK, NACK_ACK, and NACK_NACK in sequence.

13. The method according to claim 6, wherein
when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-2C-2D, a codebook structure type of the codebook structure corresponding to the dual stream-single stream sending mode is 6A-3C-3D-E-F, a codebook structure type of the codebook structure corresponding to the single stream-dual stream sending mode is 6A-3C-3D-E-F, and a codebook structure type of the codebook structure corresponding to the dual stream-dual stream sending mode is 6A-6B-6C-6D, mapping relationship between the joint feedback signals and codewords for encoding thereof are shown in Table 2-14;
wherein Table 2-14 comprises:

| | | | | | | | | | | | |
|---|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 0 | 0 | 1 | 1 | 0 | 1 |
| D/NA | $X_{05}$ | 0 | 0 | 0 | 1 | 1 | 1 | 1 | 1 | 1 | 0 |

-continued

| | | | | | | | | | | |
|---|---|---|---|---|---|---|---|---|---|---|
| D/NN | $X_{06}$ | 1 | 1 | 1 | 1 | 1 | 0 | 0 | 1 | 0 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 0 | 1 | 0 | 0 | 1 | 1 | 0 | 0 | 1 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 1 | 0 | 0 | 1 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 0 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 0 | 0 | 0 | 1 | 1 | 0 | 0 | 1 | 0 |
| AA/N | $X_{32}$ | 0 | 1 | 0 | 1 | 1 | 1 | 1 | 0 | 0 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 0 | 1 | 1 | 1 | 0 |
| AA/NA | $X_{35}$ | 1 | 1 | 0 | 1 | 1 | 1 | 0 | 0 | 0 | 1 |
| AA/NN | $X_{36}$ | 0 | 1 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 1 | 1 | 0 | 1 | 0 |
| AN/N | $X_{42}$ | 1 | 1 | 1 | 0 | 1 | 0 | 0 | 1 | 1 | 0 |
| AN/AA | $X_{43}$ | 0 | 0 | 0 | 1 | 1 | 1 | 0 | 0 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 1 | 0 | 0 | 0 | 1 | 0 | 1 |
| NA/D | $X_{50}$ | 0 | 1 | 1 | 1 | 1 | 0 | 1 | 0 | 1 | 1 |
| NA/A | $X_{51}$ | 0 | 0 | 0 | 1 | 1 | 1 | 0 | 0 | 0 | 1 |
| NA/N | $X_{52}$ | 0 | 0 | 0 | 1 | 1 | 0 | 1 | 0 | 1 | 0 |
| NA/AA | $X_{53}$ | 1 | 1 | 0 | 0 | 0 | 1 | 1 | 1 | 0 | 0 |
| NA/AN | $X_{54}$ | 0 | 0 | 1 | 0 | 1 | 0 | 1 | 0 | 0 | 0 |
| NA/NA | $X_{55}$ | 1 | 0 | 1 | 1 | 1 | 0 | 0 | 1 | 1 | 0 |
| NA/NN | $X_{56}$ | 1 | 1 | 1 | 0 | 0 | 0 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 0 | 0 | 1 | 0 | 0 | 1 | 0 | 0 |
| NN/N | $X_{62}$ | 1 | 0 | 1 | 0 | 0 | 0 | 1 | 0 | 0 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 1 | 0 | 0 | 1 | 0 |
| NN/NA | $X_{65}$ | 0 | 1 | 0 | 0 | 1 | 0 | 0 | 1 | 0 | 0 |
| NN/NN | $X_{66}$ | 0 | 0 | 0 | 0 | 0 | 1 | 1 | 1 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0. |

14. The method according to claim 6, wherein
when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-4C, a codebook structure type of the codebook structure corresponding to the dual stream-single stream sending mode is 6A-2B-6C, a codebook structure type of the codebook structure corresponding to the single stream-dual stream sending mode is 6A-3C-3D-E-F, and a codebook structure type of the codebook structure corresponding to the dual stream-dual stream sending mode is 6A-6B-6C-6D, mapping relationship between the joint feedback signals and codewords for encoding thereof are shown in Table 2-17;
wherein Table 2-17 comprises:

[First part of Table 2-16 on left column, continued]

| | | | | | | | | | | |
|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 1 | 1 | 1 | 0 | 0 | 1 |
| D/NA | $X_{05}$ | 0 | 0 | 1 | 1 | 1 | 1 | 1 | 1 | 0 | 0 |
| D/NN | $X_{06}$ | 1 | 1 | 1 | 1 | 1 | 0 | 0 | 0 | 0 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 0 | 1 | 0 | 0 | 1 | 1 | 0 | 0 | 1 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 0 | 0 | 1 | 1 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 0 | 1 | 0 | 0 | 1 | 0 | 0 | 1 | 0 |
| AA/N | $X_{32}$ | 0 | 1 | 1 | 1 | 0 | 1 | 1 | 1 | 0 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 1 | 1 | 0 | 1 | 1 |
| AA/NA | $X_{35}$ | 1 | 1 | 0 | 1 | 1 | 0 | 1 | 1 | 0 | 1 |
| AA/NN | $X_{36}$ | 0 | 1 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 1 | 0 | 0 | 1 | 1 | 1 | 0 | 1 | 0 |
| AN/N | $X_{42}$ | 1 | 1 | 1 | 0 | 0 | 0 | 1 | 1 | 1 | 0 |
| AN/AA | $X_{43}$ | 0 | 0 | 0 | 1 | 1 | 1 | 0 | 0 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 0 | 1 | 0 | 1 | 0 | 0 |
| AN/NN | $X_{46}$ | 0 | 0 | 1 | 1 | 0 | 0 | 0 | 1 | 0 | 1 |
| NA/D | $X_{50}$ | 0 | 1 | 1 | 1 | 1 | 0 | 1 | 0 | 1 | 1 |
| NA/A | $X_{51}$ | 0 | 0 | 0 | 1 | 1 | 1 | 0 | 0 | 0 | 1 |
| NA/N | $X_{52}$ | 0 | 0 | 0 | 1 | 1 | 0 | 1 | 0 | 1 | 0 |
| NA/AA | $X_{53}$ | 1 | 1 | 0 | 0 | 0 | 1 | 1 | 1 | 0 | 0 |
| NA/AN | $X_{54}$ | 0 | 0 | 1 | 0 | 1 | 0 | 1 | 0 | 0 | 0 |
| NA/NA | $X_{55}$ | 1 | 0 | 1 | 1 | 1 | 0 | 0 | 1 | 1 | 0 |
| NA/NN | $X_{56}$ | 1 | 1 | 1 | 0 | 0 | 0 | 1 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 1 | 0 | 0 | 1 | 0 | 0 | 1 | 0 | 0 |
| NN/N | $X_{62}$ | 1 | 0 | 1 | 0 | 0 | 0 | 1 | 0 | 0 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 1 | 0 | 0 | 1 | 0 |
| NN/NA | $X_{65}$ | 0 | 1 | 0 | 0 | 1 | 0 | 0 | 1 | 0 | 0 |
| NN/NN | $X_{66}$ | 0 | 0 | 0 | 0 | 0 | 1 | 1 | 1 | 1 | 1 |
| Preamble (PRE)/Postamble (POST) Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 | wherein the PRE/POST Indication Information is replaceable with Table 2-15;
wherein Table 2-15 comprises:

| PRE/POST Indication Information | | | | | | | | | | |
|---|---|---|---|---|---|---|---|---|---|---|
| PRE | 0 | 0 | 1 | 1 | 0 | 0 | 0 | 1 | 1 | 1 |
| POST | 1 | 1 | 0 | 0 | 1 | 1 | 1 | 0 | 0 | 0 | or as shown in Table 2-16;
wherein Table 2-16 comprises:

-continued

| | | | | | | | | | | | |
|---|---|---|---|---|---|---|---|---|---|---|---|
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 1 | 0 | 1 | 0 | 0 | 1 |
| A/AA | $X_{13}$ | 1 | 0 | 1 | 0 | 0 | 1 | 1 | 0 | 0 | 0 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 1 | 0 | 0 | 1 | 0 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 1 | 1 | 0 | 0 | 0 | 1 | 0 | 0 | 0 |
| AA/N | $X_{32}$ | 1 | 1 | 1 | 0 | 0 | 1 | 1 | 0 | 1 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 0 | 1 | 1 | 1 | 1 |
| AA/NA | $X_{35}$ | 1 | 1 | 0 | 1 | 1 | 1 | 1 | 0 | 1 | 0 |
| AA/NN | $X_{36}$ | 0 | 1 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 0 | 1 | 1 | 1 | 0 | 0 | 1 | 1 | 0 |
| AN/N | $X_{42}$ | 0 | 0 | 1 | 1 | 0 | 1 | 0 | 0 | 0 | 1 |
| AN/AA | $X_{43}$ | 0 | 0 | 0 | 1 | 1 | 0 | 0 | 1 | 0 | 1 |
| AN/AN | $X_{44}$ | 1 | 1 | 0 | 0 | 0 | 0 | 0 | 0 | 0 | 1 |
| AN/NA | $X_{45}$ | 1 | 0 | 0 | 0 | 1 | 0 | 1 | 0 | 0 | 0 |
| AN/NN | $X_{46}$ | 0 | 0 | 1 | 1 | 0 | 1 | 0 | 0 | 0 | 1 |
| NA/D | $X_{50}$ | 0 | 1 | 1 | 1 | 0 | 1 | 0 | 1 | 1 | 1 |
| NA/A | $X_{51}$ | 0 | 1 | 1 | 1 | 1 | 1 | 1 | 0 | 0 | 0 |
| NA/N | $X_{52}$ | 1 | 1 | 0 | 0 | 1 | 0 | 0 | 0 | 0 | 1 |
| NA/AA | $X_{53}$ | 1 | 1 | 0 | 1 | 0 | 1 | 1 | 1 | 1 | 0 |
| NA/AN | $X_{54}$ | 0 | 0 | 1 | 0 | 1 | 0 | 1 | 0 | 1 | 0 |
| NA/NA | $X_{55}$ | 1 | 0 | 1 | 1 | 1 | 1 | 0 | 0 | 1 | 0 |
| NA/NN | $X_{56}$ | 1 | 1 | 1 | 0 | 0 | 1 | 1 | 0 | 1 | 0 |
| NN/D | $X_{60}$ | 1 | 0 | 0 | 1 | 0 | 0 | 1 | 0 | 0 | 0 |
| NN/A | $X_{61}$ | 0 | 0 | 0 | 0 | 1 | 1 | 0 | 0 | 1 | 0 |
| NN/N | $X_{62}$ | 0 | 1 | 0 | 0 | 0 | 1 | 1 | 0 | 0 | 1 |
| NN/AA | $X_{63}$ | 0 | 1 | 0 | 1 | 0 | 0 | 0 | 0 | 1 | 0 |
| NN/AN | $X_{64}$ | 0 | 0 | 1 | 0 | 0 | 0 | 0 | 1 | 1 | 0 |
| NN/NA | $X_{65}$ | 0 | 1 | 0 | 0 | 1 | 1 | 0 | 0 | 0 | 0 |
| NN/NN | $X_{66}$ | 0 | 0 | 0 | 0 | 0 | 1 | 1 | 0 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 | wherein the PRE/POST indication information is replaceable with Table 2-18;
wherein Table 2-18 comprises:

| | | | | | | | | | | |
|---|---|---|---|---|---|---|---|---|---|---|
| PRE/POST Indication Information | | | | | | | | | | |
| PRE | 0 | 1 | 1 | 0 | 0 | 1 | 0 | 0 | 1 | 0 |
| POST | 0 | 1 | 0 | 0 | 1 | 0 | 0 | 1 | 1 | 0 | or as shown in Table 2-19;
wherein Table 2-19 comprises:

| | | | | | | | | | | | |
|---|---|---|---|---|---|---|---|---|---|---|---|
| D/A | $X_{01}$ | 0 | 0 | 0 | 0 | 0 | 0 | 1 | 1 | 1 | 1 |
| D/N | $X_{02}$ | 1 | 1 | 1 | 1 | 1 | 1 | 0 | 0 | 0 | 0 |
| D/AA | $X_{03}$ | 1 | 0 | 0 | 0 | 1 | 0 | 0 | 0 | 1 | 1 |
| D/AN | $X_{04}$ | 0 | 1 | 0 | 0 | 1 | 1 | 0 | 0 | 0 | 1 |
| D/NA | $X_{05}$ | 0 | 0 | 1 | 1 | 1 | 1 | 1 | 1 | 0 | 0 |
| D/NN | $X_{06}$ | 1 | 1 | 1 | 1 | 1 | 0 | 0 | 0 | 1 | 1 |
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 1 | 0 | 1 | 0 | 0 | 1 |
| A/AA | $X_{13}$ | 1 | 0 | 1 | 0 | 0 | 1 | 1 | 0 | 0 | 0 |
| A/AN | $X_{14}$ | 1 | 0 | 0 | 1 | 0 | 1 | 0 | 1 | 0 | 1 |
| A/NA | $X_{15}$ | 0 | 0 | 1 | 1 | 1 | 0 | 1 | 0 | 0 | 1 |
| A/NN | $X_{16}$ | 0 | 1 | 1 | 1 | 0 | 1 | 0 | 0 | 1 | 0 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |
| N/AA | $X_{23}$ | 1 | 1 | 0 | 1 | 0 | 0 | 1 | 0 | 1 | 0 |
| N/AN | $X_{24}$ | 1 | 1 | 0 | 0 | 0 | 1 | 0 | 1 | 1 | 0 |
| N/NA | $X_{25}$ | 0 | 1 | 1 | 0 | 1 | 0 | 1 | 0 | 1 | 0 |
| N/NN | $X_{26}$ | 0 | 0 | 1 | 0 | 1 | 1 | 0 | 1 | 0 | 1 |
| AA/D | $X_{30}$ | 1 | 0 | 1 | 0 | 1 | 1 | 1 | 1 | 0 | 1 |
| AA/A | $X_{31}$ | 0 | 1 | 1 | 0 | 0 | 0 | 1 | 0 | 0 | 0 |
| AA/N | $X_{32}$ | 1 | 1 | 0 | 0 | 1 | 1 | 0 | 1 | 0 | 0 |
| AA/AA | $X_{33}$ | 0 | 1 | 1 | 0 | 1 | 1 | 0 | 1 | 1 | 1 |
| AA/AN | $X_{34}$ | 1 | 0 | 1 | 1 | 0 | 1 | 1 | 0 | 1 | 1 |
| AA/NA | $X_{35}$ | 1 | 1 | 0 | 1 | 1 | 0 | 1 | 1 | 1 | 0 |
| AA/NN | $X_{36}$ | 0 | 1 | 1 | 1 | 0 | 1 | 1 | 1 | 0 | 0 |
| AN/D | $X_{40}$ | 1 | 1 | 0 | 1 | 0 | 1 | 0 | 1 | 1 | 1 |
| AN/A | $X_{41}$ | 1 | 0 | 1 | 1 | 1 | 0 | 0 | 1 | 1 | 0 |
| AN/N | $X_{42}$ | 0 | 0 | 0 | 1 | 1 | 1 | 0 | 0 | 0 | 1 |
| AN/AA | $X_{43}$ | 0 | 0 | 0 | 1 | 1 | 1 | 0 | 0 | 0 | 1 |
| AN/AN | $X_{44}$ | 1 | 1 | 1 | 0 | 0 | 0 | 0 | 0 | 0 | 1 |
| AN/NA | $X_{45}$ | 1 | 0 | 0 | 0 | 1 | 0 | 1 | 0 | 0 | 0 |
| AN/NN | $X_{46}$ | 0 | 0 | 1 | 1 | 0 | 1 | 0 | 1 | 0 | 0 |
| NA/D | $X_{50}$ | 0 | 1 | 1 | 1 | 0 | 1 | 0 | 1 | 1 | 1 |
| NA/A | $X_{51}$ | 0 | 1 | 1 | 1 | 0 | 1 | 1 | 1 | 0 | 0 |
| NA/N | $X_{52}$ | 1 | 1 | 1 | 0 | 0 | 0 | 0 | 0 | 0 | 1 |
| NA/AA | $X_{53}$ | 1 | 1 | 0 | 0 | 1 | 1 | 1 | 0 | 1 | 0 |
| NA/AN | $X_{54}$ | 0 | 0 | 1 | 0 | 1 | 0 | 1 | 0 | 1 | 0 |
| NA/NA | $X_{55}$ | 1 | 0 | 1 | 1 | 1 | 0 | 0 | 1 | 1 | 0 |
| NA/NN | $X_{56}$ | 1 | 1 | 1 | 0 | 0 | 0 | 1 | 1 | 1 | 0 |
| NN/D | $X_{60}$ | 0 | 1 | 0 | 0 | 1 | 0 | 1 | 0 | 0 | 0 |
| NN/A | $X_{61}$ | 0 | 0 | 1 | 0 | 0 | 1 | 0 | 0 | 1 | 0 |
| NN/N | $X_{62}$ | 0 | 1 | 0 | 0 | 0 | 1 | 1 | 0 | 0 | 1 |
| NN/AA | $X_{63}$ | 0 | 1 | 0 | 1 | 0 | 0 | 0 | 0 | 1 | 0 |
| NN/AN | $X_{64}$ | 0 | 0 | 0 | 1 | 0 | 1 | 0 | 0 | 1 | 0 |
| NN/NA | $X_{65}$ | 0 | 1 | 0 | 0 | 1 | 0 | 0 | 1 | 0 | 0 |
| NN/NN | $X_{66}$ | 0 | 0 | 0 | 0 | 0 | 0 | 1 | 1 | 1 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0. |

15. The method according to claim 6, wherein when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-2C-2D, a codebook structure type of the codebook structure corresponding to the dual stream-single stream sending mode is {A1, A2, A5, A6}∪2B-3C-3D-E-F, a codebook structure type of the codebook structure corresponding to the single stream-dual stream sending mode is 6A-2B-2C-D∪{D3~D5}, and a codebook structure type of the codebook structure corresponding to the dual stream-dual stream sending mode is {G7~G16}∪{H1~H8}∪{H9~H16}, mapping relationship between the joint feedback signals and codewords for encoding thereof are shown in Table 2-20;
wherein Table 2-20 comprises:

| | | | | | | | | | | | |
|---|---|---|---|---|---|---|---|---|---|---|---|
| D/A | $X_{01}$ | 1 | 1 | 1 | 1 | 1 | 0 | 0 | 0 | 0 | 0 |
| D/N | $X_{02}$ | 0 | 0 | 0 | 0 | 0 | 1 | 1 | 1 | 1 | 1 |
| D/AA | $X_{03}$ | 0 | 0 | 1 | 1 | 1 | 1 | 0 | 0 | 0 | 1 |
| D/AN | $X_{04}$ | 0 | 1 | 1 | 0 | 0 | 1 | 1 | 1 | 0 | 0 |
| D/NA | $X_{05}$ | 0 | 0 | 0 | 0 | 1 | 0 | 1 | 1 | 1 | 1 |

-continued

| | | | | | | | | | | | |
|---|---|---|---|---|---|---|---|---|---|---|---|
| D/NN | $X_{06}$ | 1 | 1 | 1 | 0 | 1 | 0 | 0 | 0 | 1 | 0 |
| A/D | $X_{10}$ | 1 | 1 | 1 | 1 | 1 | 1 | 1 | 1 | 1 | 1 |
| A/A | $X_{11}$ | 1 | 0 | 1 | 0 | 1 | 0 | 1 | 0 | 1 | 0 |
| A/N | $X_{12}$ | 1 | 1 | 0 | 0 | 1 | 1 | 0 | 0 | 1 | 1 |
| A/AA | $X_{13}$ | 1 | 1 | 0 | 0 | 1 | 1 | 1 | 0 | 0 | 1 |
| A/AN | $X_{14}$ | 0 | 1 | 1 | 1 | 0 | 0 | 1 | 0 | 1 | 1 |
| A/NA | $X_{15}$ | 1 | 0 | 1 | 1 | 1 | 0 | 1 | 1 | 0 | 0 |
| A/NN | $X_{16}$ | 1 | 0 | 1 | 0 | 0 | 1 | 0 | 0 | 0 | 1 |
| N/D | $X_{20}$ | 0 | 0 | 0 | 0 | 0 | 0 | 0 | 0 | 0 | 0 |
| N/A | $X_{21}$ | 0 | 0 | 1 | 1 | 0 | 0 | 1 | 1 | 0 | 0 |
| N/N | $X_{22}$ | 0 | 1 | 0 | 1 | 0 | 1 | 0 | 1 | 0 | 1 |
| N/AA | $X_{23}$ | 1 | 0 | 0 | 1 | 1 | 0 | 0 | 0 | 1 | 1 |
| N/AN | $X_{24}$ | 0 | 0 | 0 | 1 | 0 | 1 | 1 | 0 | 1 | 0 |
| N/NA | $X_{25}$ | 1 | 1 | 0 | 1 | 0 | 0 | 0 | 1 | 0 | 1 |
| N/NN | $X_{26}$ | 1 | 1 | 0 | 0 | 0 | 0 | 1 | 1 | 1 | 0 |
| AA/D | $X_{30}$ | 1 | 0 | 1 | 0 | 1 | 1 | 1 | 1 | 0 | 1 |
| AA/A | $X_{31}$ | 0 | 1 | 0 | 1 | 0 | 0 | 0 | 0 | 1 | 0 |
| AA/N | $X_{32}$ | 0 | 1 | 1 | 0 | 1 | 1 | 1 | 1 | 0 | 0 |
| AA/AA | $X_{33}$ | 1 | 0 | 0 | 0 | 1 | 0 | 1 | 0 | 0 | 0 |
| AA/AN | $X_{34}$ | 0 | 0 | 1 | 1 | 0 | 0 | 1 | 1 | 1 | 0 |
| AA/NA | $X_{35}$ | 1 | 1 | 0 | 1 | 1 | 0 | 1 | 1 | 0 | 1 |
| AA/NN | $X_{36}$ | 1 | 1 | 0 | 0 | 0 | 1 | 1 | 1 | 1 | 0 |
| AN/D | $X_{40}$ | 1 | 1 | 0 | 1 | 0 | 1 | 0 | 1 | 1 | 1 |
| AN/A | $X_{41}$ | 0 | 0 | 0 | 1 | 1 | 1 | 0 | 0 | 0 | 1 |
| AN/N | $X_{42}$ | 0 | 0 | 1 | 1 | 0 | 0 | 0 | 0 | 1 | 1 |
| AN/AA | $X_{43}$ | 0 | 0 | 0 | 0 | 0 | 0 | 0 | 0 | 0 | 1 |
| AN/AN | $X_{44}$ | 1 | 0 | 1 | 1 | 0 | 1 | 1 | 0 | 1 | 1 |
| AN/NA | $X_{45}$ | 1 | 0 | 0 | 1 | 1 | 0 | 0 | 0 | 1 | 1 |
| AN/NN | $X_{46}$ | 1 | 0 | 1 | 1 | 1 | 0 | 0 | 1 | 0 | 0 |
| NA/D | $X_{50}$ | 0 | 1 | 1 | 1 | 1 | 0 | 1 | 0 | 1 | 1 |
| NA/A | $X_{51}$ | 1 | 1 | 0 | 0 | 1 | 1 | 1 | 0 | 1 | 0 |
| NA/N | $X_{52}$ | 1 | 1 | 1 | 0 | 0 | 0 | 1 | 1 | 1 | 0 |
| NA/AA | $X_{53}$ | 0 | 1 | 0 | 1 | 1 | 1 | 1 | 0 | 0 | 0 |
| NA/AN | $X_{54}$ | 0 | 1 | 1 | 0 | 1 | 1 | 1 | 0 | 1 | 1 |
| NA/NA | $X_{55}$ | 1 | 0 | 0 | 0 | 1 | 1 | 1 | 0 | 1 | 0 |
| NA/NN | $X_{56}$ | 0 | 0 | 0 | 1 | 1 | 1 | 0 | 1 | 1 | 0 |
| NN/D | $X_{60}$ | 1 | 0 | 0 | 1 | 0 | 0 | 1 | 0 | 0 | 0 |
| NN/A | $X_{61}$ | 1 | 0 | 0 | 0 | 1 | 0 | 0 | 0 | 1 | 1 |
| NN/N | $X_{62}$ | 0 | 0 | 1 | 0 | 1 | 0 | 1 | 0 | 0 | 0 |
| NN/AA | $X_{63}$ | 1 | 1 | 1 | 1 | 0 | 1 | 0 | 0 | 0 | 0 |
| NN/AN | $X_{64}$ | 0 | 1 | 0 | 0 | 0 | 1 | 1 | 0 | 1 | 1 |
| NN/NA | $X_{65}$ | 1 | 1 | 1 | 0 | 0 | 0 | 1 | 0 | 0 | 1 |
| NN/NN | $X_{66}$ | 0 | 1 | 1 | 1 | 0 | 0 | 0 | 1 | 0 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0. |

16. The method according to claim 6, wherein
when a codebook structure type of the codebook structure corresponding to the single stream-DTX sending mode is A-B, a codebook structure type of the codebook structure corresponding to the DTX-single stream sending mode is A-B, a codebook structure type of the codebook structure corresponding to the dual stream-DTX sending mode is 4A, a codebook structure type of the codebook structure corresponding to the DTX-dual stream sending mode is 4A, a codebook structure type of the codebook structure corresponding to the single stream-single stream sending mode is 2A-2B-4C, a codebook structure type of the codebook structure corresponding to the dual stream-single stream sending mode is 4A-3B-6C-D, a codebook structure type of the codebook structure corresponding to the single stream-dual stream sending mode is 6A-2B-2C-D∪{D3~D5}, and a codebook structure type of the codebook structure corresponding to the dual stream-dual stream sending mode is {G7~G16}∪{H1~H8}∪{H9~H16}, mapping relationship between the joint feedback signals and codewords for encoding thereof are shown in Table 2-21;

wherein Table 2-21 comprises:

| | | | | | | | | | | | |
|---|---|---|---|---|---|---|---|---|---|---|---|
| D/A | $X_{01}$ | 0 | 0 | 0 | 0 | 0 | 0 | 1 | 1 | 1 | 1 |
| D/N | $X_{02}$ | 1 | 1 | 1 | 1 | 1 | 1 | 0 | 0 | 0 | 0 |
| D/AA | $X_{03}$ | 0 | 0 | 1 | 1 | 1 | 1 | 0 | 0 | 0 | 1 |
| D/AN | $X_{04}$ | 0 | 1 | 1 | 0 | 0 | 1 | 1 | 1 | 0 | 0 |
| D/NA | $X_{05}$ | 0 | 0 | 0 | 0 | 1 | 0 | 1 | 1 | 1 | 1 |
| D/NN | $X_{06}$ | 1 | 1 | 1 | 0 | 1 | 0 | 0 | 0 | 1 | 0 |
| A/D | $X_{10}$ | 1 | 1 | 1 | 1 | 1 | 1 | 1 | 1 | 1 | 1 |
| A/A | $X_{11}$ | 1 | 1 | 0 | 1 | 0 | 0 | 0 | 0 | 1 | 1 |
| A/N | $X_{12}$ | 0 | 0 | 1 | 1 | 1 | 0 | 0 | 0 | 1 | 1 |
| A/AA | $X_{13}$ | 1 | 1 | 0 | 0 | 1 | 1 | 1 | 0 | 0 | 1 |
| A/AN | $X_{14}$ | 0 | 1 | 1 | 0 | 0 | 1 | 0 | 1 | 1 | 1 |
| A/NA | $X_{15}$ | 1 | 0 | 1 | 1 | 1 | 0 | 1 | 1 | 0 | 0 |
| A/NN | $X_{16}$ | 1 | 0 | 1 | 0 | 0 | 0 | 1 | 0 | 0 | 1 |
| N/D | $X_{20}$ | 0 | 0 | 0 | 0 | 0 | 0 | 0 | 0 | 0 | 0 |
| N/A | $X_{21}$ | 1 | 0 | 0 | 1 | 0 | 1 | 1 | 1 | 0 | 0 |
| N/N | $X_{22}$ | 0 | 1 | 1 | 0 | 0 | 1 | 0 | 1 | 0 | 1 |
| N/AA | $X_{23}$ | 1 | 0 | 0 | 1 | 1 | 0 | 0 | 0 | 1 | 1 |
| N/AN | $X_{24}$ | 1 | 0 | 0 | 1 | 0 | 1 | 1 | 1 | 0 | 1 |
| N/NA | $X_{25}$ | 1 | 1 | 0 | 1 | 0 | 0 | 0 | 1 | 0 | 1 |
| N/NN | $X_{26}$ | 1 | 1 | 0 | 0 | 0 | 0 | 1 | 1 | 1 | 0 |
| AA/D | $X_{30}$ | 1 | 0 | 1 | 0 | 1 | 1 | 1 | 1 | 0 | 1 |
| AA/A | $X_{31}$ | 1 | 0 | 0 | 0 | 1 | 0 | 0 | 0 | 1 | 1 |
| AA/N | $X_{32}$ | 0 | 0 | 1 | 0 | 1 | 0 | 1 | 0 | 0 | 0 |
| AA/AA | $X_{33}$ | 1 | 0 | 0 | 0 | 0 | 1 | 0 | 1 | 0 | 0 |
| AA/AN | $X_{34}$ | 0 | 0 | 1 | 1 | 0 | 0 | 1 | 1 | 1 | 0 |
| AA/NA | $X_{35}$ | 1 | 1 | 0 | 1 | 0 | 1 | 1 | 1 | 0 | 1 |
| AA/NN | $X_{36}$ | 1 | 1 | 0 | 1 | 0 | 0 | 1 | 1 | 1 | 0 |
| AN/D | $X_{40}$ | 1 | 1 | 0 | 1 | 0 | 1 | 0 | 1 | 1 | 1 |
| AN/A | $X_{41}$ | 1 | 1 | 1 | 0 | 0 | 0 | 1 | 1 | 1 | 0 |
| AN/N | $X_{42}$ | 1 | 0 | 0 | 0 | 0 | 1 | 0 | 1 | 0 | 0 |
| AN/AA | $X_{43}$ | 0 | 0 | 0 | 0 | 0 | 0 | 0 | 0 | 0 | 1 |
| AN/AN | $X_{44}$ | 1 | 0 | 1 | 1 | 0 | 1 | 1 | 0 | 1 | 1 |
| AN/NA | $X_{45}$ | 1 | 0 | 0 | 1 | 1 | 0 | 0 | 0 | 1 | 1 |
| AN/NN | $X_{46}$ | 1 | 0 | 1 | 1 | 1 | 0 | 1 | 0 | 0 | 0 |
| NA/D | $X_{50}$ | 0 | 1 | 1 | 1 | 0 | 1 | 0 | 1 | 1 | 1 |
| NA/A | $X_{51}$ | 0 | 0 | 1 | 1 | 0 | 0 | 1 | 0 | 0 | 1 |
| NA/N | $X_{52}$ | 0 | 1 | 0 | 0 | 0 | 1 | 1 | 0 | 0 | 1 |
| NA/AA | $X_{53}$ | 0 | 1 | 0 | 1 | 1 | 1 | 1 | 0 | 0 | 0 |
| NA/AN | $X_{54}$ | 0 | 1 | 1 | 0 | 1 | 1 | 0 | 1 | 1 | 1 |
| NA/NA | $X_{55}$ | 1 | 0 | 0 | 0 | 1 | 1 | 1 | 0 | 1 | 0 |
| NA/NN | $X_{56}$ | 0 | 0 | 0 | 1 | 1 | 1 | 0 | 1 | 1 | 0 |
| NN/D | $X_{60}$ | 1 | 0 | 0 | 1 | 0 | 0 | 1 | 0 | 0 | 0 |
| NN/A | $X_{61}$ | 0 | 0 | 0 | 1 | 1 | 1 | 1 | 1 | 1 | 0 |
| NN/N | $X_{62}$ | 0 | 1 | 0 | 1 | 0 | 0 | 0 | 1 | 0 | 0 |
| NN/AA | $X_{63}$ | 1 | 1 | 1 | 1 | 0 | 1 | 0 | 0 | 0 | 0 |
| NN/AN | $X_{64}$ | 0 | 1 | 0 | 0 | 0 | 1 | 1 | 0 | 1 | 1 |
| NN/NA | $X_{65}$ | 1 | 1 | 1 | 0 | 0 | 1 | 0 | 0 | 1 | 0 |
| NN/NN | $X_{66}$ | 0 | 1 | 1 | 1 | 0 | 0 | 1 | 0 | 0 | 1 |
| PRE/POST Indication Information | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0. |

* * * * *